United States Patent
Genov et al.

(10) Patent No.: US 11,856,301 B2
(45) Date of Patent: Dec. 26, 2023

(54) METHOD AND SYSTEM FOR EXTENDING IMAGE DYNAMIC RANGE USING PER-PIXEL CODING OF PIXEL PARAMETERS

(71) Applicant: THE GOVERNING COUNCIL OF THE UNIVERSITY OF TORONTO, Toronto (CA)

(72) Inventors: Roman Genov, Toronto (CA); Kiriakos Kutulakos, Toronto (CA); Navid Sarhangnejad, Toronto (CA); Rahul Gulve, Toronto (CA); Hui Ke, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 120 days.

(21) Appl. No.: 17/606,969

(22) PCT Filed: Jun. 19, 2020

(86) PCT No.: PCT/CA2020/050858
§ 371 (c)(1),
(2) Date: Oct. 27, 2021

(87) PCT Pub. No.: WO2020/252592
PCT Pub. Date: Dec. 24, 2020

(65) Prior Publication Data
US 2022/0239822 A1 Jul. 28, 2022

Related U.S. Application Data

(60) Provisional application No. 62/864,895, filed on Jun. 21, 2019.

(51) Int. Cl.
*H04N 23/741* (2023.01)
*G01S 17/894* (2020.01)
(Continued)

(52) U.S. Cl.
CPC ......... *H04N 23/741* (2023.01); *G01S 7/4816* (2013.01); *G01S 17/894* (2020.01); *H04N 23/73* (2023.01); *H04N 23/76* (2023.01)

(58) Field of Classification Search
CPC ...... H04N 23/741; H04N 23/73; H04N 23/76; H04N 25/583; H04N 25/771; H04N 25/53;
(Continued)

(56) References Cited

U.S. PATENT DOCUMENTS 10,229,943 B2  3/2019  Genov et al.
10,484,628 B2  11/2019  Zhang et al.
(Continued)

FOREIGN PATENT DOCUMENTS

JP  H05176238 A  7/1993
JP  2003521836 A  7/2003
(Continued)

OTHER PUBLICATIONS

Office Action for Japanese application No. 2019-559035, Japan Patent Office, drafted: Aug. 24, 2022, dated Aug. 26, 2022.
(Continued)

*Primary Examiner* — Jason A Flohre
(74) *Attorney, Agent, or Firm* — Bhole IP Law; Anil Bhole; Marc Lampert

(57) ABSTRACT

There is provided a method and system for extending image sensor dynamic range using coded pixels. The method including: providing pixel codes to pixels in the photodetector array for each subframe of a frame; receiving a sensor readout of each of the pixels in the photodetector array for each subframe; for each subframe, based on the pixel code, routing each sensor readout value for collection at one or more taps or to a drain; combining the collected sensor readout values at each of the taps to determine a single pixel
(Continued)

value for the frame; and outputting the single pixel value for each pixel for the frame.

19 Claims, 59 Drawing Sheets

(51) Int. Cl.
  *G01S 7/481* (2006.01)
  *H04N 23/73* (2023.01)
  *H04N 23/76* (2023.01)
(58) Field of Classification Search
  CPC ..... H04N 25/75; G01S 7/4816; G01S 17/894; G01S 7/4914
  See application file for complete search history.

(56) References Cited

U.S. PATENT DOCUMENTS

| | | | |
|---|---|---|---|
| 10,791,282 | B2 | 9/2020 | Li et al. |
| 11,509,803 | B1* | 11/2022 | Li .......................... G01S 17/36 |
| 2004/0239789 | A1 | 12/2004 | Bruce et al. |
| 2006/0054782 | A1 | 3/2006 | Olsen et al. |
| 2008/0007645 | A1 | 1/2008 | McCutchen |
| 2011/0074995 | A1 | 3/2011 | Rafferty et al. |
| 2011/0266416 | A1 | 11/2011 | Kurimoto et al. |
| 2013/0140433 | A1* | 6/2013 | Oggier .................. G01S 17/894 250/208.1 |
| 2014/0252201 | A1 | 9/2014 | Li et al. |
| 2014/0267855 | A1 | 9/2014 | Fan |
| 2015/0229859 | A1 | 8/2015 | Guidash et al. |
| 2015/0279899 | A1 | 10/2015 | Kim et al. |
| 2016/0065824 | A1 | 3/2016 | Geng et al. |
| 2016/0323524 | A1 | 11/2016 | Smith et al. |
| 2017/0026600 | A1* | 1/2017 | Noh ...................... H04N 25/445 |
| 2017/0041571 | A1* | 2/2017 | Tyrrell .................. H04N 25/00 |
| 2017/0244921 | A1 | 8/2017 | Velichko |
| 2018/0035068 | A1* | 2/2018 | Morimoto ............ H04N 23/689 |
| 2018/0115725 | A1* | 4/2018 | Zhang .................... H04N 25/77 |
| 2021/0218923 | A1* | 7/2021 | Yoda ...................... H04N 25/75 |
| 2022/0223632 | A1* | 7/2022 | Watanabe ......... H01L 27/14636 |
| 2022/0260716 | A1* | 8/2022 | Ayers ..................... G01S 17/89 |

FOREIGN PATENT DOCUMENTS

| | | |
|---|---|---|
| JP | 2013509820 A | 3/2013 |
| JP | 2014209103 A | 11/2014 |
| JP | 2015215181 A | 12/2015 |
| JP | 2016511539 A | 4/2016 |
| JP | 2016092593 A | 5/2016 |
| WO | 0052926 A1 | 9/2000 |
| WO | 2016010838 A1 | 1/2016 |
| WO | 2016028200 A1 | 2/2016 |
| WO | 2018195669 A1 | 11/2018 |

OTHER PUBLICATIONS

Office Action for U.S. Appl. No. 17/500,407, USPTO, dated Dec. 22, 2022.
Shrestha, S. , et al., "Computational imaging with multi-camera time-of-flight systems", Proc. ACM SIGGRAPH Asia, ACM (Jul. 2016) 33-11.
Sonoda, T. , et al., "High-speed imaging using CMOS image sensor with quasi pixel-wise exposure", IEEE ICCP, IEEE.
Van Der Jeught, S. , et al., "Real-time structured light profilometry: a review", Optics and Lasers in Engineering 87 (2016) 18-31.
Wan, G. , et al., "Applications of Multi-Bucket Sensors to Computational Photography", Technical Report Feb. 2012, Stanford Computer Graphics Lab.
Wan, G. , et al., "CMOS Image Sensors With Multi- Bucket Pixels for Computational Photography", IEEE-JSSC 47(4) (Apr. 2012) 1031-1042.
Wan, G. , et al., "CMOS Image Sensors With Multi-Bucket Pixels for Computational Photography", IEEE Journal of Solid-State Circuits, vol. 47, No. 4, pp. 1031-1042, Apr. 2012. https://doi.org/10.1109/JSSC.2012.2185189.
Wei, M , et al., "Coded Two-bucket cameras for Computer Vision", Computer Vision - ECCV 2018 (2018) 55-73. https://doi.org/10.1007/978-3-030-01219-9_4.
Wetzstein, G. , et al., "On Plenoptic Multiplexing and Reconstruction", Int. J. Computer Vision 101(2) (Jan. 2013) 384-400.
Wu, L. , et al., "Robust Photometric Stereo 707 via Low-Rank Matrix Completion and Recovery", Proc. ACCV. (2010).
Yasuma, F. , et al., "Generalized Assorted Pixel Camera: Postcapture Control of Resolution, Dynamic Range, and Spectrum", IEEE-TIP 19(9) 2241-2253.
Zhang, J. , et al., "CMOS implementation of pixel-wise coded exposure imaging for insect-based sensor node", 2015 IEEE Biomedical Circuits and Systems Conference (BioCAS), 2015, pp. 1-4. https://doi.org/10.1109/BioCAS.2015.7348419.
Zhang, J. , et al., "Compact all-CMOS spatiotemporal compressive sensing video camera with pixel-wise coded exposure", Opt Express 24(8) (2016) 9013-9024.
First office action for Japanese patent application No. 2019-559035, completed: Nov. 4, 2021, dated Nov. 9, 2021.
Notice of allowance and fees for U.S. Appl. No. 15/964,722, United States Patent & Trademark Office, notification dated Dec. 24, 2018.
Office Action for U.S. Appl. No. 16/226,808, United States Patent & Trademark Office, notification dated Jun. 3, 2021.
Office Action for U.S. Appl. No. 16/226,808, United States Patent & Trademark Office, notification dated May 15, 2020.
Search Report of the International Searching Authority for PCT/CA2018/050496, application date: Apr. 27, 2018, search completed: Jul. 24, 2018, dated Jul. 27, 2018.
Search Report of the International Searching Authority for PCT/CA2020/950858, application date: Jun. 19, 2020, search completed: Aug. 18, 2020, dated Sep. 22, 2022.
Written Opinion of the International Searching Authority for PCT/CA2018/050496, application date: Apr. 27, 2018, opinion completed: Jul. 26, 2018, dated Jul. 27, 2018.
Written Opinion of the International Searching Authority for PCT/CA2020/950858, application date: Jun. 19, 2020, opinion completed: Aug. 20, 2020, dated Sep. 22, 2022.
Bamji, C.S. , et al., "A 0.13 µm CMOS System-on-Chip for a 512x424 Time-of-Flight Image Sensor With Multi-Frequency Photo-Demodulation up to 130 MHz and 2 GS/s ADC", IEEE-JSSC 50(1) 303-319.
Baraniuk, R.G. , et al., "Compressive Video Sensing: Algorithms, architectures, and applications", IEEE Signal Proc. Mag. 34(1) 52-66.
Brown, C.M. , "Multiplex Imaging and Random Arrays", PhD thesis, PhD Dissertation, University of Chicago (1972).
Culurciello, E. , et al., "A biomorphic digital image sensor", IEEE Journal of Solid-State Circuits, vol. 38, No. 2, pp. 281-294, Feb. 2003. https://doi.org/10.1109/JSSC.2002.807412.
Davis, J. , et al., "BRDF invariant stereo using light transport constancy", Proc. IEEE ICCV. (2005) 436-443 vol. 1.
Debevec, P. E. , et al., "Recovering high dynamic range radiance maps from photographs", SIGGRAPH '08: ACM SIGGRAPH 2008 Classes (2008), 1-10. https://doi.org/10.1145/1401132.1401174.
Fyffe, G. , et al., "Single-shot photometric stereo by spectral multiplexing", Proc. IEEE ICCP. (2011).
Geurts, T. , et al., "A 98dB Linear Dynamic Range, High Speed CMOS Image Sensor", Proceedings of 2017 International Image Sensor Workshop (IISW), 2017, pp. 282-285. https://www.imagesensors.org/Past%20Workshops/2017%20Workshop/2017%20Papers/R31.pdf.
Gharbi, M. , et al., "Deep joint demosaicking and denoising", Proc. ACM SIGGRAPH Asia 35(6) (Nov. 2016) 191-12.
Gupta, M. , et al., "Micro Phase Shifting.", Proc. IEEE CVPR. (2012) 813-820.
Hasinoff, S. W. , et al., "Noise-optimal capture for high dynamic range photography", 2010 IEEE Computer Society Conference on Computer Vision and Pattern Recognition, 2010, pp. 553-560. https://doi.org/10.1109/CVPR.2010.5540167.

(56) References Cited

OTHER PUBLICATIONS

Heide, F., et al., "FlexISP: a flexible camera image processing framework", Proc. ACM SIGGRAPH Asia, ACM Request Permissions (2014).
Heide, F., et al., "Low-budget Transient Imaging Using Photonic Mixer Devices", ACM SIGGRAPH, New York, NY, USA, ACM Request Permissions (2013).
Heintzmann, R., et al., "A dual path programmable array microscope (PAM): simultaneous acquisition of conjugate and non-conjugate images", J. Microscopy 204 (2001) 119-135.
Hernandez, C., et al., "Non-rigid Photometric Stereo with Colored Lights", Proc. IEEE ICCP. (2007).
Jang, J., et al., "Sensor-Based Auto-Focusing System Using Multi-Scale Feature Extraction and Phase Correlation Matching", Sensors, Multidisciplinary Digital Publishing Institute (2015) 5747-5762.
Ke, Hui Feng, et al., "Extending Dynamic Range at Native Image Sensor Resolution by Pixel Coded Exposure", Proceedings of 2017 International Image Sensor Workshop (IISW), 2017, p. 17. https://www.imagesensors.org/Past%20Workshops/2019%20Workshop/2019%20Papers/P17.pdf.
Kim, H., et al., "Real-Time 3D Reconstruction and 6-DoF Tracking with an Event Camera", Proc. ECCV, Cham, Springer, Cham (Oct. 2016) 349-364.
Lange, R., et al., "Solid-state time-of-flight range camera", IEEE J. Quantum Electron. 37(3) (2001) 390-397.
Lichtsteiner, P., et al., "A 128×128 120 dB 15 µs Latency Asynchronous Temporal Contrast Vision Sensor", IEEE-JSSC 43(2) 566-576.
Liu, Z., et al., "Expressive expression mapping with ratio images", Proc. ACM SIGGRAPH, New York, New York, USA, ACM (2001) 271-276.
Luo, Yi, et al., "Bidirectional Multi-Level Spatial Coded Exposure CMOS Capacitive TIA Pixel Design", 2016 IEEE International Conference on Electron Devices and Solid-State Circuits (EDSSC), pp. 460-463.
Luo, Y., et al., "CMOS computational pixel for binary temporal optically encoded high-speed imaging", 2016 IEEE International Conference on Electron Devices and Solid-State Circuits (EDSSC), 2016, pp. 44-47. https://doi.org/10.1109/EDSSC.2016.7785206.
Luo, Y., et al., "Exposure-Programmable CMOS Pixel With Selective Charge Storage and Code Memory for Computational Imaging", IEEE Trans. Circuits Syst. 11-12.
Matsuda, N., et al., "MC3D: Motion Contrast 3D Scanning", Proc. IEEE ICCP, IEEE (2015) 1-10.
Mertens, T., et al., "Exposure Fusion", 15th Pacific Conference on Computer Graphics and Applications (PG'07), 2007, pp. 382-390. https://doi.org/10.1109/PG.2007.17.
Mitra, K., et al., "A Framework for Analysis of Computational Imaging Systems: Role of Signal Prior, Sensor Noise and Multiplexing", IEEE T-PAMI 36(10) (2014) 1909-1921.
Nayar, S. K., et al., "Adaptive dynamic range imaging: optical control of pixel exposures over space and time", Proceedings Ninth IEEE International Conference on Computer Vision, 2003, pp. 1168-1175 vol. 2. https://doi.org/10.1109/ICCV.2003.1238624.
Nayar, Shree K, et al., "High dynamic range imaging: spatially varying pixel exposures", Proceedings IEEE Conference on Computer Vision and Pattern Recognition. CVPR 2000 (Cat. No. PR00662), 2000, pp. 472-479 vol. 1. https://doi.org/10.1109/CVPR.2000.855857.
Newcombe, R.A., et al., "DynamicFusion: Reconstruction and tracking of non-rigid scenes in real-time", IEEE CVPR 2015.
Ni, Yang, et al., "A CMOS log image sensor with on-chip FPN compensation", Proceedings of the 27th European Solid-State Circuits Conference, 2001, pp. 101-104.
Nonoyama, M., et al., "Multiplex Image Projection Using Multi-band Projectors", 2013 IEEE International Conference on Computer Vision Workshops (ICCVW), IEEE (2013) 868-873.
O'Toole, M., et al., "3D Shape and Indirect Appearance by Structured Light Transport", IEEE T-PAMI 38(7) (2016) 1298-1312.
O'Toole, M., et al., "Homogeneous codes for energy-efficient illumination and imaging", Proc. ACM SIGGRAPH Asia, ACM Request Per-missions (2015).
Pilet, J., et al., "Making Background Subtraction Robust to Sudden Illumination Changes", Proc. ECCV, Berlin, Heidelberg, Springer, Berlin, Heidelberg (2008) 567-580.
Queau, Y., et al., "Photometric stereo with only two images: A theoretical study and numerical resolution", Image and Vision Computing 57 (Jan. 2017) 175-191.
Raskar, R., et al., "Coded exposure photography: motion deblurring using fluttered shutter", Proc. ACM SIGGRAPH. (2006).
Ratner, N., et al., "Illumination Multiplexing within Fundamental Limits.", 2007 IEEE Conference on Computer Vision and Pattern Recognition, IEEE (2007) 1-8.
Ratner, N., et al., "Optimal multiplexed sensing: bounds, conditions and a graph theory link", Opt Express 15(25) (Dec. 2007) 17072-17092.
Sagawa, R., et al., "Dense 3D Reconstruction from High Frame-Rate Video Using a Static Grid Pattern", IEEE T-PAMI 36(9) 1733-1747.
Sarhangnejad, N., et al., "Dual-Tap Pipelined-Code-Memory Coded-Exposure-Pixel CMOS Image Sensor for Multi-Exposure Single-Frame Computational Imaging", 2019 IEEE International Solid-State Circuits Conference—(ISSCC), 2019, pp. 102-104. https://doi.org/10.1109/ISSCC.2019.8662326.
Schechner, Y.Y., et al., "Multiplexing for optimal lighting.", IEEE T-PAMI 29(8) (Jun. 2007) 1339-1354.
Preliminary refusal for Korean patent application No. 10-2019-7035361, dated Dec. 14, 2021.
First office action for Japanese patent application No. 2019-559035, dated Nov. 4, 2021.
Search Report of the International Searching Authority for application No. PCT/CA2020/950858 dated Sep. 22, 2020.
Written Opinion of the International Searching Authority for application No. PCT/CA2020/950858 dated Sep. 22, 2020.

* cited by examiner

PIXEL TILE  TILED ARRAY

PIXEL TILE          TILED ARRAY

| UNARY-WEIGHTED SUBFRAME EXPOSURE TIME | | | | | BINARY-WEIGHTED SUBFRAME EXPOSURE TIME | | | |
|---|---|---|---|---|---|---|---|---|
| $T_1$ | $T_2$ | $T_3$ | $T_4$ | SUBFRAME NUMBER | $T_1$ | $T_2$ | $T_3$ | $T_4$ |
| 1 | 2 | 3 | 4 | | 1 | 2 | 3 | 4 |
| 1 | 0 | 0 | 0 | C1 | 1 | 0 | 0 | 0 |
| 1 | 1 | 0 | 0 | C2 | 1 | 1 | 0 | 0 |
| 1 | 1 | 1 | 0 | C3 | 1 | 1 | 1 | 0 |
| 1 | 1 | 1 | 1 | C4 | 1 | 1 | 1 | 1 |

CODE SEQUENCE PER SUBFRAME

SCENE SETUP

LOW EXPOSURE

HIGH EXPOSURE

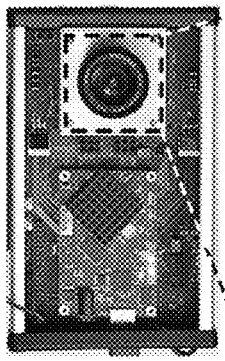 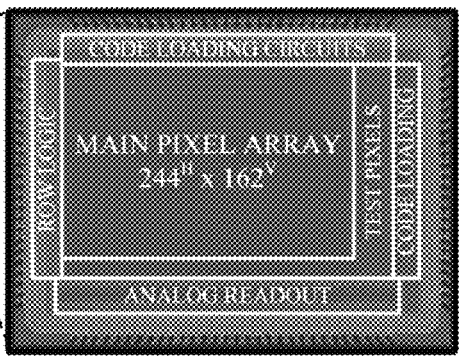
| IC SPECIFICATIONS | |
|---|---|
| TECHNOLOGY | 110nm CIS PPD |
| PIXEL PITCH | 11.2 μm |
| FILL FACTOR | 45.3% |
| CODE MEMORY | IN-PIXEL |
| SUBFRAME RATE | 180 Hz |
| DYNAMIC RANGE IMPROVEMENT | | | |
|---|---|---|---|
| CODING SCHEME | N = # subframes/frame | N=4 | N=10 |
| UNARY | $20\log(N)$ dB | 12 dB | 20 dB |
| BINARY | $6.02 \times N$ dB | 24 dB | 60 dB |
FIG. 36A     FIG. 36B     FIG. 36C

METHOD AND SYSTEM FOR EXTENDING IMAGE DYNAMIC RANGE USING PER-PIXEL CODING OF PIXEL PARAMETERS

TECHNICAL FIELD

The following relates generally to imaging, and more specifically, to a method and system for extending image dynamic range using per-pixel coding of pixel parameters.

BACKGROUND

Imaging sensors, such as those found in still-cameras and video-cameras, have a plurality of photosensitive receptors, or sensors, or photodetectors, such as a pinned-photodiode. Typically, each receptor is a device fabricated using a semiconductor technology, such as Complementary Metal Oxide Semiconductor (CMOS). Photons of light are collected on photosites of the receptors, such as a p-n-junction. A pixel is an elementary cell of an image sensor array. Typically, there is one or more photosites for each pixel. Typically, the photons are directed to the photoreceptors of the imaging sensor via one or more lenses. An electrical charge is produced in the semiconductor of the receptor, such as silicon, for each photosite, where this photo-generated charge is typically proportional to the intensity of the light received. The value of each charge is turned into a digital value by an analog-to-digital converter (ADC) and is used to generate images, both as still photographic images and as frames within a video.

SUMMARY

In an aspect, there is provided a method for extending image sensor dynamic range using coded pixels, the image sensor comprising a photodetector array to convert an incoming light signal into a photo-generated electronic signal, the method comprising: providing pixel codes to pixels in the photodetector array for each subframe of a frame; receiving a sensor readout of each of the pixels in the photodetector array for each subframe; for each subframe, based on the pixel code, routing each sensor readout value for collection at one or more taps or to a drain; combining the collected sensor readout values at each of the taps to determine a single pixel value for the frame; and outputting the single pixel value for each pixel for the frame.

In a particular case of the method, the pixel code comprises a code corresponding to exposure time of the respective pixel, with a resulting photo-generated charge comprising the respective sensor readout.

In another case of the method, the pixel code comprises a code corresponding to signal gain of the signal received at the photodetector.

In yet another case of the method, each pixel code is applied mutually to a group of pixels.

In yet another case of the method, the pixel codes are predetermined.

In yet another case of the method, the pixel codes are determined adaptively based on previously received pixel values.

In yet another case of the method, the pixel codes are preloaded into a code memory store based on the previously received pixel values.

In yet another case of the method, the method further comprising sorting the collected charges on each tap based on the pixel codes for the previous subframe as the sensor readouts of a current subframe are collected.

In yet another case of the method, each pixel comprises one tap, and the pixel code for each pixel comprises a one-bit binary number.

In yet another case of the method, the pixel codes for one or more of the pixels dictate that each of the one or more taps have individually-programmable integration time intervals.

In yet another case of the method, an average of the integration time intervals is equalized over multiple frames.

In another aspect, there is provided a system for extending image sensor dynamic range using coded pixels, the image sensor comprising a photodetector array to convert an incoming light signal into a photo-generated electronic signal, the system comprising circuit logic, the circuit logic configured to execute: a coding module to provide pixel codes to pixels in the photodetector array for each subframe of a frame and to, for each subframe, based on the pixel code, route the photo-generated electronic signal value of a respective one of the pixels for collection at one or more taps or to a drain; a high-dynamic-range (HDR) decoding module to combine the collected signal values available at each of the taps to determine a single pixel value for the frame; and an output module to output the single pixel value for each pixel for the frame.

In a particular case of the system, the pixel code comprises a code corresponding to exposure time of the respective pixel, with a resulting photo-generated charge comprising the respective sensor readout.

In another case of the system, the pixel code comprises a code corresponding to signal gain of the signal received at the photodetector.

In yet another case of the system, each pixel code is applied mutually to a group of pixels.

In yet another case of the system, the pixel codes are determined adaptively based on previously received pixel values.

In yet another case of the system, the coding module uses the pixel codes as loaded into a code memory store based on the previously received pixel values.

In yet another case of the system, the coding module sorts the collected charges on each tap based on the sensor readout values and the pixel codes for one or more previous subframes.

In yet another case of the system, each pixel comprises one tap, and the pixel code for each pixel comprises a one-bit binary number.

In yet another case of the system, each pixel in the photodetector array comprises one or more charge collection nodes, and wherein the charge collection nodes from one or more pixels are combined to modify the signal gain based on the pixel codes.

In yet another case of the system, the pixel codes dictate pixel exposure time for pixels that sense time of flight of the incoming light signal.

In yet another case of the system, the pixel codes dictate signal gain for pixels that sense time of flight of the incoming light signal.

In yet another case of the system, the HDR decoding module comprises an analog-to-digital converter (ADC), and wherein the resolution of the ADC is different for digitizing the subframes compared to digitizing the frames.

In yet another case of the system, the HDR decoding module comprises an analog-to-digital converter (ADC), and wherein one or more parameters of the ADC are dynamically adjusted for one or more subframes or for one of more frames.

In another aspect, there is provided a method for extending image dynamic range using per-pixel coded exposure and a previous readout of sensors with such per-pixel coded exposure, the method comprising: generating a current code matrix for a current coded exposure derived from a previous readout; sending the current coded matrix to the pixels; receiving a current raw sensor readout of each of the pixels; reconstructing a high-dynamic-range (HDR) image by processing the current raw sensor readout based on per-pixel exposure time; and outputting at least one of the HDR image and the current raw sensor readout.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein:

FIG. 25A is an example of unary-weighted pixel exposure time settings and code sequences;

FIG. 25B is an example of binary-weighted pixel exposure time settings and code sequences;

FIG. 36A is an image of an example camera having the image sensor;

FIG. 36B is an exemplary chip micrograph for the image sensor;

FIG. 36C shows the specifications and dynamic range of the example image sensor of FIG. 36B;

DETAILED DESCRIPTION

Figure 1:
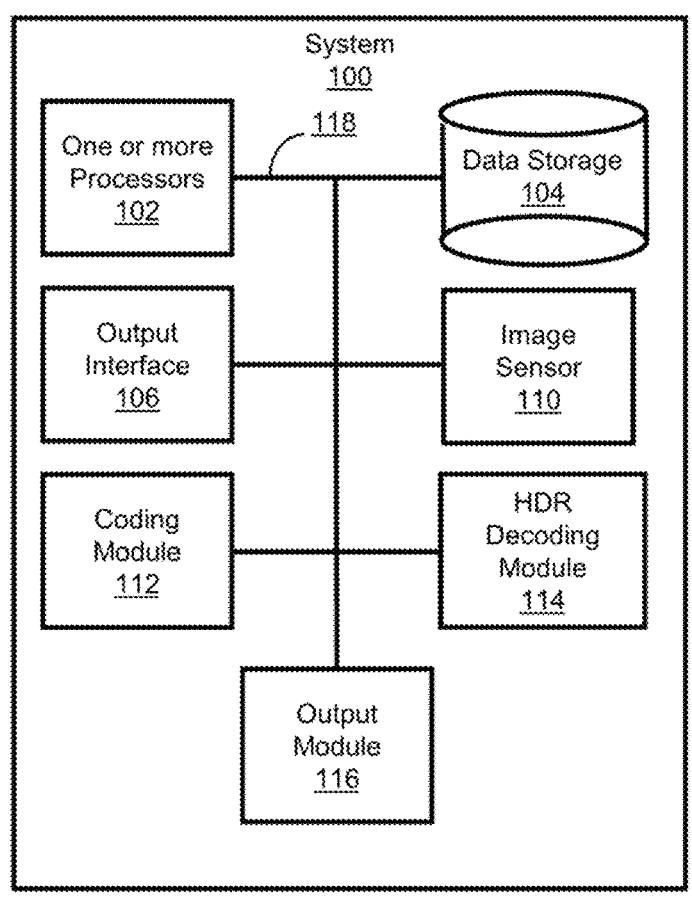
FIG. 1 is a schematic diagram of a system for extending image sensor dynamic range using coded pixels, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to imaging, and more specifically, to a method and system for extending image dynamic range using per-pixel coded exposure.

"Per-pixel" or "pixel-wise", as used herein, generally refers to operations or functions on a per-pixel or pixel-by-pixel basis; however, it is understood that in some cases, it can include operations or functions on a small-group-of-pixels by small-group-of-pixels basis.

Figure 2:
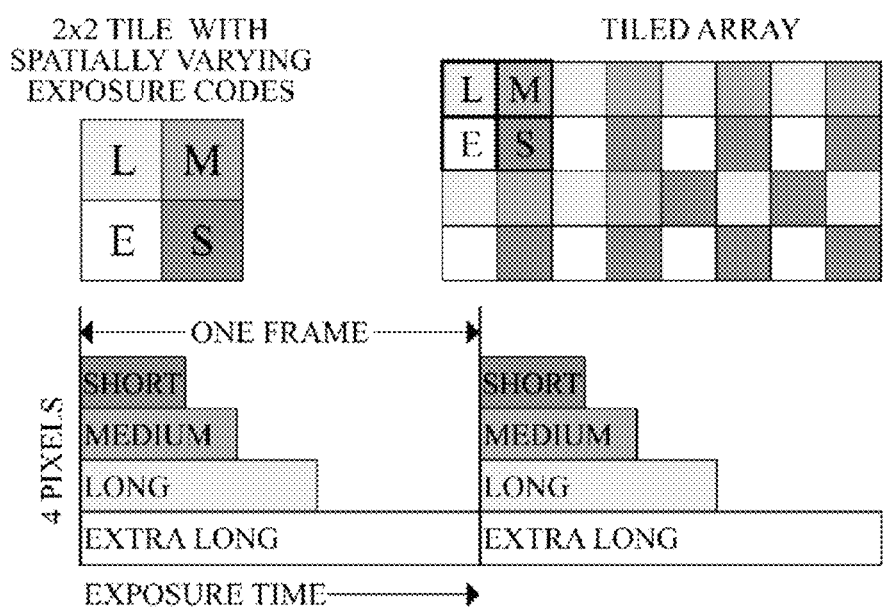
FIG. 2 is a diagram of an example of a single-frame high-dynamic-range (HDR) approach.
Figure 3:
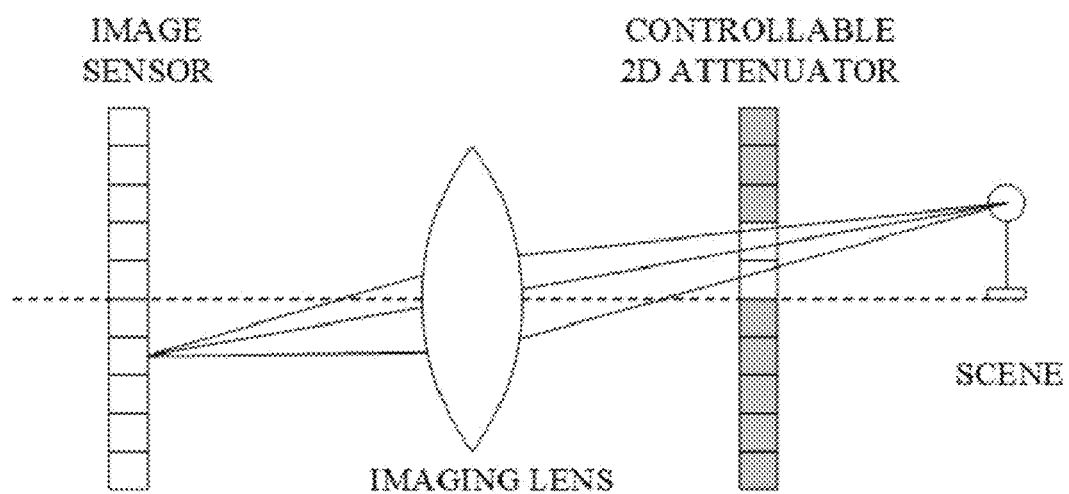
FIG. 3 is a diagram of an example of a spatial light modulator (SLM) approach.

The limited dynamic range of cameras with active pixels generally allow for capturing bright or dark scenes, but not both simultaneously. Several high-dynamic-range (HDR) techniques have been introduced to address this trade-off. Native-resolution full-frame-rate HDR approaches add significant auxiliary circuits overhead to the pixel such as multi-gain pixel readout, event-based readout or range compressing transfer functions (e.g., logarithmic), but often suffer from a low fill factor and in-pixel analog circuit non-idealities. In cases where the frame rate can be traded for the dynamic range, exposure is often varied over multiple frames. This approach in most cameras generally requires a proportionally higher frame rate or can lead to motion blurs or ghosting. A single-frame HDR approach utilizing, for example, 2×2 tiles of programmable pixels, each with a single storage node programmed with a different contiguous exposure time interval starting at the beginning of the frame, for example, short, medium, long, and extra-long, has been used. This approach is diagrammatically illustrated in FIG. 2. This approach generally yields a four-times lower image resolution due to its structure and does not allow for arbitrarily-programmable non-contiguous exposure time intervals. Another single-frame HDR approach uses a controllable 2D light attenuator such as a spatial light modulator (SLM) or a digital micromirror device (DMD) in front of the camera; but this approach is generally not scalable to high image sensor spatial resolution and is prone to optical distortion, in addition to having high complexity and high cost of the camera module. This approach is diagrammatically illustrated in FIG. 3.

Exposure, or exposure time, is the amount of time during which the photons of light reach a photosite and are sensed by the corresponding photosensitive receptor, and may be read out, transferred to a storage node, drained, or otherwise used within the pixel. The limited dynamic range of most image sensors in cameras allows for capturing either bright or dark scenes, but not both for a given frame.

Pixel gain, or signal gain, is the factor by which the pixel input signal, such as light or photo-generated charge, is scaled as the signal passes to the output of the pixel.

An image sensor pixel can be used to estimate incident light intensity or other light characteristics, for example, the time it takes for light to travel to the sensor. The time of flight (ToF) is the time over which light travels from a light source to a light receiver, such as a photodetector. Indirect time-of-flight (iToF) methods measure this time of flight without using an explicit timer. For example, employing a modulation signal, such as a periodic pulse waveform, to modulate light being sent, and a demodulation signal, such as another periodic pulse waveform of the same frequency. The time can be determined by measuring a phase difference between the received modulated light signal and the demodulation signal.

Pixel code, or code, is a number or a signal that carries information to be used by a pixel, for example to configure pixel exposure time, pixel gain, or other parameters of the pixel. It can be represented by an electronic signal, for example voltage, current, charge, or time, and can also be represented as a digital or analog signal, and can also be represented in continuous time, discrete time, or in another representation format.

Arbitrary-value pixel code, or arbitrary pixel code, refers to pixel code representation that is not limited to any subclass of all possible code values, so the code can have any value at any point in time, as needed or set by the system or a user. For example, a sequence of arbitrary discrete-time 1-bit binary pixel codes can take a value of 0 or 1 for any code sample in the sequence, as needed.

Some general-purpose coded-exposure imaging systems employ spatial light modulators (SLM), digital micromirror devices (DMDs), or liquid crystals on silicon (LCoS) to either pass or block light coming to each single-tap pixel of a camera, rendering them bulky and expensive. In accordance with the present embodiments, multi-tap coded-exposure-pixel (CEP) image sensors can provide various advantages, for example: (1) potentially smaller form factor and lower cost due to pixel programmability directly in CMOS-IS technology; (2) better optical signal fidelity, since, in many cases, no external optical devices are needed; (3) better light efficiency as a photo-generated charge can be sorted among multiple taps instead of discarding light when the one-tap pixel is "off"; and (4) lower noise as the photo-generated charge can be selectively accumulated over multiple time intervals and read out only once per frame (compared to an equivalent-speed high-frame-rate camera, which performs a noise-contributing readout for each exposure).

Embodiments of the present disclosure provide can be used to extend image sensor dynamic range that use coded pixels (CP) such as: (1) coded-exposure pixels (CEP) where each pixel or a group of pixels can be programmed to have its/their own per-pixel/per-group (herein referred to as per-pixel) exposure time; (2) coded-gain pixels (CGP) where each pixel or a group of pixels can be programmed or controlled to have its/their own per-pixel/per-group signal gain; and (3) other types of pixels where each pixel or a group of pixels can be programmed or controlled to have its/their own operational parameters that may include exposure, gain and/or any other parameters. The exposure time (herein referred to as the exposure) refers to the time interval(s) that one or more photodetectors are exposed to light, or the time interval(s) that one or more photodetectors are effectively exposed to light, for the purpose of generation of an electronic signal which is a function of the input light signal. The signal gain (herein referred to as the gain) refers to any type of gain in the signal path starting from the incoming light signal all the way to the output; for example, the gain of optical and/or electrical light modulators, the photo-generated charge conversion gain, the voltage gain, the current gain, the digital gain, or any other type of gain. A photodetector (or a photosite) is a device that converts an incoming light signal into a photo-generated electronic signal, such as a photo-generated charge, voltage, or current. Examples of a photodetector include a photodiode, a pinned photodiode, a photo gate, a phototransistor, or any other light sensitive electronic device.

Referring now to FIG. 1, a system 100 for extending image sensor dynamic range using coded pixels, in accordance with an embodiment, is shown. As understood by a person skilled in the art, in some cases, some components of the system 100 can be executed on separate hardware implementations. In other cases, some components of the system 100 can be implemented on one or more general purpose processors that may be locally or remotely distributed.

FIG. 1 shows various physical and logical components of an embodiment of the system 100. As shown, the system 100 has a number of physical and logical components, including one or more processors 102, data storage 104, an output interface 106, a CP image sensor 110, a coding module 112, a HDR decoding module 114, an output module 116, and a local bus 118 enabling the components to communicate each other. In an embodiment, the modules can be executed on the one or more processors 102. In other embodiments, the modules can be implemented in hardware, via a dedicated processor, or on a remote processor via a network. In some cases, the functions of the modules can be combined or further separated, as appropriate. In some cases, the output interface 106 can be in communication with a display device or other computing devices for outputting the output of the system 100. In other embodiments, non-essential elements of system 100 can be omitted or combined with other elements.

Figure 4A:
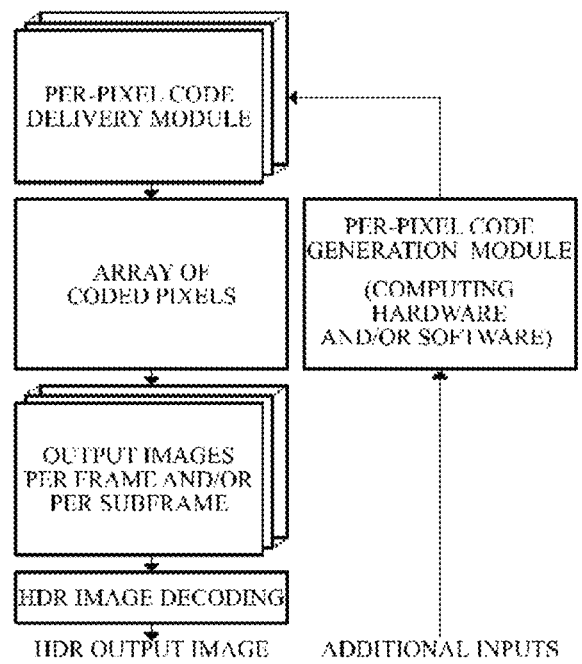
FIG. 4A is a flowchart of an example implementation of an open-loop high-dynamic-range (HDR) imaging method, in accordance with an embodiment.
Figure 4B:
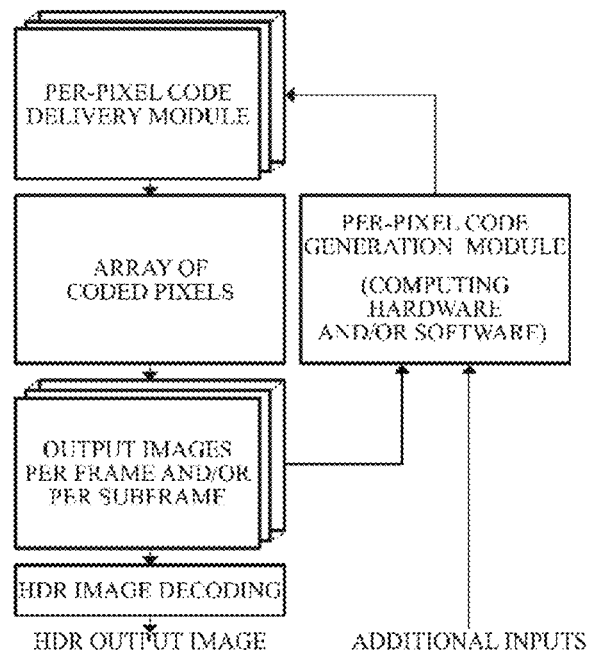
FIG. 4B is a flowchart of an example implementation of a closed-loop HDR imaging method, in accordance with an embodiment.

The dynamic range of the CP image sensors can be extended by several different approaches, as illustrated by the flowcharts depicted in FIGS. 4A and 4B. FIG. 4A illustrates an open-loop high-dynamic-range (HDR) imaging method, in accordance with an embodiment. In order to extend the dynamic range of the sensor, per-pixel operational parameters, for example exposure and per-pixel gain codes, are presented to the photodetector array without using information from the currently imaged scene. As an example, these codes can be learned on-line or off-line by one or more artificially intelligent machine learning algorithms based on available image data and other information such as other current or past data from other sensors.

FIG. 4B depicts a closed-loop HDR imaging method, in accordance with an embodiment. In addition to the functionality described in FIG. 4A, pixel codes can also be dynamically adapted based on current and/or past scene(s) being imaged, such as intensity information for each pixel as well as any other information about the scene, available in the present or past frames or subframes.

Figure 5A:
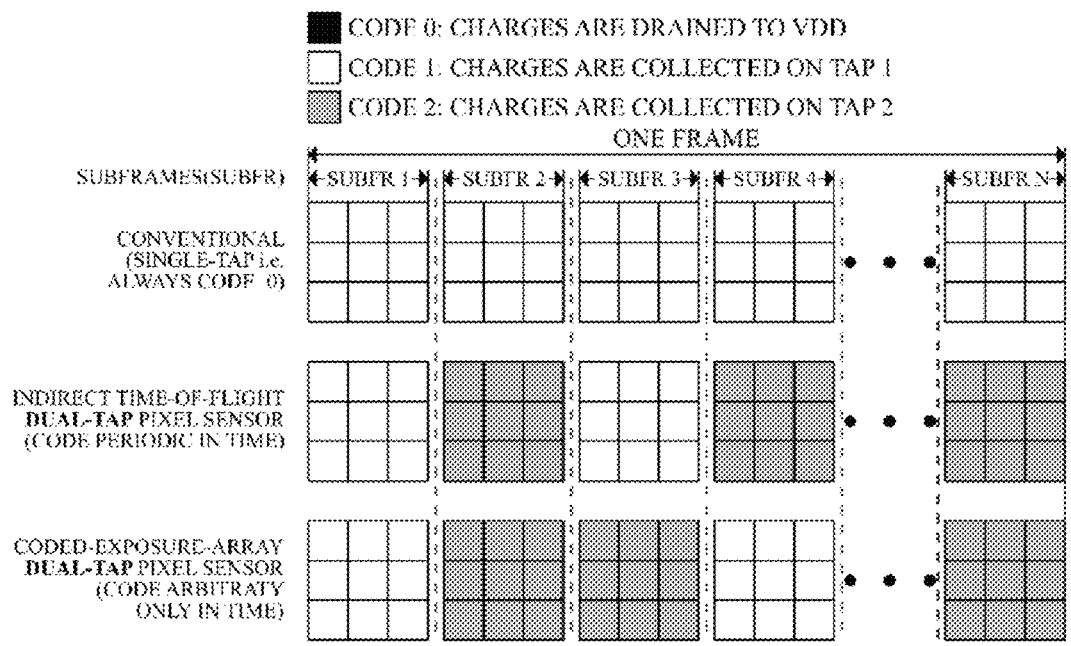
FIG. 5A is a diagram illustrating exposure techniques of conventional image sensors
Figure 5B:
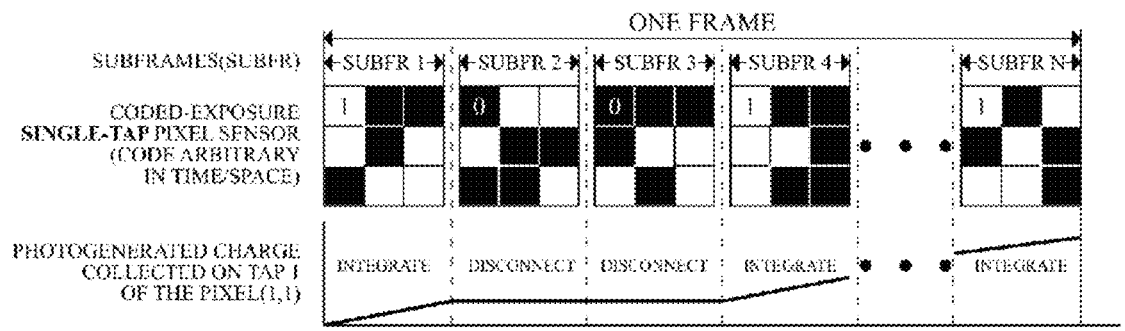
FIG. 5B is a diagram illustrating exposure techniques of coded-exposure-pixel (CEP) image sensors.

Programmability of operational parameters of each individual pixel using pixel codes, such as those for the exposure time and the signal gain, is an advantageous property of coded-pixel (CP) image sensors. Pixel codes in CP image sensors can have various types, formats, and representations. For example, FIG. 5B illustrates a diagram of an example of operation of coded-exposure-pixel (CEP) image sensors, which are a subclass of CP image sensors, where the exposure time for each pixel is programmable. Exposure techniques of conventional image sensors are depicted in FIG. 5A, which can be compared with CEP image sensors exposure techniques depicted in FIG. 5B for the example of a single-tap CEP image sensor. A tap is a node within a pixel that is used to collect a photo-generated electronic signal such as the photo-generated charge in this example. A tap can be implemented as a capacitor, MOS capacitor, trench capacitor, light-shielded floating diffusion node, light-shielded pinned diode, or by any other means. In FIG. 5B, the total exposure interval of one frame is divided into multiple (N) programmable sub-intervals, known as "subframes", for fine per-pixel temporal control of exposure, as controlled by digital coefficients, or "codes", sent to all, or a portion, of pixels in each subframe. In this example, the pixel has only one tap which can either collect charge or not, so a 1-bit binary code can be used to select one of these two functionalities in a given subframe. As a result, in each subframe, depending on whether the pixel code value is 1 or 0, the photo-generated signal is either integrated on the in-pixel tap or not, respectively. If the photo-generated charge is not integrated on the tap in a given subframe, it can either be drained, in the example of a single-tap pixel, or shifted to other taps, if more than one tap is available in a pixel, as described herein.

Figure 6A:
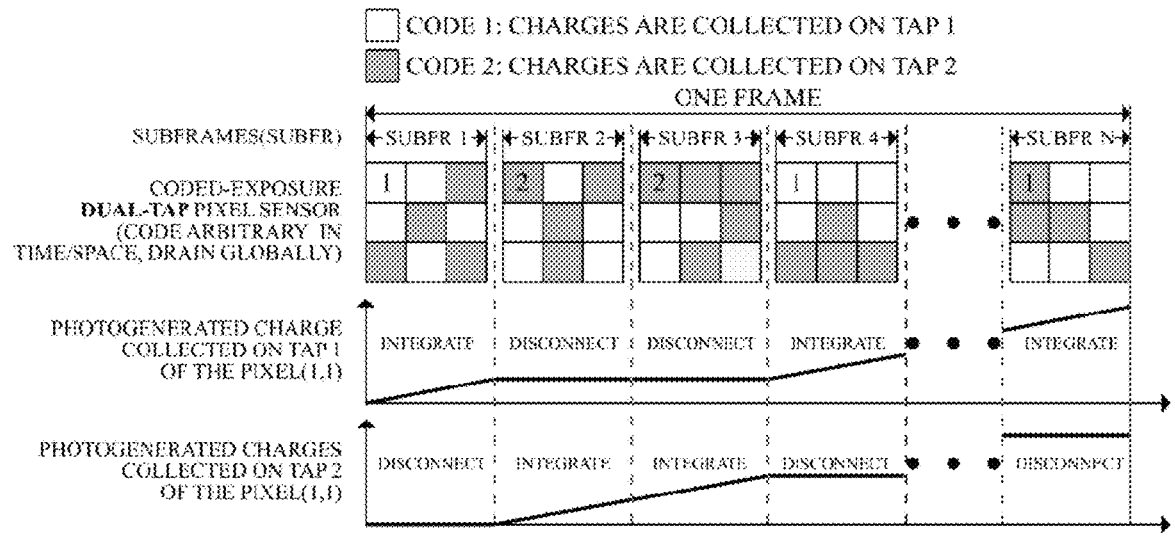
FIG. 6A is a diagram depicting example exposure functionality of dual-tap CEP image sensors where the two taps are controlled by arbitrary binary codes.
Figure 6B:
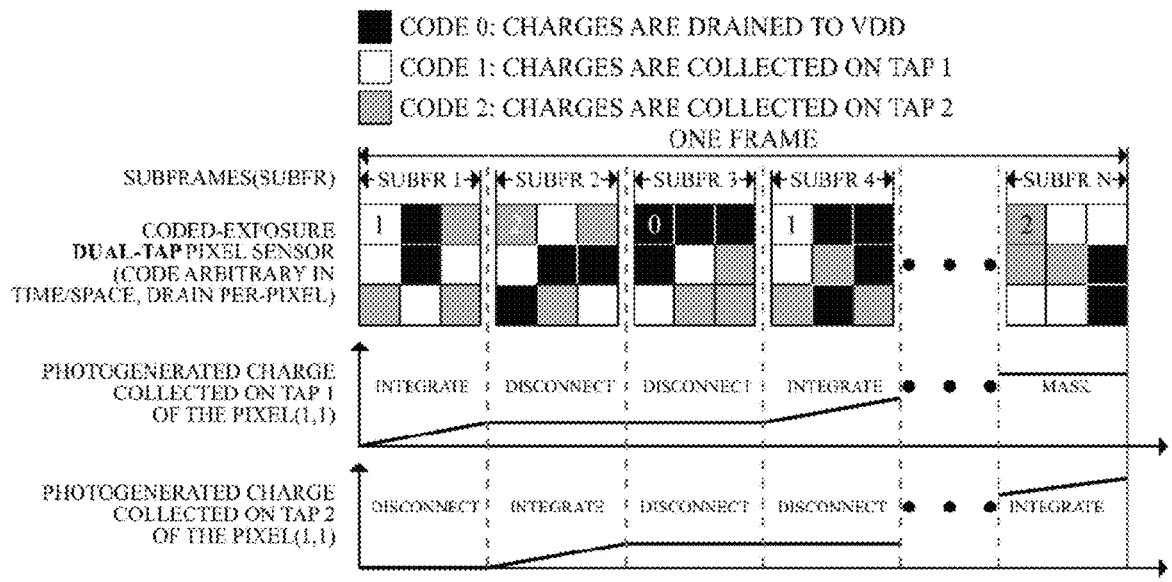
FIG. 6B is a diagram depicting example exposure functionality of a dual-tap CEP image sensor where two buckets are controlled by fully arbitrary binary codes.
Figure 6C:
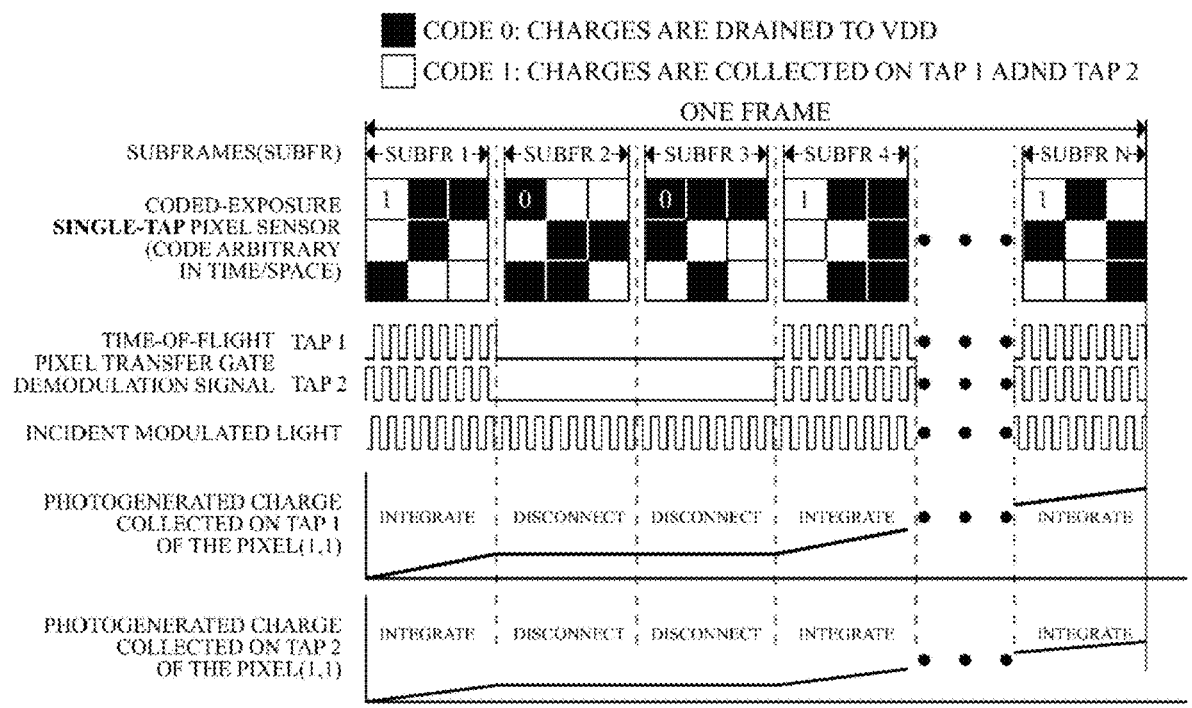
FIG. 6C is a diagram depicting example exposure functionality of indirect time-of-flight (iToF) pixels controlled by two complementary one-bit binary codes that either demodulates a photo-generated charge or drains it.

FIGS. 6A to 6C shows example exposure functionality of CEP image sensors for pixels with two or more taps per pixel. This example depicts only two taps for ease of illustration. FIG. 6A depicts exposure functionality of dual-tap CEP image sensors where the two taps are controlled by arbitrary binary codes; which in this example are complementary 1-bit binary numbers for the two taps. A 1-bit binary code (taking values 0 or 1) can represent either code 1 or code 2, corresponding to charge accumulation on taps 1 and 2, respectively. As there is no representation for code 0, this generally does not allow for per-pixel programmable photodetector charge draining in individual subframes, but allows for global charge draining for all pixels at the same time. In this example, only a single-bit binary code per pixel is required resulting in a compact pixel implementation. FIG. 6B depicts an example of exposure functionality of the dual-tap CEP image sensor where the two buckets are controlled by fully arbitrary binary codes (i.e., not necessarily complementary). This allows for per-pixel programmable photodetector charge draining in individual subframes but requires more than one bit to represent the pixel code. In this example, three states are needed, codes 0, 1, 2, as depicted in FIG. 6B. This requires a two-bit binary code which encodes up to four states. The remaining unused fourth state can be utilized for in-pixel programmable gain control as described below for the coded-gain pixel (CGP) architecture. FIG. 6C depicts an example of per-pixel coding for an indirect time-of-flight (iToF) pixel. In iToF sensing or imaging, two taps are required to demodulate the photo-generated signal, as needed to estimate the distance to the scene. The example in FIG. 6C illustrates how such a pixel can be selectively turned on and off, using codes 1 and 0, respectively. This means that photo-generated signal demodulation takes place when pixel receives code 1, and no demodulation happens when the pixel receives code 0. Light demodulation in various demanding conditions, such as in presence of strong background illumination, poses challenges that are addressed in this invention by increasing the dynamic range of the pixel, including for example the iToF pixel architecture.

Figure 7A:
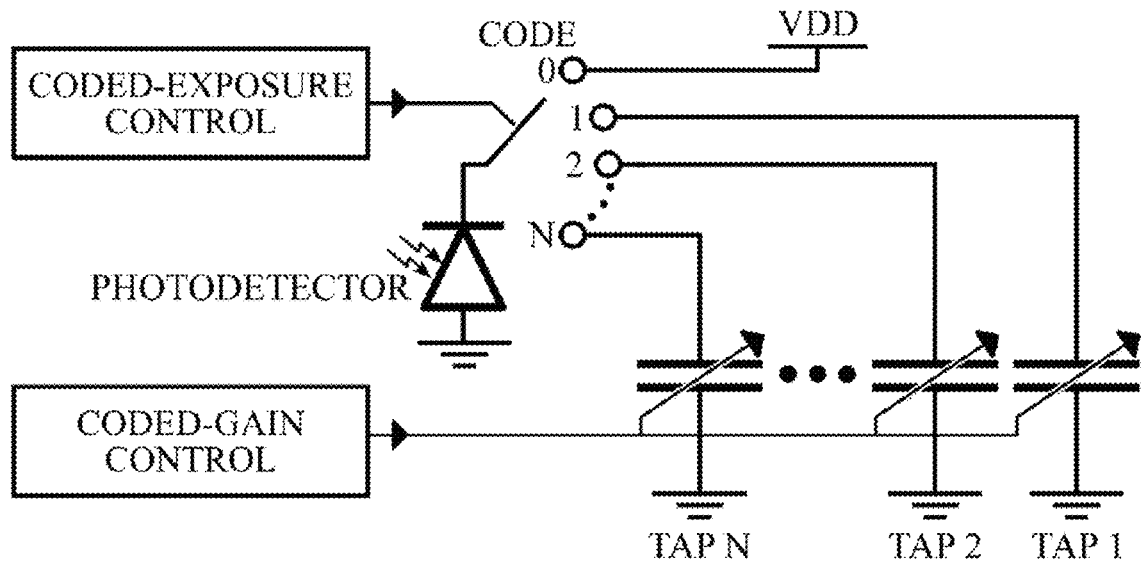
FIG. 7A is a circuit diagram of an example of a coded-pixel (CP) pixel architecture showing a plurality of taps and including functionality of both coded-exposure pixels (CEP) and coded-gain pixels (CGP)

Each pixel, or group of pixels, in a CP imager pixel can have its own programmed operational parameters using arbitrary temporal codes for each pixel or group of pixels. For example, operational parameters can include exposure time, in the case of CEP architecture, or signal gain, in the case of CGP architecture. FIG. 7A depicts an example coded-pixel (CP) pixel architecture that combines both per-pixel coded-exposure pixel (CEP) and per-pixel coded-gain pixel (CGP) architectures. In a subframe, the photo-generated charge is transferred from the photodetector to one or more of the taps or drained to another node, for example VDD, as controlled by the pixel's exposure code. As such, within one frame, total photo-generated charge can be divided into smaller parts, one per subframe, and sorted among one of more taps. Each tap is symbolically represented as a capacitor that, for example, stores photo-generated charge transferred from the photodetector. The charge transfer timing and duration can be controlled by the per-pixel exposure code supplied to some or all pixels in some or all subframes. The signal gain can be symbolically represented by a variable-value property of the capacitor, as illustrated in FIG. 7A. This symbolical representation can be explained by the following example: the same-value photo-generated charge shifted onto two different-value capacitors results in different voltage on those capacitors and thus in a different signal gain. The size of each tap, for example of each capacitor, and thus the signal gain for each tap can be controlled by the per-pixel gain code supplied to some or all pixel in some or all subframes. The tap capacitance can be modulated, for example, by combining or binning several floating diffusion nodes together (one of which can be the drain node when not connected to a low impedance node), by connecting taps to additional capacitors, or by other approaches.

Figure 7B:
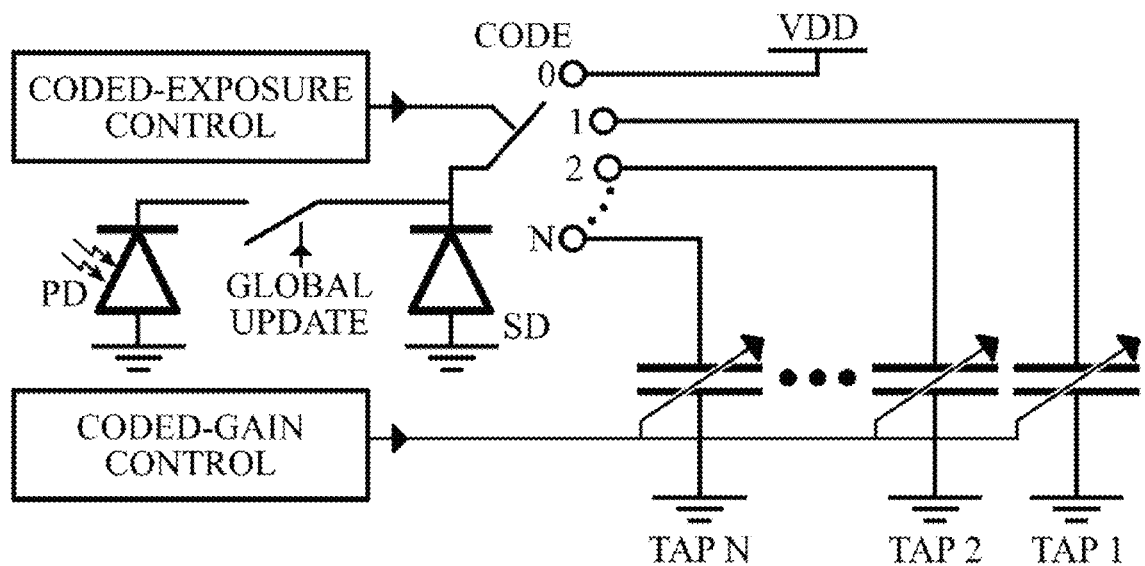
FIG. 7B is a circuit diagram of an example of a coded-pixel (CP) pixel architecture where an additional intermediate charge storage node is added.

FIG. 7B depicts another example of a CP pixel where an additional intermediate charge storage node is connected to diode SD. Such additional storage node provides, for example, a simpler overall pixel circuit and reduced overall pixel size. This node is symbolically represented as connected to a diode symbol, as in practice a storage diode is one example for implementing such storage node, but it is not limited to such. In this example the photo-generated charge is first shifted globally, synchronously for all pixels to the node SD, and then subsequently sorted among the one or more taps based on the supplied exposure code. The example architecture depicted in FIG. 7A is referred to as code-memory pixel (CMP) and the example architecture depicted in FIG. 7B is referred to as data-memory pixel (DMP). Both architectures can include various additional circuits within and outside of the pixel as needed to implement correlated double-sampling and/or double-sampling to reduce the effects of reset noise, flicker noise, electronic circuit offsets, and other low-frequency noises and offsets.

Figure 7C:
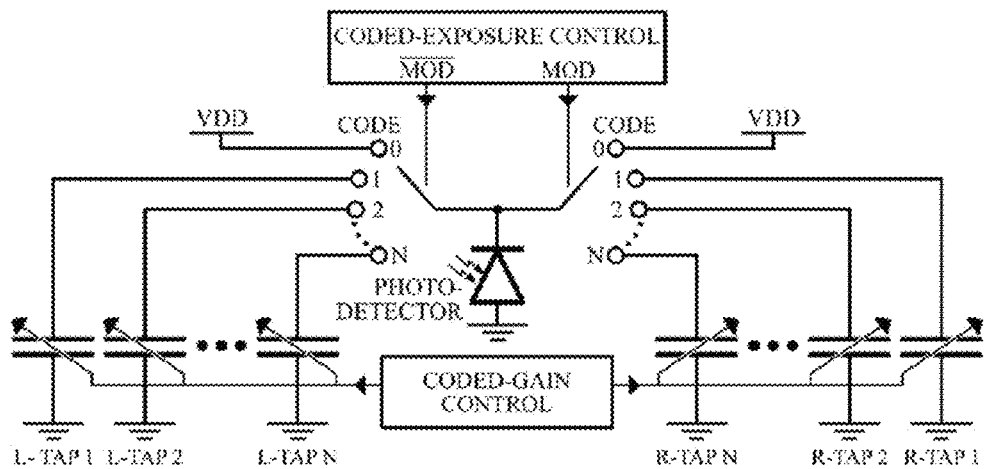
FIG. 7C is a circuit diagram of an example of a coded-pixel (CP) pixel architecture to sense time of flight of incoming photons from an illumination source to a photodetector, showing a plurality of taps and including functionality of both coded-exposure pixels (CEP) and coded-gain pixels (CGP)

FIG. 7C depicts an example of an indirect time-of-flight (iToF) CP pixel architecture that performs demodulation of the photo-generated charge into preselected tap pairs, as controlled by arbitrary exposure codes. The architecture combines both CEP and CGP functionalities, so the pixel gain is also programmable by varying charge storing capacitance values. In a subframe, the photo-generated charge is demodulated on a pair of equal-index taps, using signal MOD and its complementary signal $\overline{MOD}$. For example, the non-zero code, i, in a given subframe selects a pair of taps R-TAP i and L-TAP i, one on each side, as shown in FIG. 7C. In that subframe, the photo-generated charge is collected on the tap on the right side, R-TAP i when signal MOD is asserted and the photo-generated charge is collected on the tap on the left side, L-TAP i when the signal $\overline{MOD}$ is asserted.

Figure 7D:
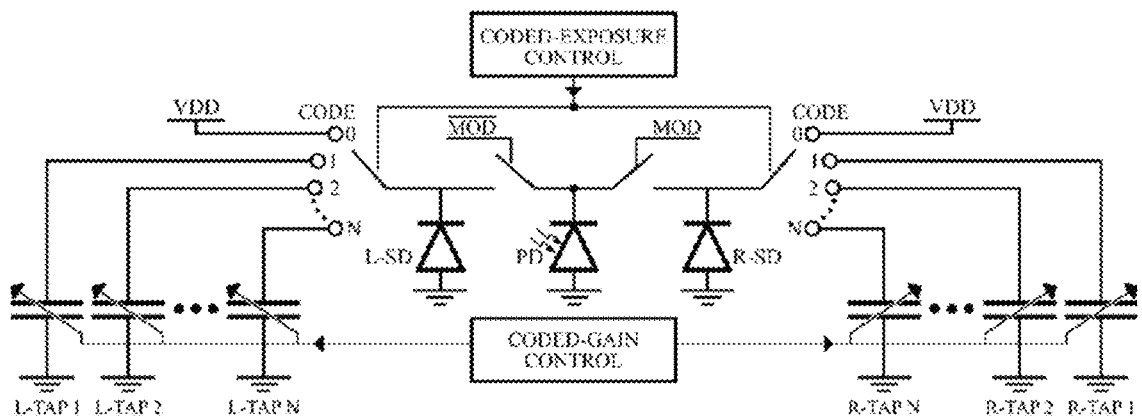
FIG. 7D is a circuit diagram of an example of a coded-pixel (CP) pixel architecture to sense time of flight of incoming photons from an illumination source to a photodetector, where additional intermediate charge storage nodes are added.

FIG. 7D depicts another example of an iToF CP pixel architecture where two additional intermediate charge storage nodes are introduced, on the top terminal of the two storage diodes L-SD and R-SD. These storage nodes are used to store the demodulated photo-generated charge, transferred from the photodetector PD using signals MOD and $\overline{MOD}$. In this example, the photo-generated charge is collected on the storage node on right side, R-SD when the signal MOD is asserted, and on the storage node on the left side, L-SD when the signal $\overline{MOD}$ is asserted. The non-zero code, i, in a given subframe, transfers the charges from the storage node to the corresponding-index tap or taps connected to the storage node.

Figure 8A:
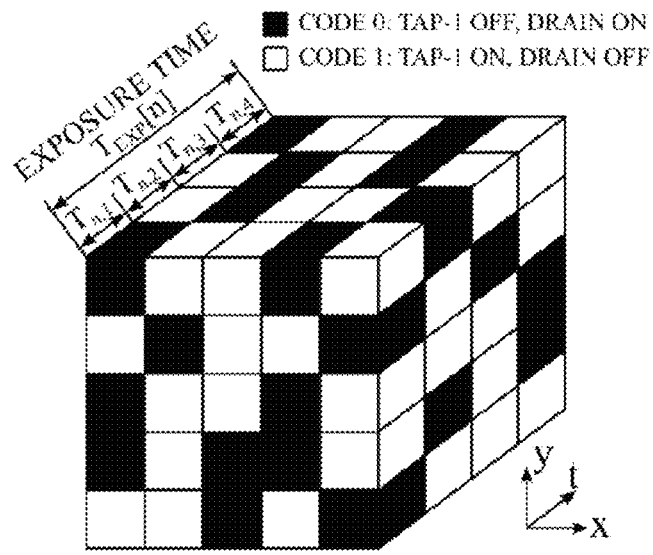
FIG. 8A is a space-time visualization of an example case of pixel exposure codes for a single-tap pixel.
Figure 8B:
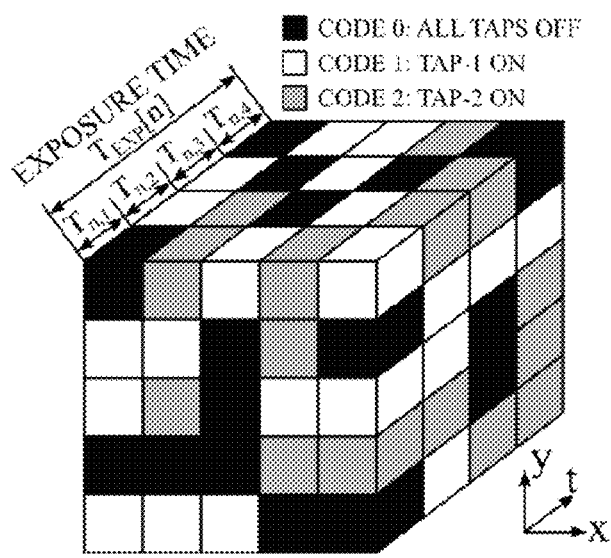
FIG. 8B is a space-time visualization of an example case of pixel exposure codes for a dual-tap pixel.

FIG. 8A depicts a space-time example visualization of arbitrary exposure codes for a pixel with one tap (i.e, the single-tap pixel), for N subframes within one frame (here N=4). Each of the spatial dimensions of $FRAME_x$ pixels by $FRAME_y$ pixels is shown (this example shows a 5×5 subframe example with $FRAME_x=5$ pixels and $FRAME_y=5$ pixels). The t-axis corresponds to time. In this example, there is one charge transfer per subframe. Code 0 means charge is drained; code 1 means charge is shifted to the storage node. Both the k-th subframe duration time, $T_k$, and the code for a given pixel in that subframe, $c_k$, can be chosen arbitrarily. The programmable exposure time for that pixel can thus be expressed as: $t_{exp}=\Sigma_{k=1}^{N} c_k T_k$. FIG. 8B illustrates an example visualization of arbitrary exposure codes for a pixel with 2 taps, for N subframes (here N=4). Each of the spatial dimensions are 5×5 pixels. Code 0 means charge is drained; code 1 means charge is shifted to the storage node 1, and code 2 means charge is shifted to the storage node 2.

Figure 8C:
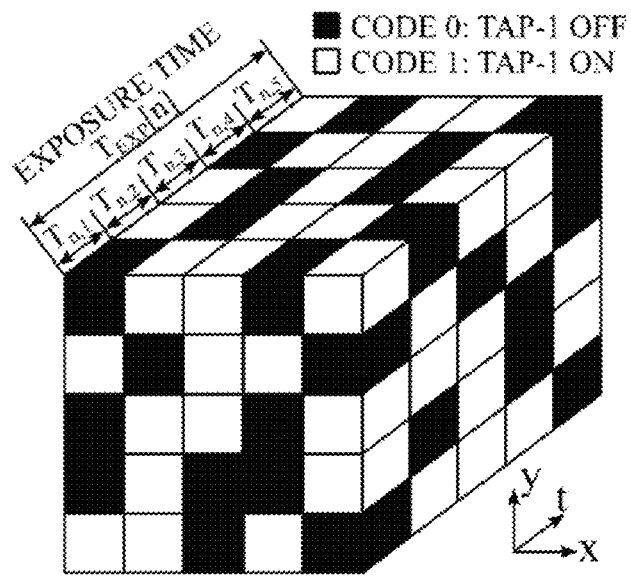
FIG. 8C is a space-time visualization of an example case of pixel exposure codes for a single-tap pixel, where both the subframes duration and number of subframes are dynamically adjusted for each frame, and where there are five subframes per frame in the n-th frame
Figure 8D:
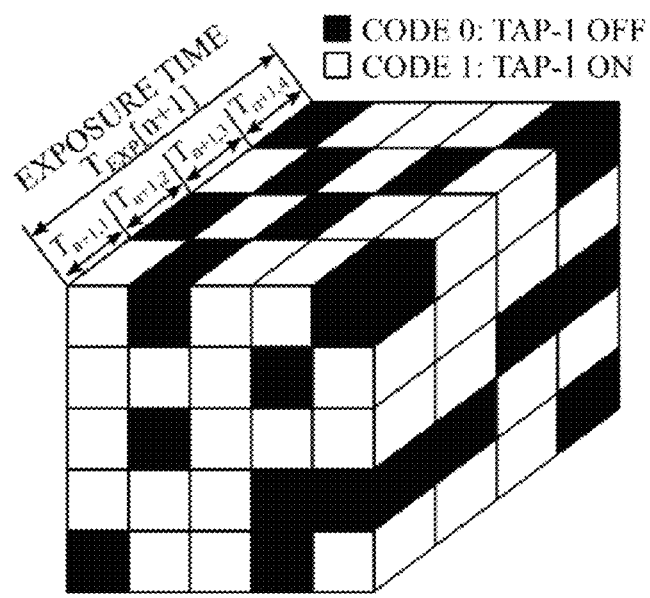
FIG. 8D is a space-time visualization of an example case of pixel exposure codes for a single-tap pixel, where both the subframes duration and number of subframes are dynamically adjusted for each frame, and where there are four subframes per frame in the (n+1)-th frame.

Variable arbitrary subframe duration and arbitrary subframe count is further illustrated in FIGS. 8C and 8D for the example of a single-tap pixel. A space-time map visualization of exposure codes for the pixel for frames n and n+1 is depicted, where the k-th subframe duration time, $T_k$, can be dynamically adjusted for each subframe. The number of subframes for each frame can also be dynamically adjusted. In this example, there are five subframes per frame in the n-th frame in FIG. 8C but four subframes per frame in the (n+1)-th frame in FIG. 8D. Thus, both the k-th subframe duration time, $T_k$, and the code for a given pixel in that subframe, $c_k$, can be chosen arbitrarily.

Examples of specific pixel exposure codes can be codes where the total time a pixel is exposed can be expressed as a function; for example, ramp function, exponential function, binary-weighted function, logarithmic function, or any other analytical or non-analytical function of time or any other parameter. Additionally, the arbitrary nature of pixel codes is advantageous in other ways. For example, in the case of dual-tap pixel exposure codes, exposure control can be defined more generally than just continuous exposure time. Specifically, if a tap code is 1 for k out of N subframes, then the exposure time of that tap is k. But there are k-choose-N distinct ways to implement that exposure time (for example, different ways to permute the 1's and 2's in the code sequence). These ways may not be equivalent when the scene is non-stationary. For example, for compressive HDR video, the exact subframes where pixel codes are 1 or 2 should be controlled, not just their total number. Also, the arbitrary nature of the pixel codes may be the most flexible representation of said codes, and is thus most suitable for both open-loop and closed-loop HDR imaging. In many cases, the present embodiments can be employed in both open-loop and closed-loop HDR imaging.

The example shown in FIGS. 8A to 8D illustrate the case of per-pixel programmable exposure. Similarly, the system 100 can implement per-pixel programmable gain. For example, photo-generated charge can be transferred to more than one capacitive node within a single subframe. Such a capacitive node can, for example, be floating diffusion nodes corresponding to one or more taps and a floating diffusion of drain node when it is not connected to a low impedance node. The overall tap well capacity can be increased, which reduces the pixel conversion gain. In other examples, additional gain control elements can be used, including as described with respect to the pixel circuit examples described herein.

Figure 9A:
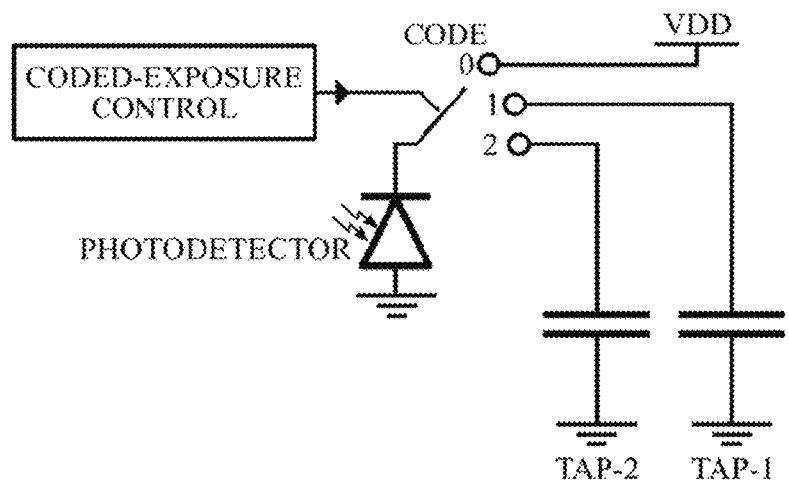
FIG. 9A are circuit diagrams for two examples of a dual-tap pixel for HDR imaging by using two exposure codes for the two in-pixel taps.
Figure 9A:
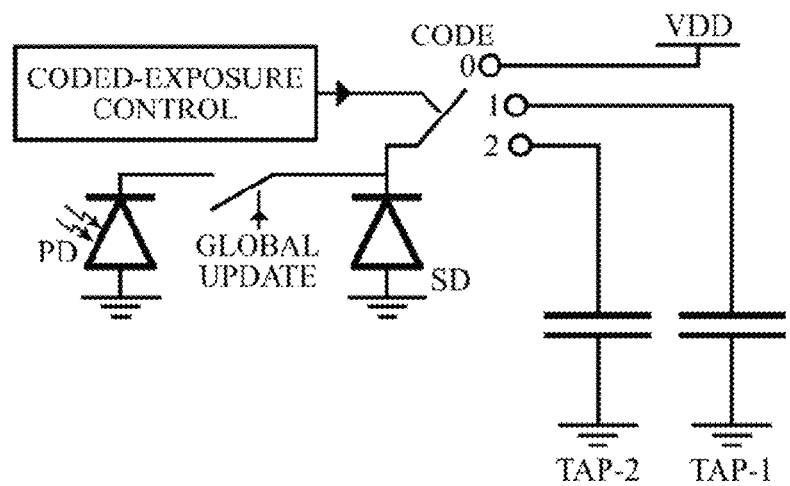
Figures 9B, 9C:
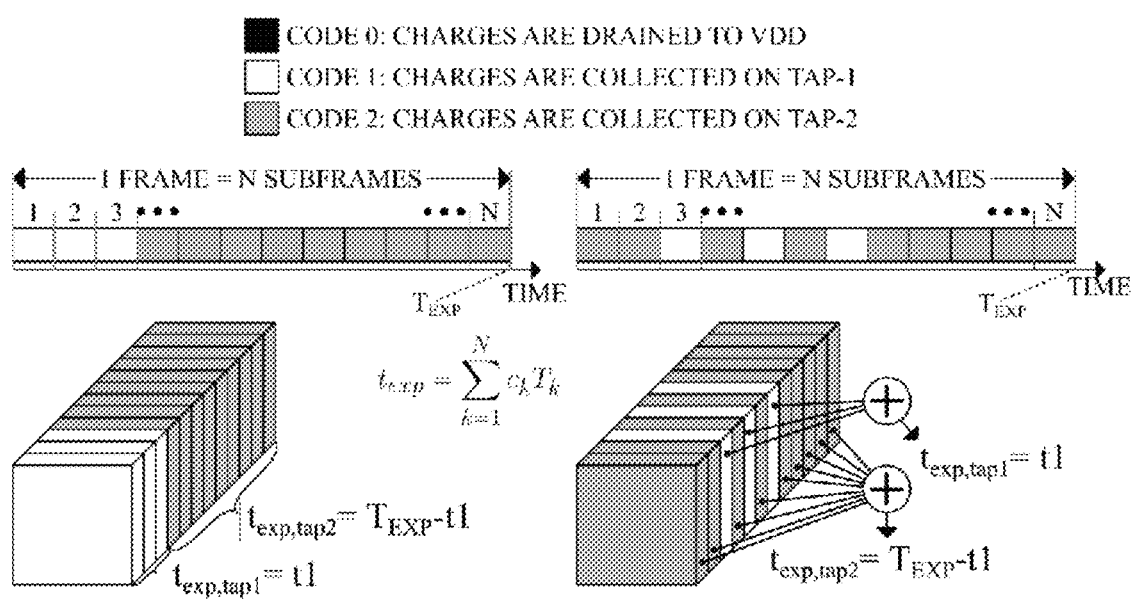
FIG. 9B is a diagram showing an example where the exposure periods for both taps are continuous and start from the beginning of the frame.
FIG. 9C is a diagram showing an example where the tap exposures are set by arbitrary temporal codes.
Figure 9D:
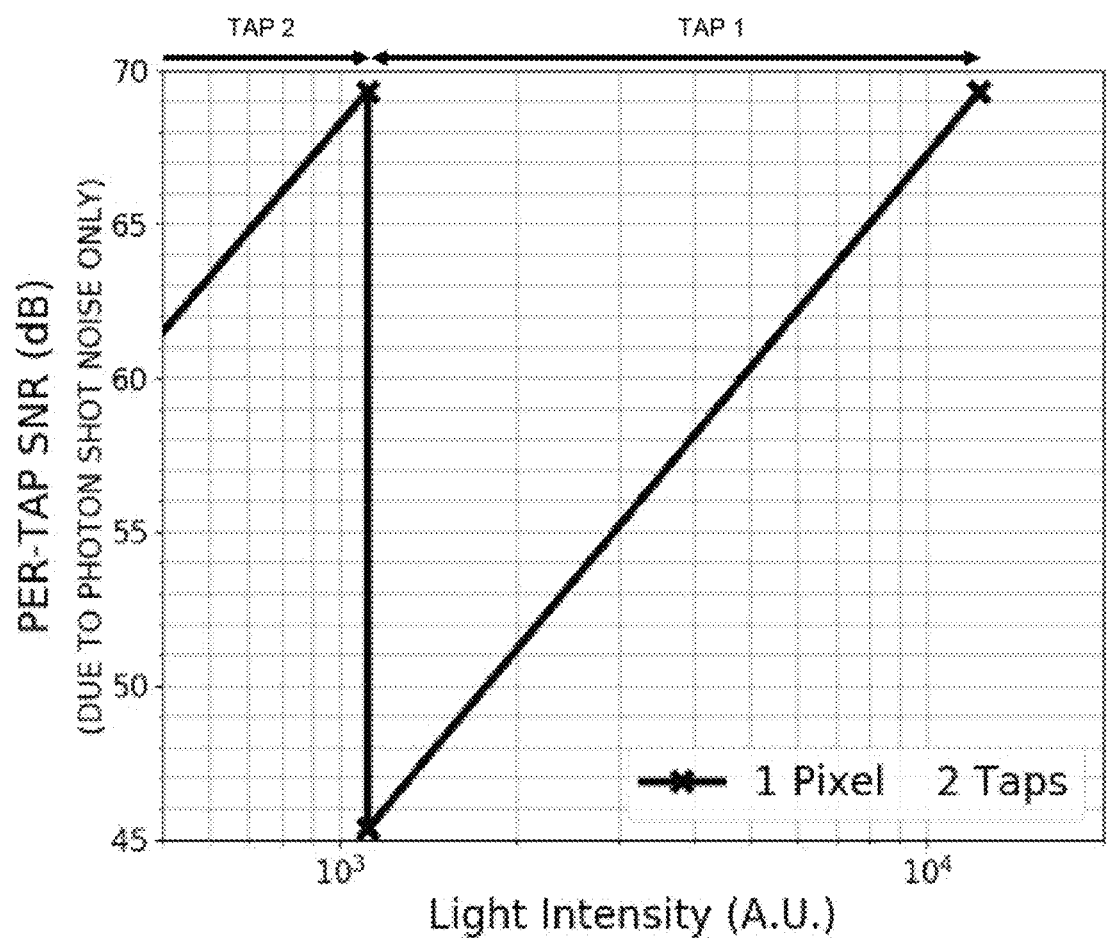
FIG. 9D is a plot of a simulated per-tap signal-to-noise ratio (SNR) versus incident light intensity for a single dual-tap pixel.

Coded-exposure-pixel (CEP) image sensors are a subclass of CP image sensors. CEP image sensor pixels with two or more taps can be used to perform HDR imaging by programming different exposure codes for their respective taps. FIG. 9A depicts examples of simplified diagrams for two dual-tap pixels that can be employed for such a purpose: the code-memory pixel (CMP) on top, and the data-memory pixel (DMP), which includes an extra charge storage node, on bottom. Each of the two taps in a pixel has an arbitrarily programmable exposure time, ranging from zero subframes to all subframes duration. In this example, two complementary binary codes are used in order to collect all photo-generated charge (i.e., for maximum signal). FIG. 9B depicts an example of the two codes, where the exposure periods for both taps are continuous and start from the beginning of the frame. FIG. 9C depicts another example where the tap exposure intervals are not necessarily contiguous. Any arbitrary temporal code can be programmed for each of the two taps in the pixel. The fully arbitrary nature of the code allows for additional degrees of freedom over non-arbitrary codes, for example for improvements in the dynamic range and/or other performance improvements. FIG. 9D depicts an example of a plot of the simulated signal-to-noise ratio (SNR) versus incident light intensity for each of the taps in a dual-tap pixel. For the purposes of an intuitive illustration, the only noise included in the example simulation depicted in FIG. 9D is photon shot noise. In other cases, further improvements in the SNR can be obtained by combining signals from multiple taps. The SNR plot reaches a local minimum when the light signal level is near the borders between the two light intensity subranges, which correspond to the two different taps. FIGS. 9A to 9D use the CEP architecture as an example, but the same concept can be applied to all CP pixel architecture types; for example, the coded-gain-pixel (CGP) pixel architecture or indirect time-of-flight (iToF) coded pixel architecture.

Figure 10A:
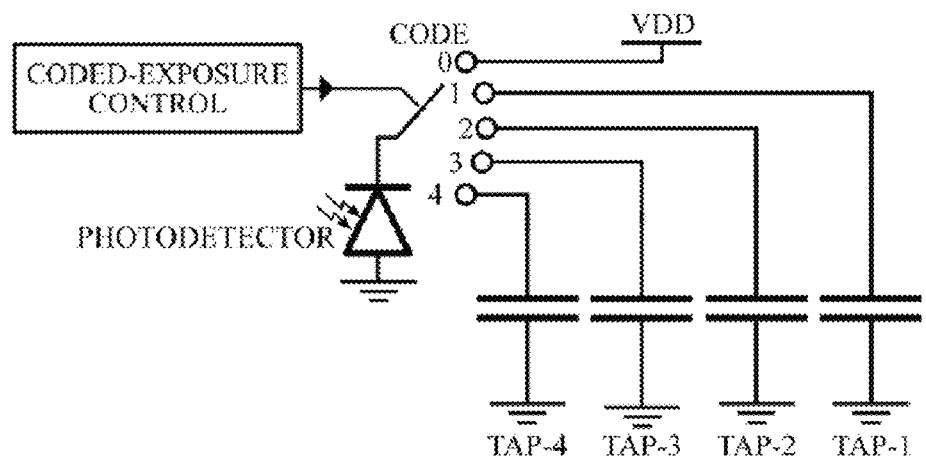
FIG. 10A are circuit diagrams for two examples of a four-tap pixel for HDR imaging by using four exposure codes for the four in-pixel taps.
Figure 10A:
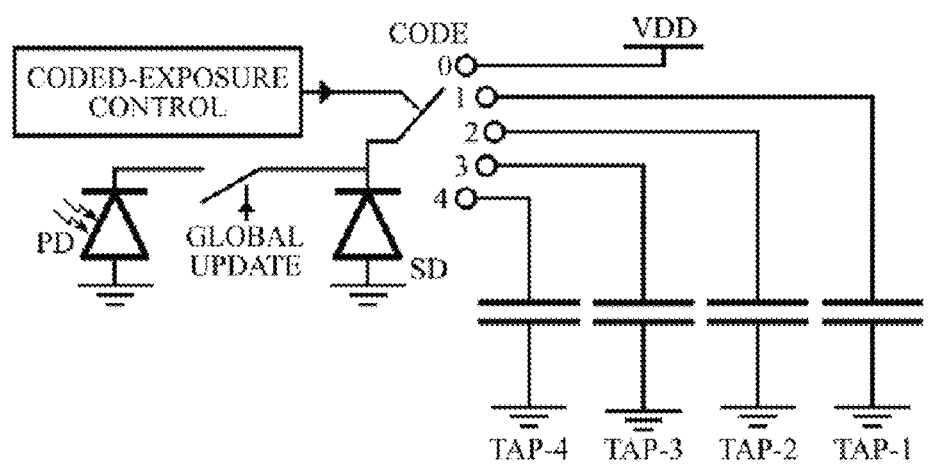
Figures 10B, 10C:
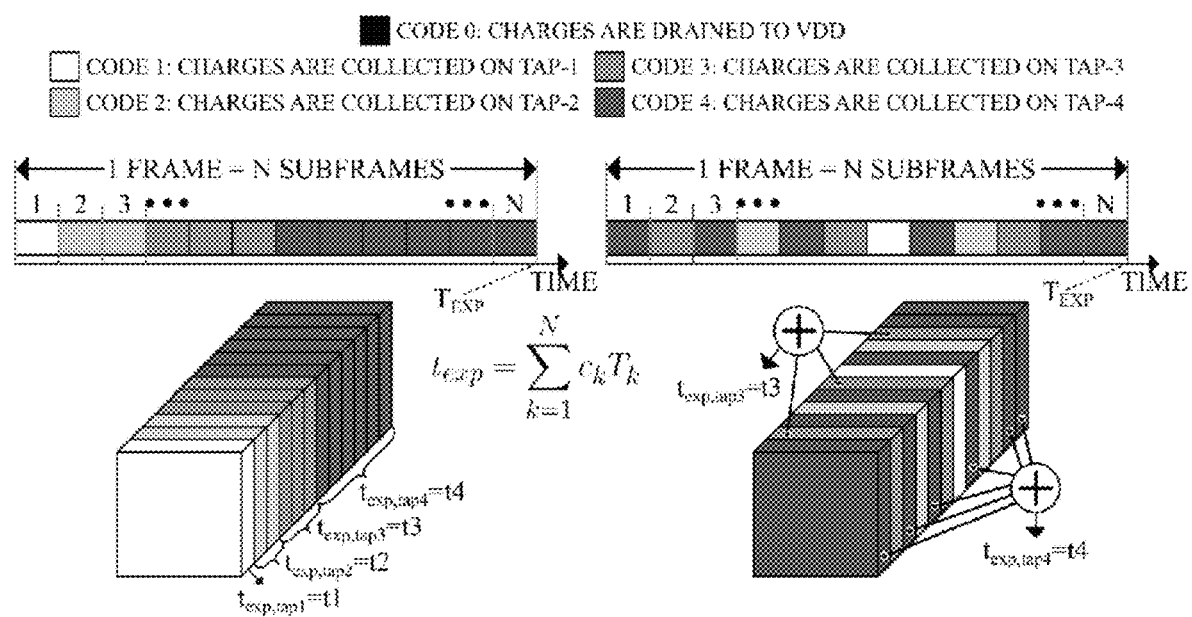
FIG. 10B is a diagram showing an example where the exposure periods for all taps are continuous and start from the beginning of the frame.
FIG. 10C is a diagram showing an example where the tap exposures are set by arbitrary temporal codes.
Figure 10D:
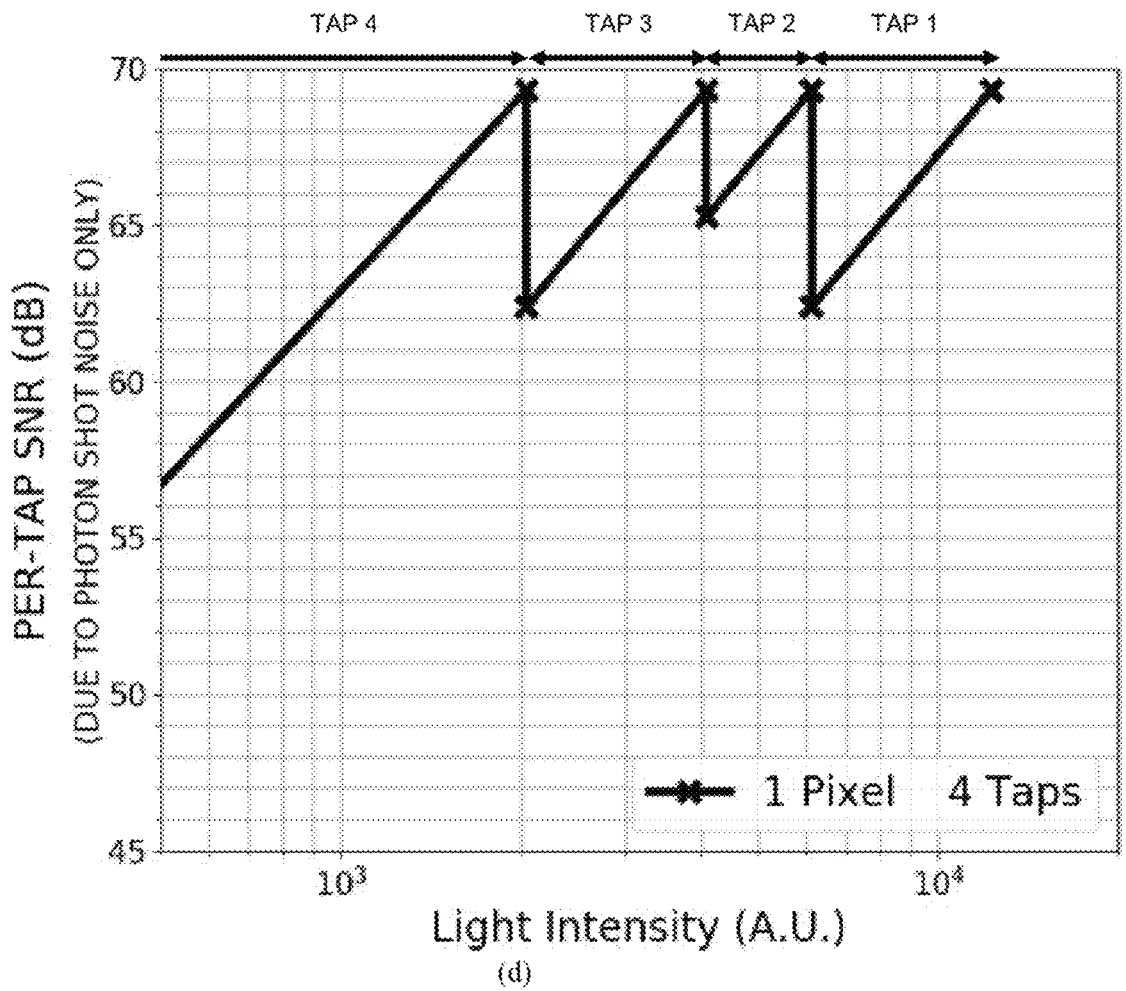
FIG. 10D is a plot of a simulated per-tap signal-to-noise ratio (SNR) vs incident light intensity for a single four-tap pixel.

FIG. 10A shows example diagrams of two four-tap pixels that can be employed for HDR imaging: CMP, on top, and DMP, on bottom, pixel architectures. Each of the four taps has an arbitrary programmable exposure time, ranging from zero subframes to all subframes duration. FIG. 10B depicts an example of four such codes, where the exposure intervals for all taps are contiguous and start from the beginning of the frame. FIG. 100 depicts another example where the tap exposure periods are controlled by arbitrary temporal codes. In this example, two complementary binary codes are used in order to collect all photo-generated charge (i.e., for maximum signal). FIG. 10D depicts an example of a plot of the simulated signal-to-noise ratio (SNR) versus incident light intensity for each of the taps in a four-tap pixel. For the purposes of clarity of illustration, the only noise included in this example simulation is the photon shot noise, and individual tap signals are not combined to increase SNR. FIG. 10D illustrates that the SNR degradation at the borders between light intensity subranges corresponding to different taps is less prominent due to the increased number of subranges (four versus two subranges in the previous example). FIGS. 10A to 10D illustrate the CEP architecture as an example; in further cases, it can be applied to other CP pixel architecture types, for example, the coded-gain-pixel (CGP) pixel architecture or indirect time-of-flight (iToF) coded pixel architecture.

Figure 11A:
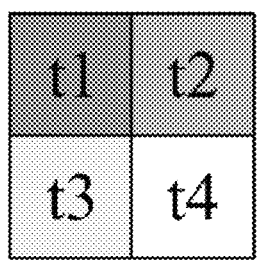
FIG. 11A is a diagram of a neighborhood of single-tap pixels of size $TILE_x$ pixels by $TILE_y$ pixels repeated across the pixel array.
Figure 11A:
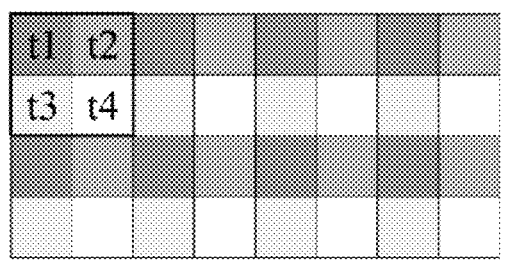
Figures 11B, 11C:
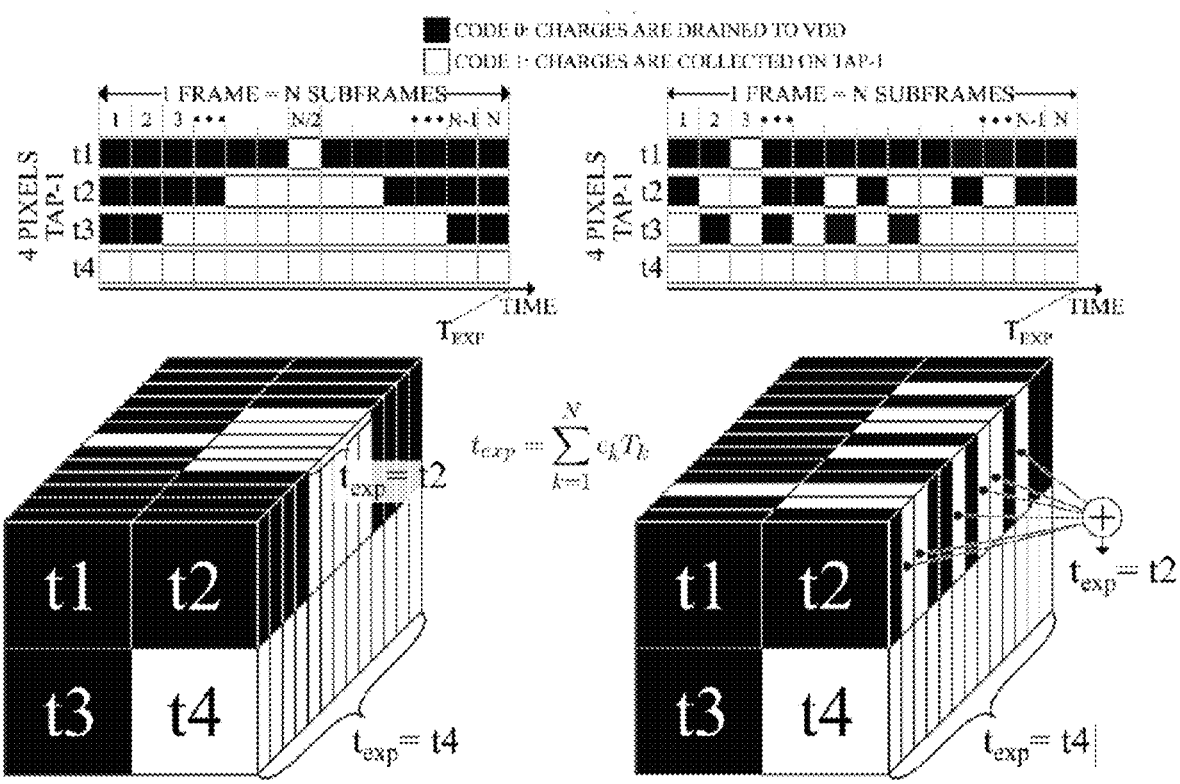
FIG. 11B is a diagram showing an example where exposure periods for all pixels are contiguous, centered at half the frame time.
FIG. 11C is a diagram showing an example of an arbitrary temporal code programmed for each of the pixels in the tile.
Figure 11D:
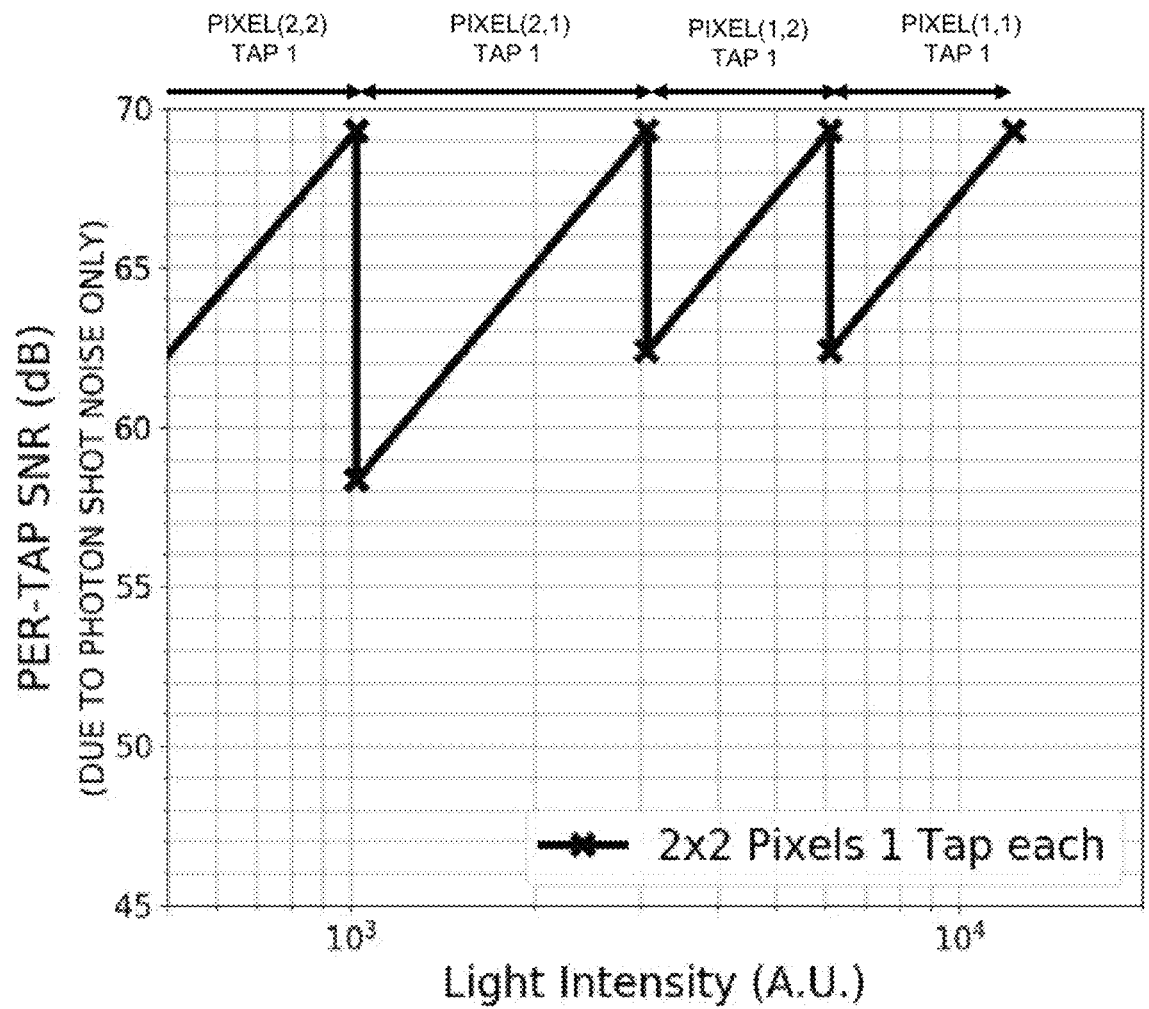
FIG. 11D is a plot of an example of simulated per-tap signal-to-noise ratio (SNR) versus incident light intensity for a neighborhood of four single-tap pixels.

The codes of CEP image sensor pixels can be used to group pixels into neighborhoods, for example spatial tiles, in order to trade spatial resolution for improved dynamic range. The system can perform this by using arbitrary-valued codes sent to each pixel, advantageously without the need for hard-coding or hard-wiring this grouping functionality in the image sensor schematic or layout. FIG. 11A illustrates an example of pixel codes that induce a $TILE_x$ by $TILE_y$ spatial organization of singe-tap pixels for $TILE_x=2$ and $TILE_y=2$, repeated across the pixel array. Each of the four pixels has an arbitrarily programmable exposure time, ranging from zero subframes to all subframes duration. FIG. 11B depicts an example of such four codes. In this case, the exposure intervals for all pixels are contiguous and are centered at the half-time of the frame, in order to reduce motion blur non-uniformity among differently-exposed pixels. An example of which is using four levels of exposure (1, N/3, 2N/3 and N, where N is the number of subframes) distributed over a 2×2 Bayer-RGB-like tile block that can then be demosaiced to obtain a higher dynamic range. FIG. 11C depicts another example where pixel exposure intervals are not necessarily contiguous. Any arbitrary temporal code can be programmed for each of the four pixels in the tile, allowing for additional degrees of freedom; for example, for further improved dynamic range and/or other performance improvements. FIG. 11D depicts an example of a plot of the simulated signal-to-noise ratio (SNR) versus incident light intensity for each of the four taps. For the purposes of clarity of illustration, the only noise included in this simulation is the photon shot noise and individual tap signals are not combined to increase SNR. FIG. 11D illustrates that the SNR reaches local minima for the light signal levels near the borders between light intensity subranges, which correspond to different pixels. FIGS. 11A to 11D illustrate the CEP architecture as an example; in further cases, it can be applied to other CP pixel architecture types, for example, the coded-gain-pixel (CGP) pixel architecture or indirect time-of-flight (iToF) coded pixel architecture.

Figure 12A:
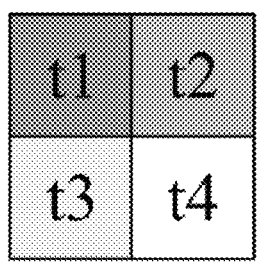
FIG. 12A is a diagram of a neighborhood of dual-tap pixels of size $TILE_x$ pixels by $TILE_y$ pixels repeated across the pixel array.
Figure 12A:
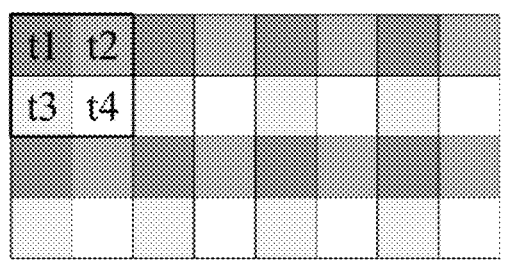
Figures 12B, 12C:
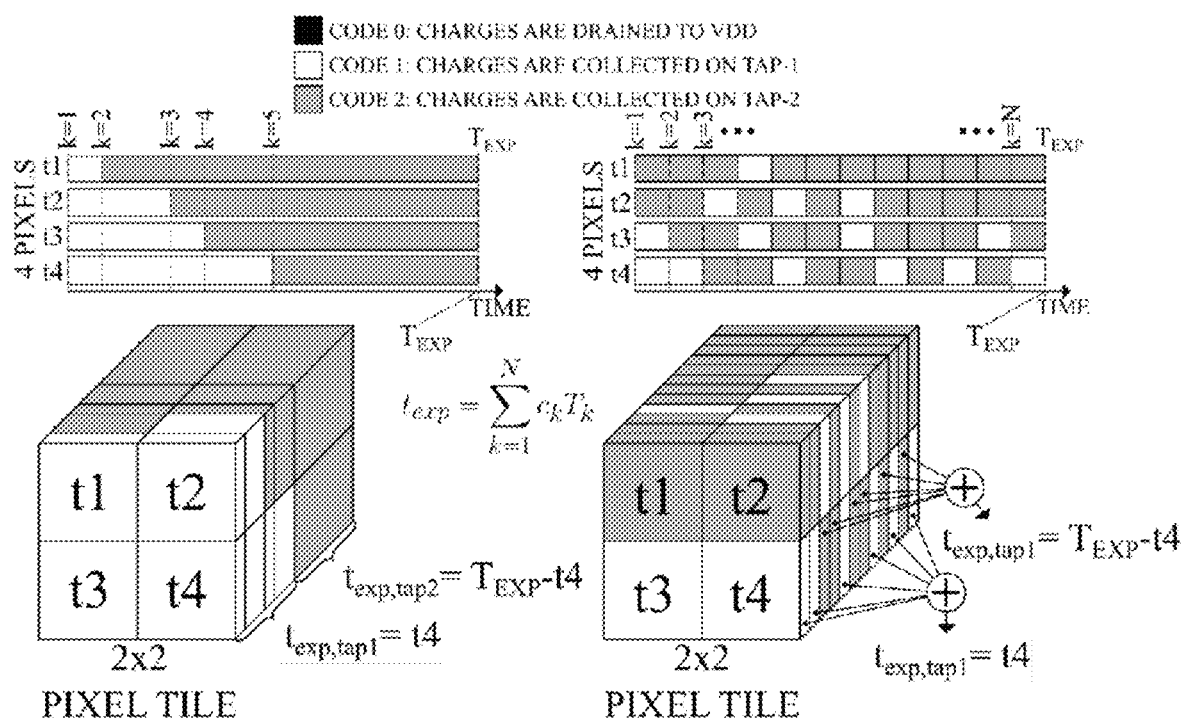
FIG. 12B is a diagram showing another example where exposure periods for all pixels are contiguous, starting at the beginning of the frame.
FIG. 12C is a diagram showing another example of an arbitrary temporal code programmed for each of the pixels in the tile.
Figure 12D:
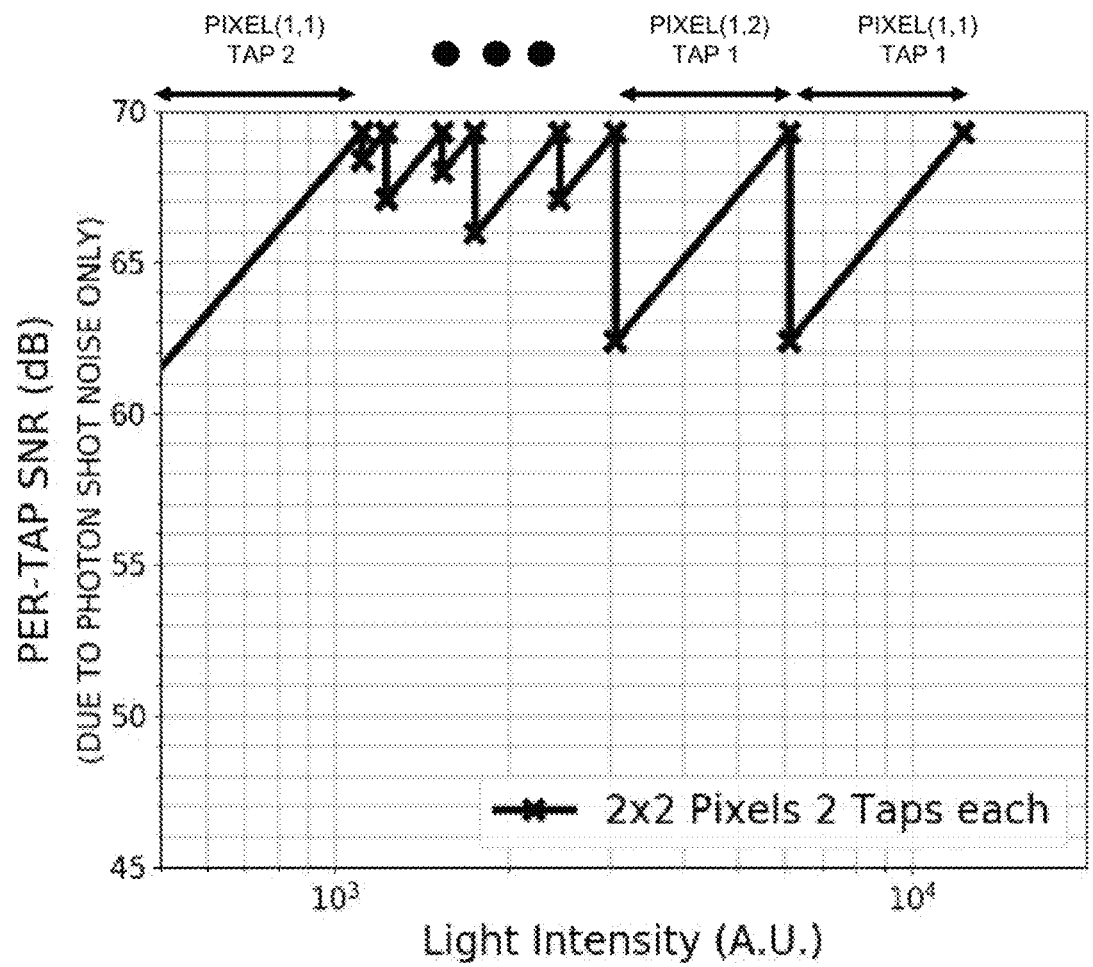
FIG. 12D is a plot of another example of simulated per-tap signal-to-noise ratio (SNR) versus incident light intensity for a neighborhood of four single-tap pixels.

FIG. 12A illustrates an example of pixel codes that induce a $TILE_x$ by $TILE_y$ spatial organization of dual-tap pixels for $TILE_x=2$ and $TILE_y=2$, repeated across the pixel array. Each of the two taps in each of the four pixels have arbitrarily-programmable exposure intervals, ranging from zero subframes to all subframes duration. For example, t1 through t4 are the exposure time intervals of the first tap of the four pixels in the 2×2 pixel tile. FIG. 12B depicts an example of eight such codes, where the exposure intervals for all pixels are contiguous and start from the beginning of the frame. FIG. 12C depicts another example where pixel exposure intervals can be controlled by any arbitrary temporal code for each of the eight taps of the four pixels in the tile. FIG. 12D illustrates that the SNR degradation at the borders between light intensity subranges corresponding to different taps is less prominent due to the increased number of subranges (eight subranges versus four subranges in the example of FIG. 11A to 11D. FIGS. 12A to 12D illustrate the CEP architecture as an example; in further cases, it can be applied to other CP pixel architecture types, for example, the coded-gain-pixel (CGP) pixel architecture or indirect time-of-flight (iToF) coded pixel architecture.

In some cases, other measures can be taken to enable snapshot compressive acquisition of HDR video. In some low dynamic range snapshot compressive video acquisition approaches, individual single-tap pixels are assigned distinct exposure intervals in order to sample the spatio-temporal cube depicted in FIG. 8A. These intervals are chosen in such a way that reconstruction of the full spatio-temporal cube, ie., of a complete low-dynamic-range video sequence, can be computed from just one captured image with the help of an appropriate decoding algorithm. To enable acquisition of HDR video from a single snapshot, the codes assigned to CEP pixels can be chosen so that both the exposure intervals and the total exposure time varies among pixels and among taps within a pixel, as depicted in FIG. 8B. These codes can be assigned individually to each pixel in the pixel array in order to maximize the quality of the reconstructed HDR video frames. Alternatively, the pixel array can be organized into $TILE_x$ by $TILE_y$ neighborhoods, with each neighborhood receiving the same codes, for example the codes in FIG. 8B. The HDR video is then obtained by use of an appropriate decoding algorithm. The same concept can be applied to other CP pixel architecture types, such as the coded-gain-pixel (CGP) pixel architecture or indirect time-of-flight (iToF) coded pixel architecture.

The present embodiments can be applied, in most cases, to both open-loop and closed-loop HDR imaging, as depicted in FIG. 4. In open-loop operation, the pixel codes and decoding algorithms can either be inputted manually or computed from prior training data in order to maximize HDR performance in a given application. In closed-loop operation, the pixel codes can be computed adaptively to reduce saturation and/or increase SNR in the scene being imaged or, more generally, to improve application-specific imaging performance. Example applications include high-speed imaging, object detection, tracking, recognition, robotic navigation, autonomous driving, 3D reconstruction, and the remote monitoring and analysis of the electrical grid by imaging AC light bulbs (e.g., including but not limited to measuring grid phase and/or frequency, recognizing bulb type, etc). Adaptive computation of said pixel codes can be implemented in any suitable way; for example, (1) a manually-inputted function that maps the previous video frame or sequence of video frames to codes for the full pixel array, (2) a manually-inputted control algorithm, such as a PID controller, and (3) a learned control algorithm that is based on prior training data. Similar considerations can also be applied to the decoding algorithm. An example of a manually-inputted code generation function is described herein.

Figure 13:
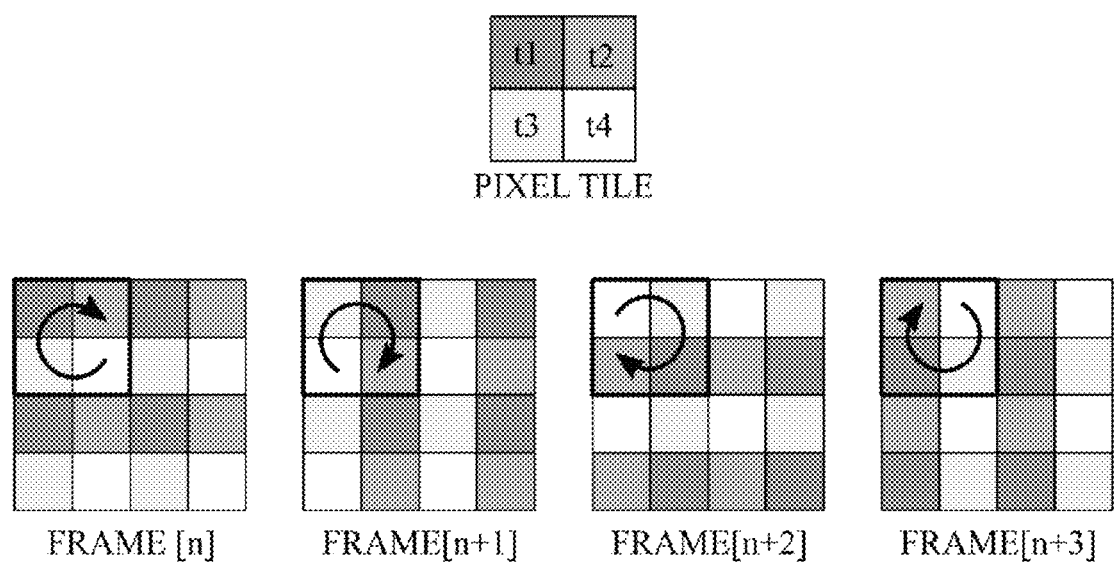
FIG. 13 is an example of a 2×2 single-tap pixel tile where respective exposure codes are rotated and repeated over four frames.

In some cases, additional measures can be taken to reduce artifacts such as motion blur non-uniformity or inter-frame variability when more than one CP image sensor pixel is used to construct a single HDR pixel value in a video frame or in an HDR image obtained by burst-mode acquisition. For example, in a CEP image sensor, this can be done by periodically swapping the exposure codes among multiple pixels in the same spatial neighborhood, such as a pixel tile of the size 2×2 pixels or of any other size. FIG. 13 illustrates an example of a 2×2 single-tap pixel array, where the exposure codes for four subsequent frames are rotated by 90 degrees four times. This allows each pixel to be exposed for the same average time over the duration of four frames, equalizing the blur due to motion in the imaged scene that occurs during these frames. FIG. 13 depicts the CEP architecture as an example, but the same concept can be applied to other CP pixel architecture types, such as the coded-gain-pixel (CGP) pixel architecture. Exposure codes can be used to programmably impose a TILEx by TILEy spatial organization of a neighborhood of single-tap or multi-tap pixels, which is repeated spatially across the pixel array. Each of the pixels in the neighborhood then has arbitrarily-programmable exposure interval(s). The exposure codes can be reorganized within the pixel neighborhood in each subsequent frame so that over TILEn frames, each pixel has been exposed for the same or approximately the same time interval(s). This can be represented as a small space-time volume of the dimensions of TILEx by TILEy by TILEn pixels in the video that samples exposures both spatially and across time, enabling a form of burst-mode demosaicking. In the case of the CGP architecture, the average pixel gain will generally be the same for all pixels after TILEn frames.

The present embodiments can be used to programmably adjust dynamic range, operating range, and/or gamut of CP pixel sensors fitted with RGB color, multi-spectral, polarization, neutral density, and/or other assorted filter arrays. For example, a CEP sensor's color gamut can be shifted and/or expanded by choosing pixel codes that independently adjust the total exposure time of the R-channel, G-channel, and/or B-channel pixels, respectively. These codes can be specified a priori or be scene-dependent and tile-dependent, for open-loop or closed-loop operation, respectively, as depicted in FIG. 4. The same concept can be applied to other CP pixel architecture types, such as the coded-gain-pixel (CGP) pixel architecture. The same concept can be applied to sensors fitted with attenuating, diffusing and/or diffractive sensor masks, and/or metal lenses.

Figure 14:
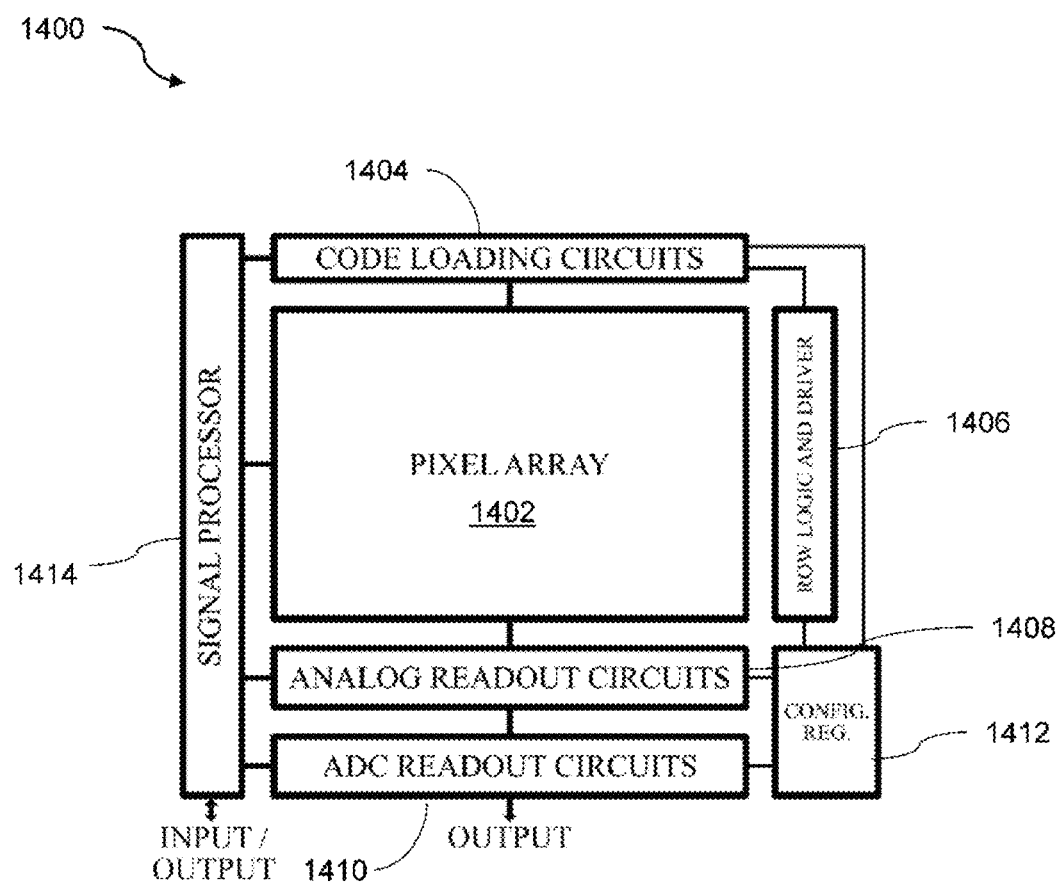
FIG. 14 is a diagram of an example of a top-level system block diagram of a CP image sensor.

FIG. 14 depicts an example of a block diagram of a CP image sensor 1400. Any suitable combination of the depicted functional blocks can be used. The "PIXEL ARRAY" 1402 in the image sensor 1400 includes an array of photodetectors. The image sensor 1400 also includes "CODE LOADING CIRCUITS" block 1404 and "ROW LOGIC AND DRIVER" block 1406 to generate and deliver the per-pixel-exposure codes and per-pixel-gain codes. The pixel outputs are read out using "ANALOG READOUT CIRCUITS" 1408 and "ADC READOUT CIRCUITS" 1410. "CONFIG. REG." block 1412 is used to generate on-chip control signals. The "SIGNAL PROCESSOR" 1414 perform various computing functions, for example: open-loop and closed-loop pixel code generation; receiving and reorganizing pixel codes; decompressing pixel codes; receiving the output images or video from the image sensor such as one or more frames of subframes, or one or more regions of interest in one or more frames or subframes; generating pixel codes based on this and other information supplied to the signal processor; HDR image reconstruction, and/or any other type of image or video processing done on the output of the image sensor readout circuits. Additional blocks may include, for example: devices, structures, and circuits for front-side and back side illumination such as microlenses, color filters, deep or shallow trenches for electrical and optical isolation, attenuating, diffusing and/or diffractive sensor masks, metal lenses, pixel anti-blooming control circuitry, pixel binning circuits, correlated double-sampling circuits, double-sampling circuits, averaging circuits, circuits for calibrating for fixed pattern noise, color correction and enhancement circuits, programmable-gain control circuits, active illumination control circuits, time-of-flight imaging control circuits, or any other pixel control circuitry or module implemented either on the same integrated circuit (herein referred to as the chip) or the same wafer, or another integrated circuit or wafer, or in a stacked wafer or stacked die or single-package or single-module or multi-package or multi-module configuration.

Other functional blocks can be included either on the same image sensor chip or off the image sensor chip, such as for example on another stand-alone chip, or on another chip bonded to the image sensor chip in a stacked-die or stacked-wafer configuration or implemented in any other hardware or software. These additional functional blocks can include, for example: a digital or analog signal processor (or any other computing device that can be used for the purpose of output video processing), a pixel code generator, code compression, code delivery, and/or code decompression, a temperature sensor; temperature-based control circuit, temperature control circuit, ambient light sensor, artificial light sensor including sensors that measure the amplitude and/or phase of indoor and outdoor artificial lighting; artificial light control module and circuits that control artificial light indoors and/or outdoors; active illumination source such as a light projector, a laser light source, LED light source, color light source, multispectral light source, hyperspectral light source, or any other light source used to illuminate the scene or the surrounding environment, or any other sensor and control block; optical elements or modules such as lenses, light modulators, mirrors, digital micro-mirrors devices (DMDs), or color filters.

Figures 15A, 15B, 15C:
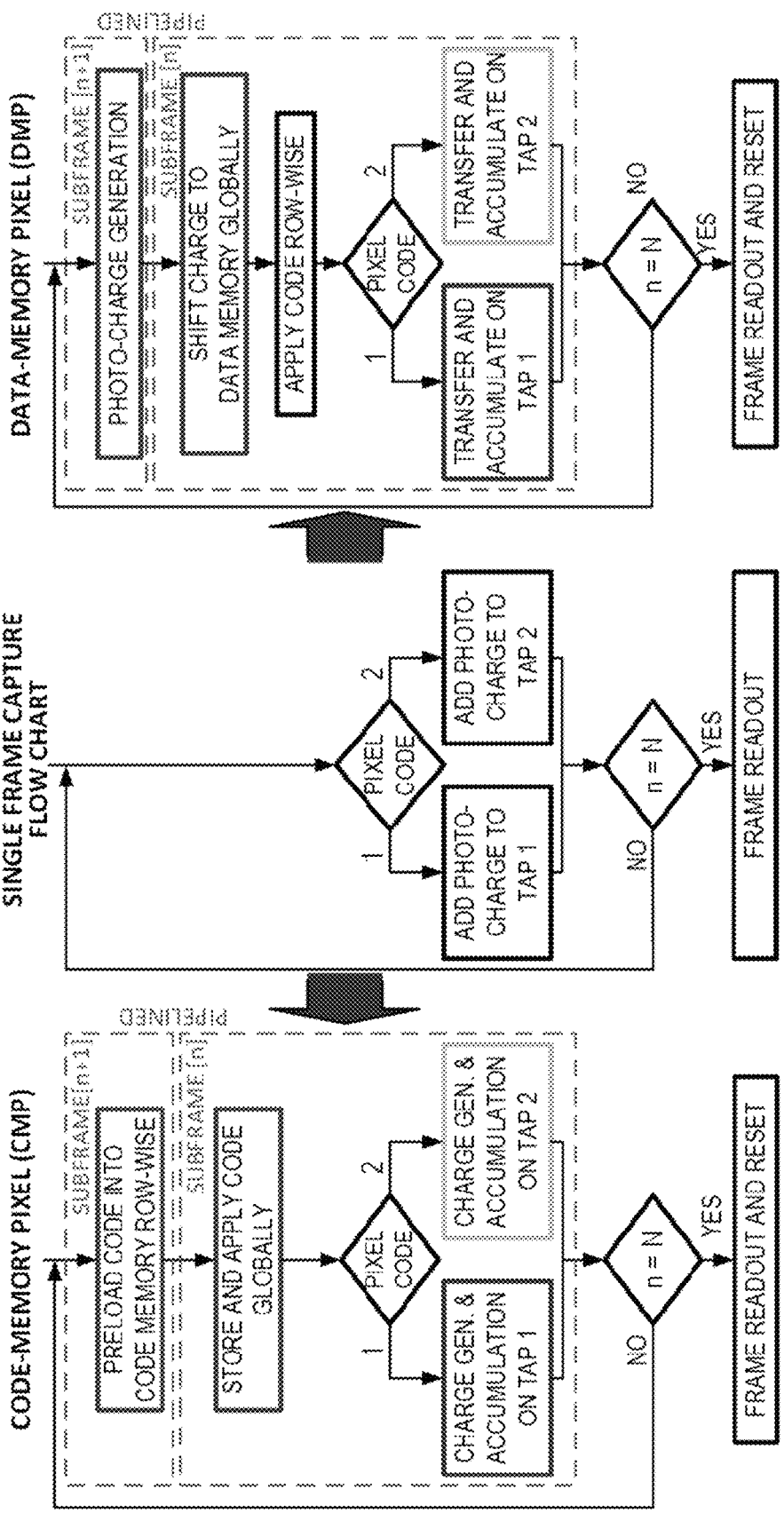
FIG. 15A is a flowchart of a dual-tap coded-exposure pixel (CEP) architecture for code-memory pixel (CMP) pixel architecture.
FIG. 15B is a flowchart of a generalized dual-tap coded-exposure pixel (CEP) architecture.
FIG. 15C is a flowchart of a dual-tap coded-exposure pixel (CEP) architecture for data-memory pixel (DMP) architecture.

Specific circuit-level implementations of CP image sensor pixels for the example of coded-exposure-pixel (CEP) image sensors, which are a subclass of CP image sensors, are described herein. Pixel-level coded-exposure pixel (CEP) functionality can be implemented by suitable approaches. FIG. 15B illustrates a flowchart showing an example operation of a multi-tap pixel in a CEP image sensor, for the example of two taps. To implement code-dependent sorting of photo-generated charge among multiple taps, the photo-generated charge is collected on taps 1 or 2 based on the codes for that individual pixel, codes 1 and 2, respectively. FIG. 15A and FIG. 15C illustrate two examples of operating CEP pixel architectures that follow the principle of operation shown in FIG. 15B. FIG. 15A shows a code-memory pixel (CMP) example and FIG. 15C shows a data-memory pixel (DMP) example.

In the CMP pixel architecture of FIG. 15A, the code value is pre-loaded into an in-pixel memory, referred to as the "code memory", during the previous subframe in a pipelined fashion and is applied for photo-generated charge sorting at the beginning of a current subframe exposure time. Therefore, the photo-generated charge collected in the current subframe is transferred to the respective tap or taps based on the current subframe code while the next subframe's code is pre-loaded into the pixel code memory. An in-pixel pipelined code memory can be used for this purpose.

In the DMP pixel architecture of FIG. 15C, an intermediate storage node, referred to as a "data memory", is used. This can be implemented, for example, as a charge-domain memory such as a storage diode, a storage pinned diode, or a different type of storage element. The charge "sorting" is then performed on the storage diode based on the codes applied to the pixel in a row-wise fashion for each subframe. Thus, the storage diode allows for sorting the charges of the current subframe, while the photo-charges of the next subframe are being collected. In more detail, after a global exposure in a given subframe, the photo-generated charge is first transferred to the intermediate charge-storage node. During the next subframe's exposure, in a pipelined fashion, the current subframe's pixel codes are applied from an outside-of-pixel memory row-by-row to sort the stored photo-generated charge by shifting it to taps 1 or 2 for codes 1 and 2, respectively. This is repeated N times per frame. As a result, the photo-generated charges across all subframes of a frame are selectively integrated over the two taps according to the per-pixel code sequence and are read out once at the end of the frame as two images.

Figure 16A:
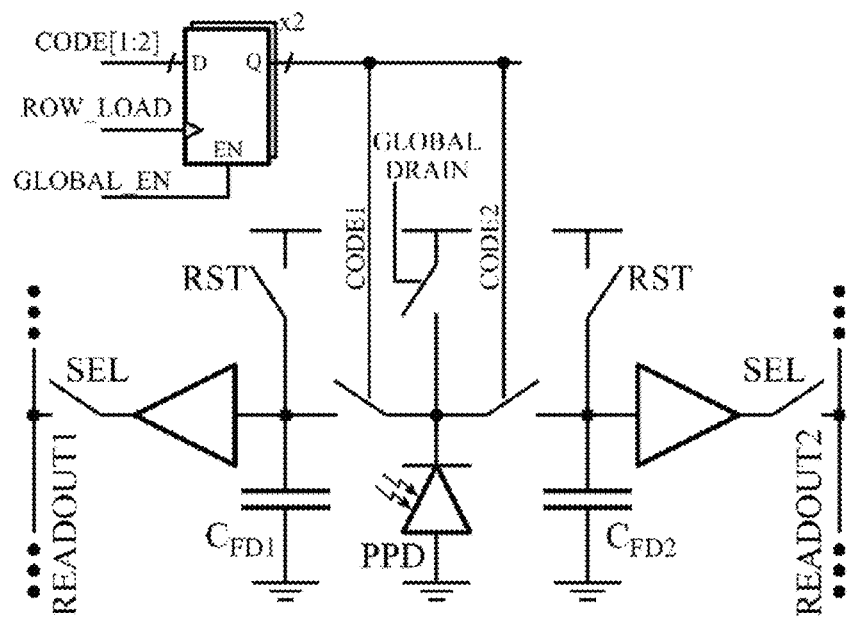
FIG. 16A is a circuit diagram of an example of CMP pixel architecture with global drain.
Figure 16B:
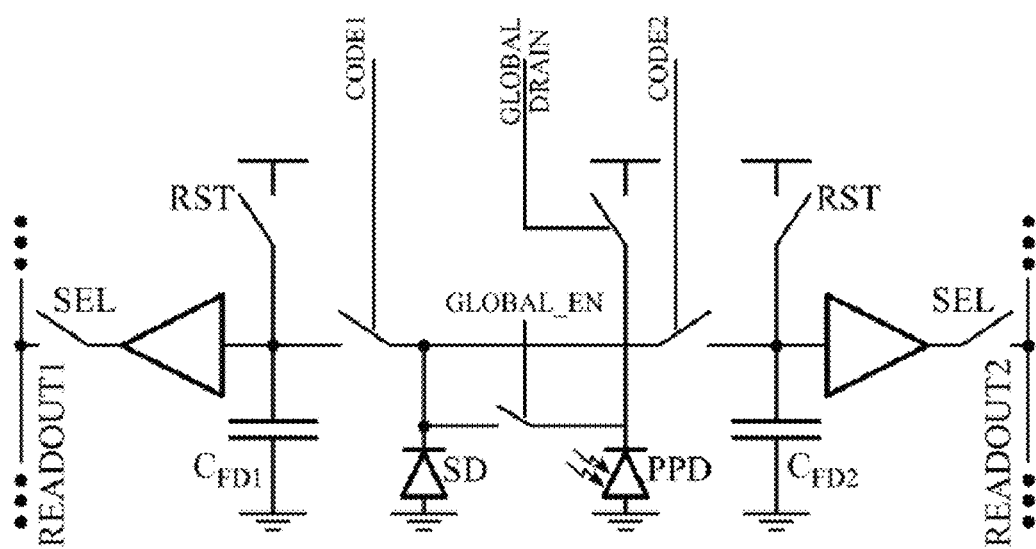
FIG. 16B is a circuit diagram of an example of DMP pixel architecture with global drain.
Figure 16C:
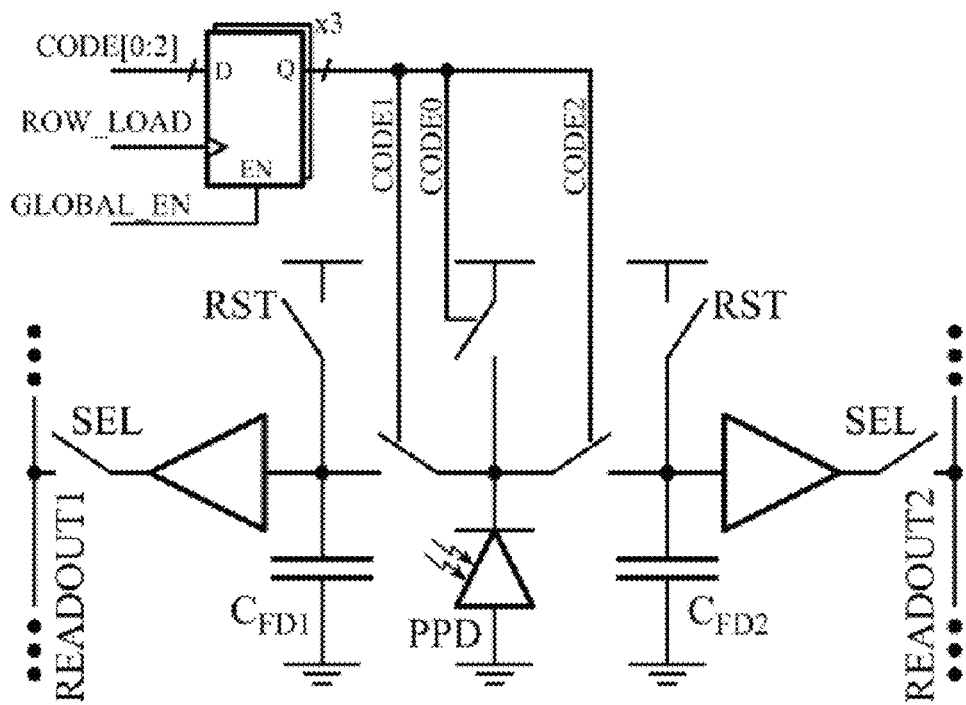
FIG. 16C is a circuit diagram of an example of CMP pixel architecture with per-pixel coded drain.
Figure 16D:
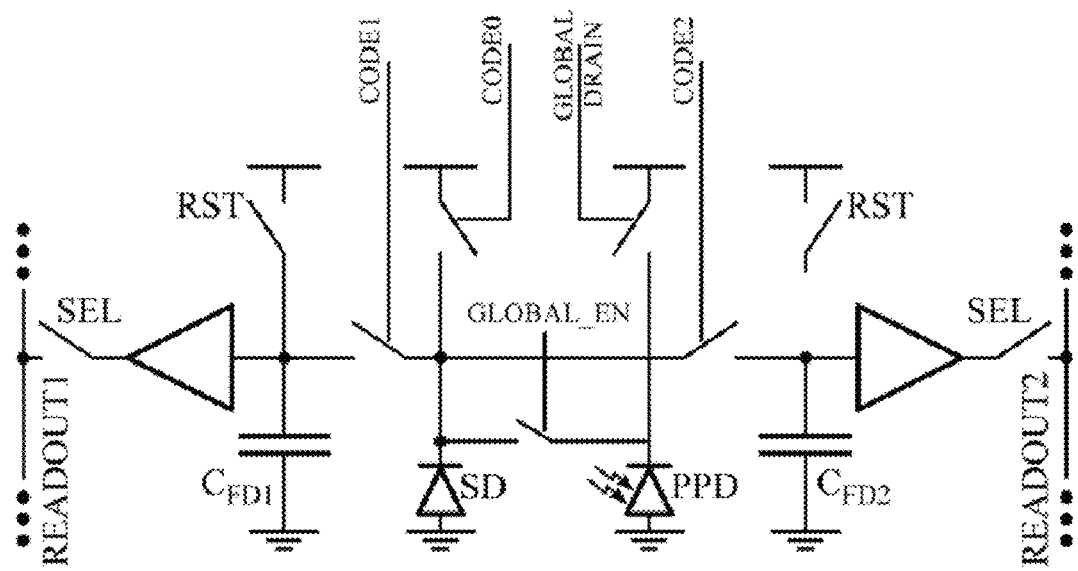
FIG. 16D is a circuit diagram of an example of DMP pixel architecture with per-pixel coded drain.

Examples of dual-tap CEP pixels are illustrated in FIGS. 16A to 16D for the cases of CMP pixel architecture (FIG. 16A and FIG. 16C) and DMP pixel architecture (FIG. 16B and FIG. 16D). FIG. 16A and FIG. 16B correspond to the case when the codes for the two taps are complementary, and can thus be represented by a 1-bit binary number per pixel.

FIG. 16A depicts a circuit diagram of an example of the CMP pixel architecture, which includes one or more memory elements, such as a flip-flop, used for loading the 1-bit binary subframe code row-by-row. In this example, there two flip-flops and ROW_LOAD latches the code in. When the codes are complementary, only one memory element can be used that has complementary outputs. When GLOBAL_EN is asserted, the memory output is enabled and it applies the codes globally (for the full pixel array). When GLOBAL_EN is de-asserted, all of the flip-flop outputs are reset to zero. The one or more memories are referred to as the "code memory." Based on the code in each pixel, one or both of the two transfer gates connect the photodetector, a pinned-photodiode (PPD) in this example, to the corresponding floating diffusion nodes $C_{FD1}$ and/or $C_{FD2}$. When both transfer gates are on, this effectively implements programmable per-pixel gain control; which is one example of a CGP pixel architecture.

FIG. 16B depicts a circuit diagram of an example of the DMP pixel architecture where the pixel architecture includes an additional intermediate storage node, referred to as "data memory". In this example, the data memory is represented as the node on the upper terminal of the storage diode SD. The charge photo-generated on the photodetector PPD is first shifted to the data memory and subsequently sorted between the two taps based on the pixel coefficient, in a raw-by-raw fashion.

Two other examples of pixel circuit diagrams for two dual-tap CEP pixel architectures, CMP and DMP pixel architectures, are illustrated FIG. 16C and FIG. 16D, respectively. FIG. 16C and FIG. 16D correspond to the case when the codes for the two taps are not necessarily complementary, and the photo-generated charge accumulated during any given subframe can be drained when it is not transferred to any tap. As compared to the examples of FIGS. 16A and 16B, an additional code, code 0, controls when the photo-generated charge is drained in any given subframe in a given pixel. This requires a total of three codes: CODE0, CODE1, and CODE2.

FIG. 16C shows an example circuit diagram of the dual-tap CMP pixel architecture with PPD as photodetector and three in-pixel 1-bit binary code memories memory (this example uses flip-flops). Three binary codes can also be stored on two 1-bit binary memories, but an example with three 1-bit binary memories is shown for simplicity. The codes denoted as CODE[0:2] are made available at the input of the memories by peripheral code loading circuits and latched by ROW_LOAD in a row-by-row fashion. The codes are made available at the memory output node when GLOBAL_EN signal is asserted, at the start of every subframe. At the end of a subframe GLOBAL_EN signal is de-asserted. Based on the values of codes the photo-generated charges are steered to the intended tap or drained to VDD during the exposure time of the subframe.

FIG. 16D shows an example circuit diagram of the DMP pixel architecture (which includes an extra intermediate storage node) where the codes for the two pixels are not necessarily complementary, and the photo-generated charge accumulated during any given subframe can be drained when it is not transferred to any tap. The photo-generated charge in the PPD can be transferred to SD by asserting the GLOBAL_EN signal at the end of every subframe. The charge on node SD is then sorted into intended tap(s) or drained to VDD based on the values of codes (CODE0, CODE1 and CODE2 in this example) during the exposure time interval of a subsequent subframe. This is done in a raw-by-raw fashion. The photo-generated charges collected in the photodetector PPD during the subframe can also be flushed away all at once by asserting GLOBAL DRAIN signal.

Figures 17A, 17B:
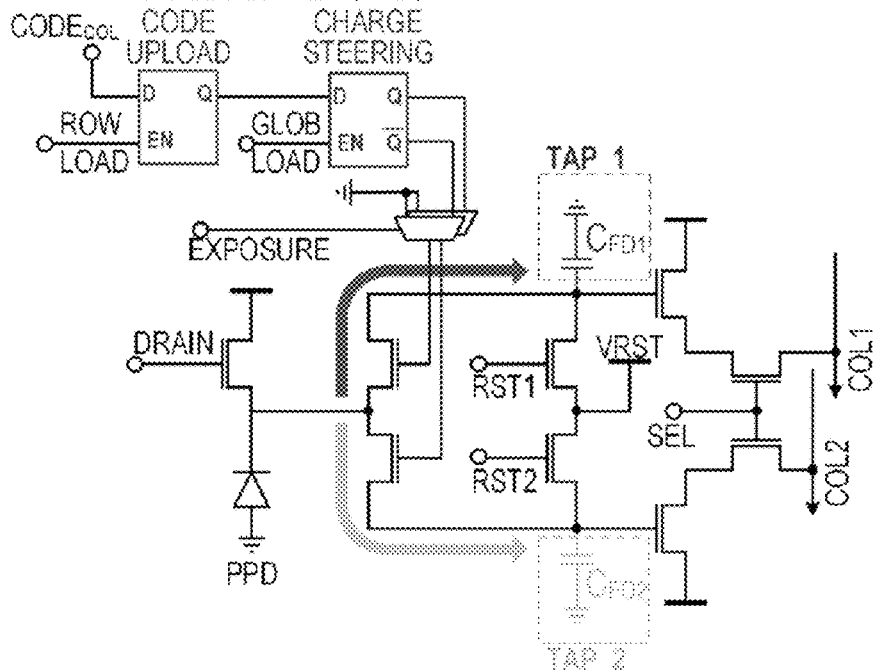
FIG. 17A is a circuit diagram of another example of CMP pixel architecture with global drain.
FIG. 17B is a circuit diagram of another example of DMP pixel architecture with global drain.
Figure 17C:
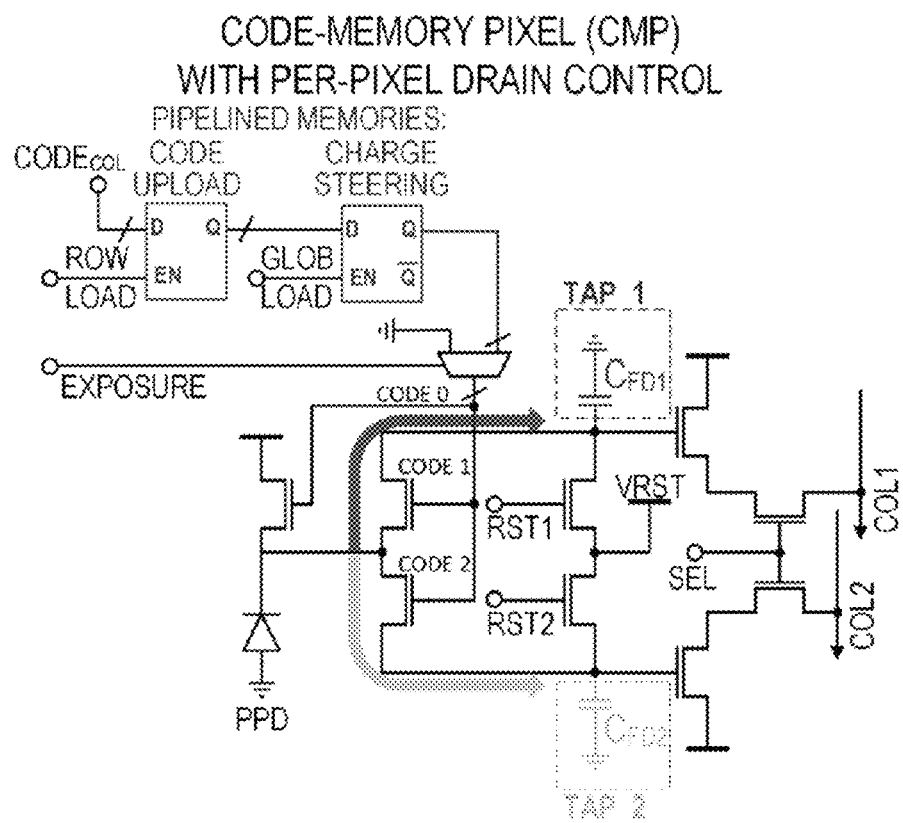
FIG. 17C is a circuit diagram of another example of CMP pixel architecture with per-pixel coded drain.
Figure 17D:
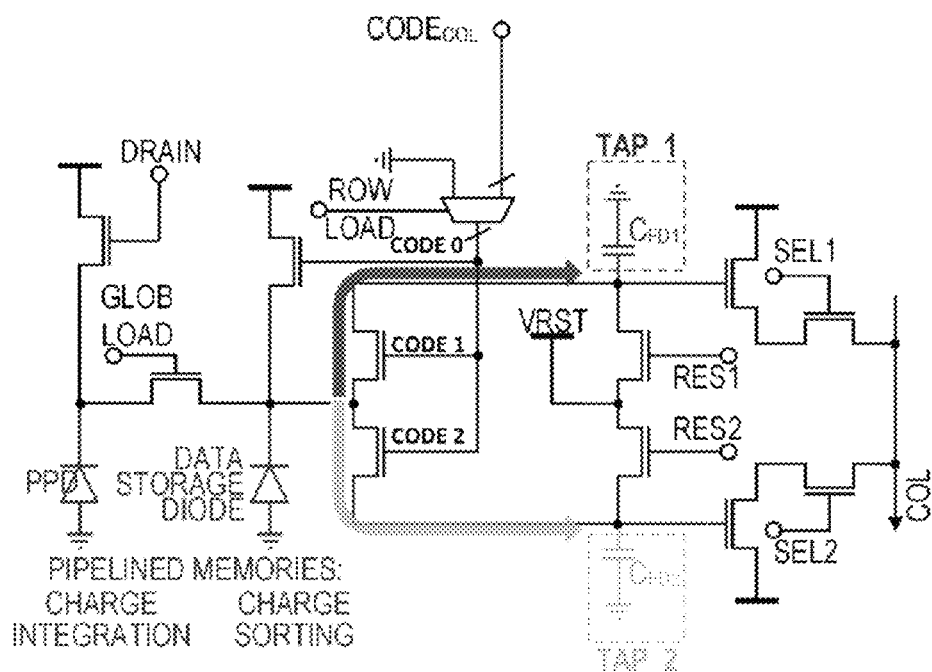
FIG. 17D is a circuit diagram of another example of DMP pixel architecture with per-pixel coded drain.

Additional example implementations of dual-tap CEP pixels are illustrated in FIGS. 17A to 17D for the cases of CMP pixel architecture (FIG. 17A and FIG. 17C) and DMP pixel architecture (FIG. 17B and FIG. 17D). FIG. 17A and FIG. 17B correspond to the case where the codes for the two taps are complementary, and can thus be represented by a 1-bit binary number per pixel. FIG. 17A depicts an example of the CMP pixel architecture, which includes two latches, where one is used to pre-load the subframe code row-by-row and the other is used to apply this code globally (to the full pixel array). Based on the code in each pixel, one of the two transfer gates connects the pinned-photodiode (PPD) to the corresponding floating diffusion node. The code in each pixel can be gated with an exposure signal to stop the integration during the read-out phase. Also, this signal can be kept low during the global code updates to make sure that signal and supply glitches caused by digital switching in the array are not affecting the PPD charge transfer. The charges generated during this time can be stored in the PPD until exposure signal is asserted again.

FIG. 17B depicts an example of the DMP pixel architecture where the pixel architecture includes "data memory" on the data storage diode. The charge photo-generated on the photodetector PPD is first shifted to the data memory and then sorted between the two taps based on their complementary codes, in a raw-by-raw fashion. The photodetector charge can only be drained globally, such as at the end of a subframe. This pixel topology can resemble global-shutter pixel, but the data memory (floating diffusion storage) node is used for charge sorting, rather than simply a readout.

FIG. 17C and FIG. 17D differ from FIG. 17A and FIG. 17B, respectively, in that they correspond to the case when the codes for the two taps are not necessarily complementary, so that the photo-generated charge accumulated during any given subframe can be drained when it is not transferred to any tap. An additional code, code 0, can be used such that the photo-generated charge can be drained in any given subframe in a per-pixel programmable fashion.

Figure 17E:
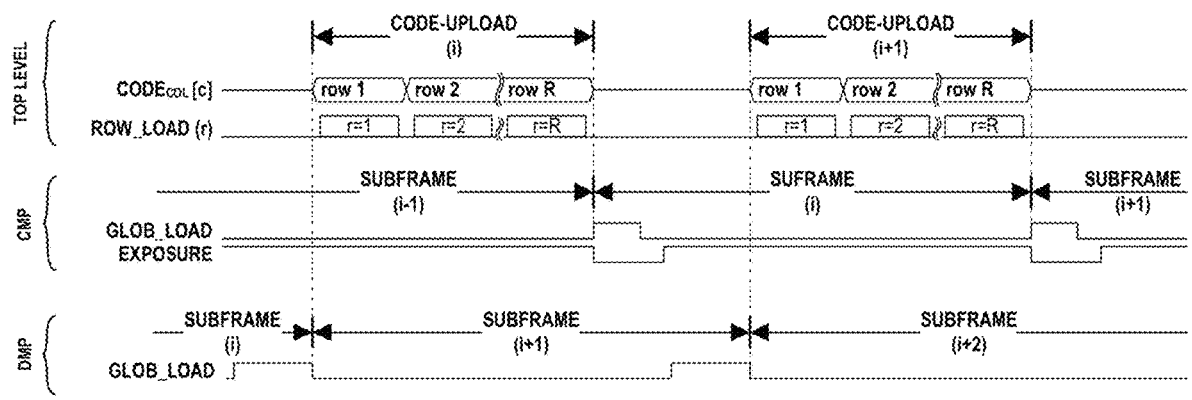
FIG. 17E are example timing diagrams for CMP and DMP pixel architectures.

As shown in the timing diagrams in FIG. 17E, during each subframe the charges are generated and stored in the PPD, and at the end of the subframe, the GLOB_LOAD signal transfers the generated charges from PPD to the storage diode (charge-mode memory) for all pixels. Subsequently, the pattern of that subframe is sent to the pixels row-by-row to sort the charges from the storage node through transfer gates on tap 1 and 2 based on the code. At the same time, the photo-generated charges for the next subframe are collected in the PPD. Note that the CODE-UPLOAD (i) happens during SUBFRAME (i−1) for the CMP pixel architecture in contrast to SUBFRAME (1+1) for the DMP pixel architecture. For simplicity, per-pixel gain control functionality is not shown in FIGS. 17A to 17D, but can be used, for example, by shifting charge to more than one tap at a time, by shifting charge to a tap and to drain node configured as a floating diffusion at the same time, or by including additional gain control elements as described herein.

Figure 18A:
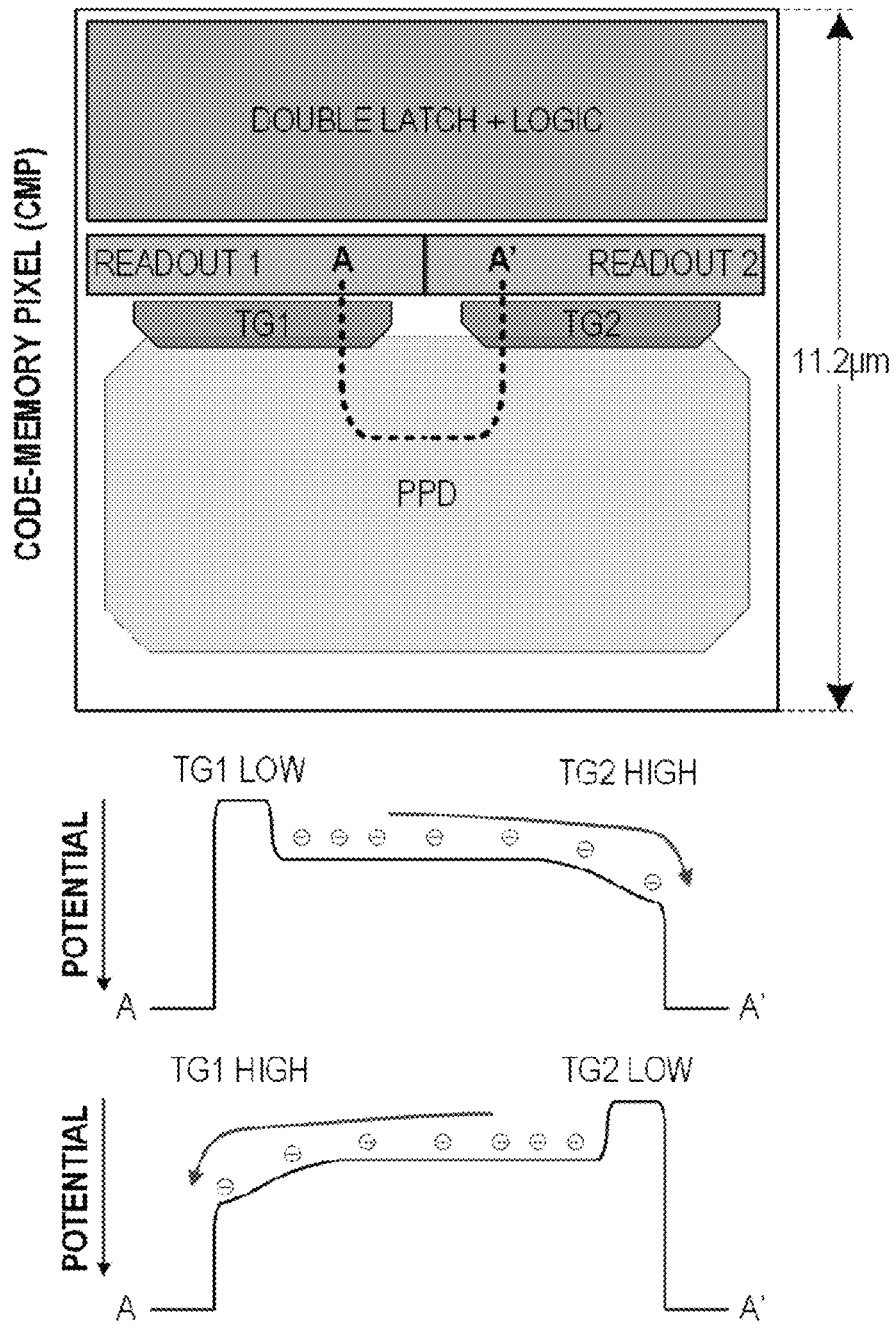
FIG. 18A illustrates an example layout and potential diagram for a dual-tap CMP image sensor pixel example.
Figure 18B:
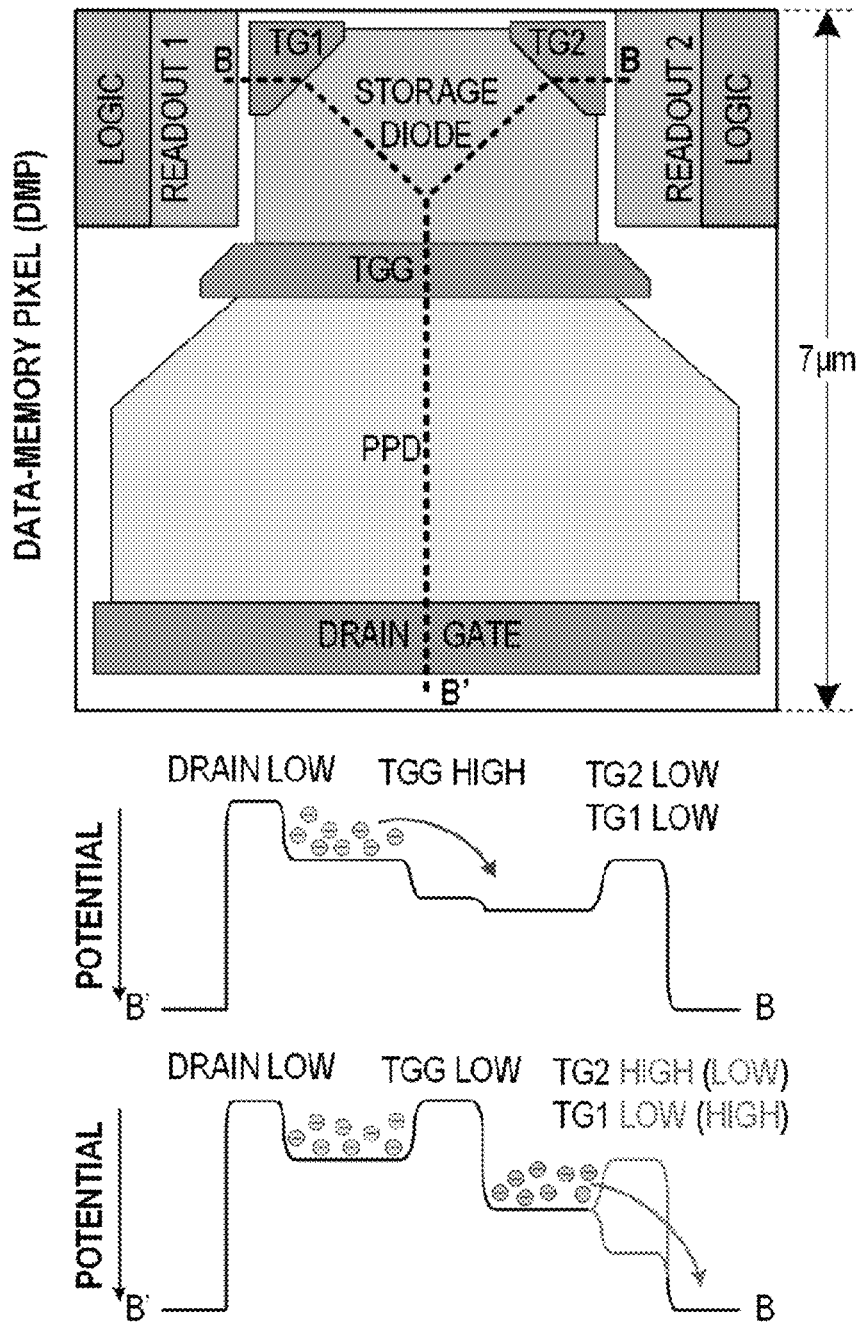
FIG. 18B illustrates an example layout and potential diagram for a dual-tap DMP image sensor pixel example.

The layout and electrostatic potential diagrams for CMP pixel architecture in FIG. 17A and for DMP pixel architecture in FIG. 17B are depicted in FIG. 18A and FIG. 18B, respectively. These correspond to the case when the codes for the two taps are complementary, and can thus be represented by a 1-bit binary number per pixel. In the CMP pixel example in FIG. 18A the photo-generated charges are moved to one of the taps based on the code in individual pixels.

In the DMP pixel example of FIG. 18B, the transfer gate TGG is controlled by the GLOB_LOAD signal (as exemplified in FIG. 17) which transfers charges from PPD to the storage diode globally in all pixels. Transfer gates TG1 and TG2 are responsible for storage diode charge sorting based on the corresponding code. After a global exposure in a given subframe, the photo-generated charge is first transferred to an intermediate charge-storage node; such as the data memory. During the next subframe's exposure, in a pipelined fashion, the current subframe's pixel codes are applied from an external memory row-by-row to sort the stored photo-generated charge by shifting it to taps 1 or 2 for codes 1 and 2, respectively. This is repeated N times per frame. As a result, the photo-generated charges across all subframes of a frame are selectively integrated over the two taps according to the per-pixel code sequence and are read out once at the end of the frame as two images. In some cases, the P-type metal-oxide-semiconductor (PMOS) devices in the CMP structure may require significant overhead space, therefore reducing the pixel fill-factor. On the other hand, DMP pixels can use N-type metal-oxide-semiconductor (NMOS) devices only, with a smaller total area.

Figure 19A:
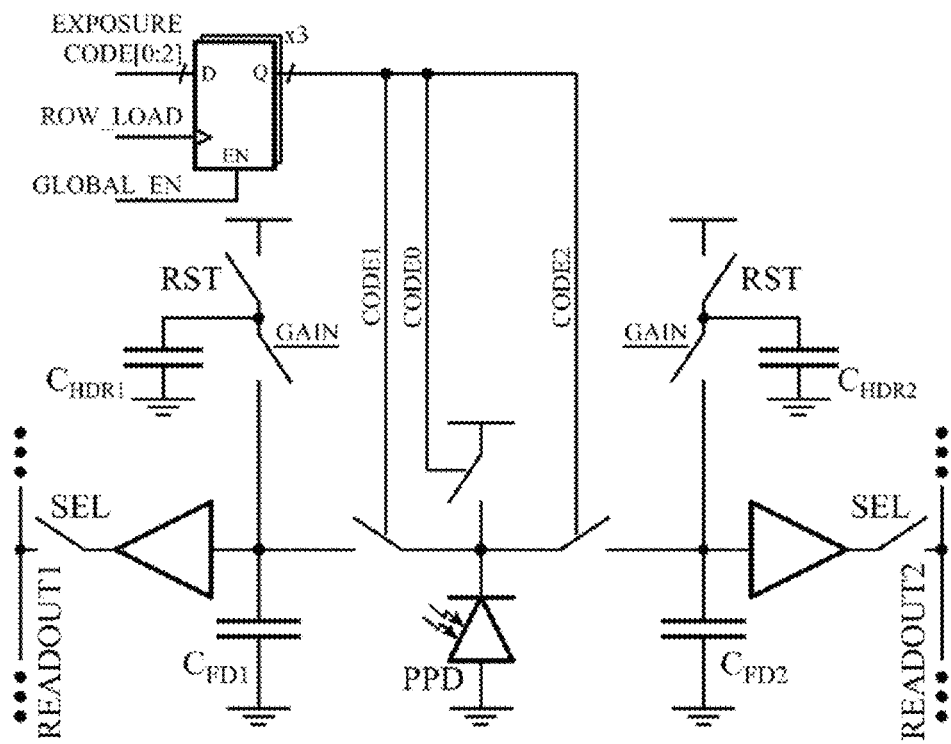
FIG. 19A is a circuit diagram of an example of dual-tap pixels with both per-pixel coded exposure and global gain control for CMP architecture.
Figure 19B:
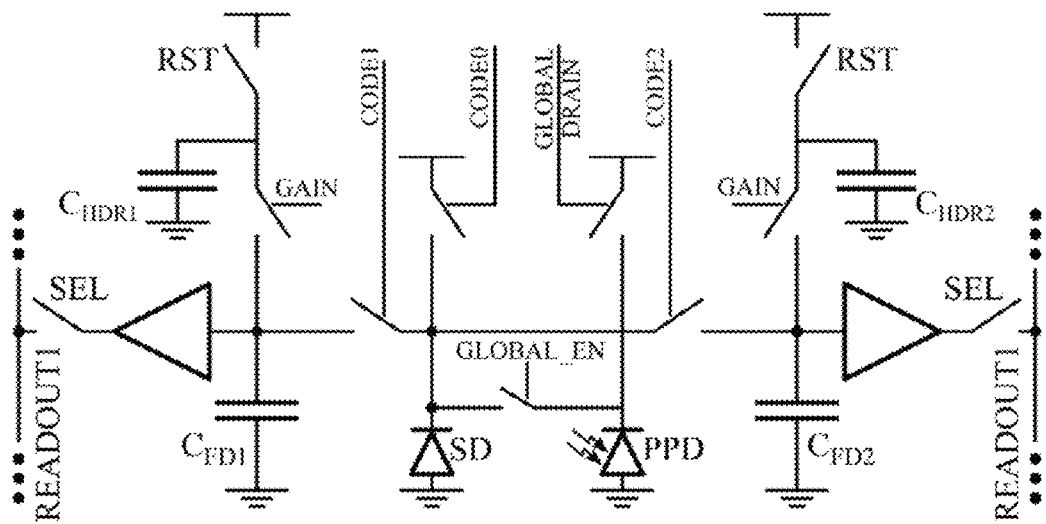
FIG. 19B is a circuit diagram of an example of dual-tap pixels with both per-pixel coded exposure and global gain control for DMP architecture.

The dynamic range of the CEP pixel architectures can be increased by increasing the full well capacity of the individual taps. FIGS. 19A and 19B show two examples of the dual-tap CP pixel architectures. FIG. 19A shows CMP, and FIG. 19B shows DMP, with per-pixel coded-exposure functionality and globally programmable pixel gain. The full well capacity of the taps in pixel, for both CMP and DMP, can be adjusted by controlling the global signal GAIN in each subframe. Both CMP and DMP pixel architectures are able to be used for per-pixel coded exposure, but with additional dynamic gain control functionality.

When GAIN signal is low, the photo-generated charges are collected only on capacitors, $C_{FDi}$ representing the floating diffusion nodes associated with tap, based on the per-pixel codes $CODE_i$. The capacitance value of $C_{FDi}$ is low, therefore the conversion gain is high. This state of operation of the CP is generally optimal when the incident light intensity is low.

When GAIN is signal is high, the capacitors $C_{FDi}$ and $C_{HDRi}$ are connected in a parallel configuration, which increases the full well capacity on each tap of the CP. The photo-generated charges from PPD are sorted into intended taps or drained to VDD based on the values of $CODE_i$. The combined capacitance at the taps is higher, therefore conversion gain is lower. This state of operation of the CP is generally optimal when the incident light intensity is high.

In some cases, the GAIN signal can be dynamically changed from subframe to subframe to sample the wide dynamic range scene multiple times on floating diffusion capacitors, $C_{FDi}$ and HDR capacitors, $C_{HDRi}$ with different conversion-gain and exposure settings.

Figure 20A:
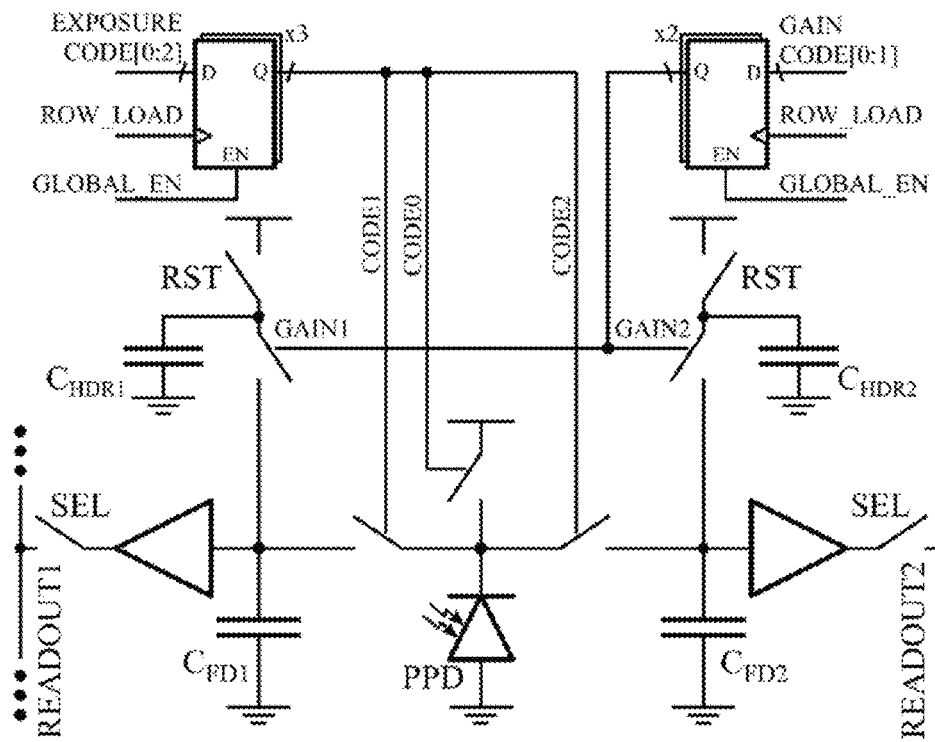
FIG. 20A is a circuit diagram of an example of dual-tap pixels with both per-pixel coded exposure and per-pixel gain control for CMP architecture.
Figure 20B:
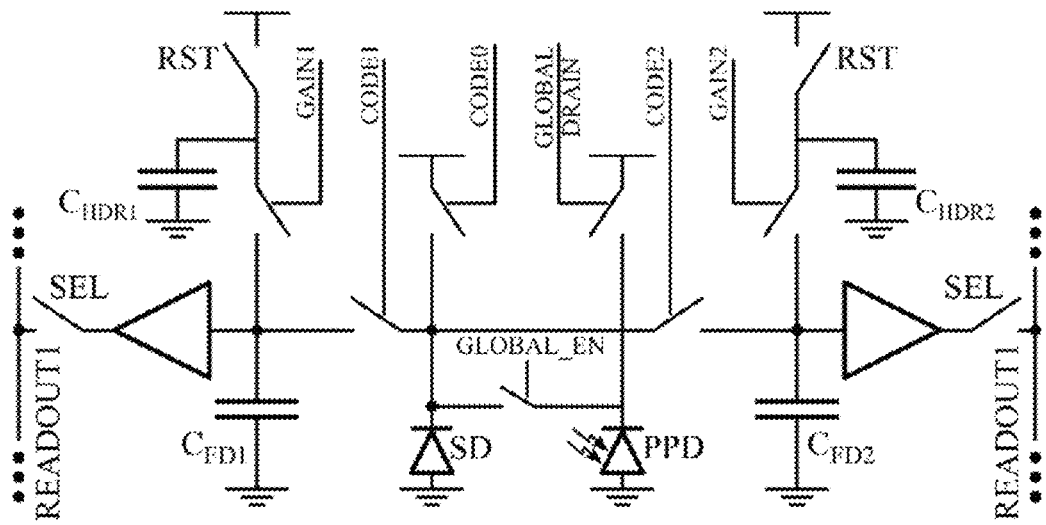
FIG. 20B is a circuit diagram of an example of dual-tap pixels with both per-pixel coded exposure and per-pixel gain control for DMP architecture.

FIGS. 20A and 20B show two examples of the dual-tap CP pixel architectures with per-pixel coded-exposure functionality and per-pixel coded-gain functionality. FIG. 20A shows CMP, and FIG. 20B shows DMP, with per-pixel coded-exposure functionality and per-pixel coded-gain functionality. FIG. 20A shows an example implementation of the CP pixel architecture with photodetector PPD and in-pixel code memory (D-flip-flop in this example) for both per-pixel-exposure codes and per-pixel-gain codes. This is an example of the CMP pixel architecture with 2 taps. The codes, EXPOSURE CODE[0:2], are used to decide which, if any, taps will be used to collect the photo-generated charge in given subframe, and codes, GAIN CODE[0:1], to decide the conversion gain of individual taps. Based on the values of CODEi (CODE0, CODE1 and CODE2 in this example), the photo-generated charge is steered to the intended taps or drained to VDD during the exposure time of the subframe. The conversion gain of taps can be selected individually based on control signals GAINi (GAIN1, GAIN2 in this example). FIG. 20B shows an example implementation of a dual-tap DMP CP pixel architecture with an intermediate node, storage diode (SD), between the photodetector, PPD, and the floating diffusion nodes $C_{FDi}$ (also referred to as taps). The charge collected in SD is sorted into the intended taps or drained to VDD based on the values on control signals CODE (CODE0, CODE1 and CODE2 in this example) during the exposure time of the subsequent subframe. When sorting the charge on taps, the conversion gain of individual taps can be controlled independently using the control signals $GAIN_i$ (GAIN1, GAIN2 in this example).

Figure 20C:
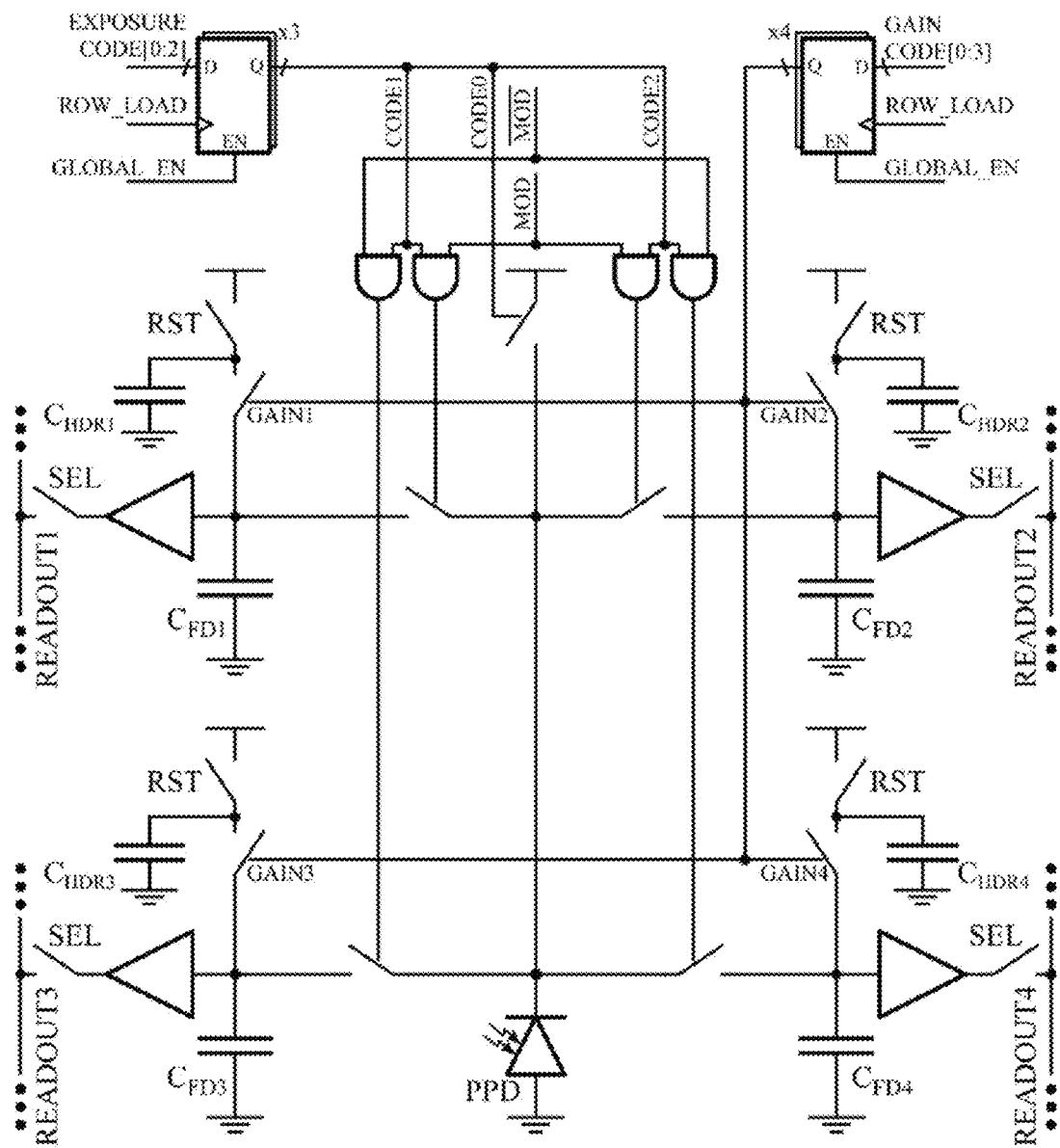
FIG. 20C is a circuit diagram of an example of four-tap pixels with both per-pixel coded exposure and per-pixel gain control for indirect time-of-flight (iToF) CMP architecture.
Figure 20D:
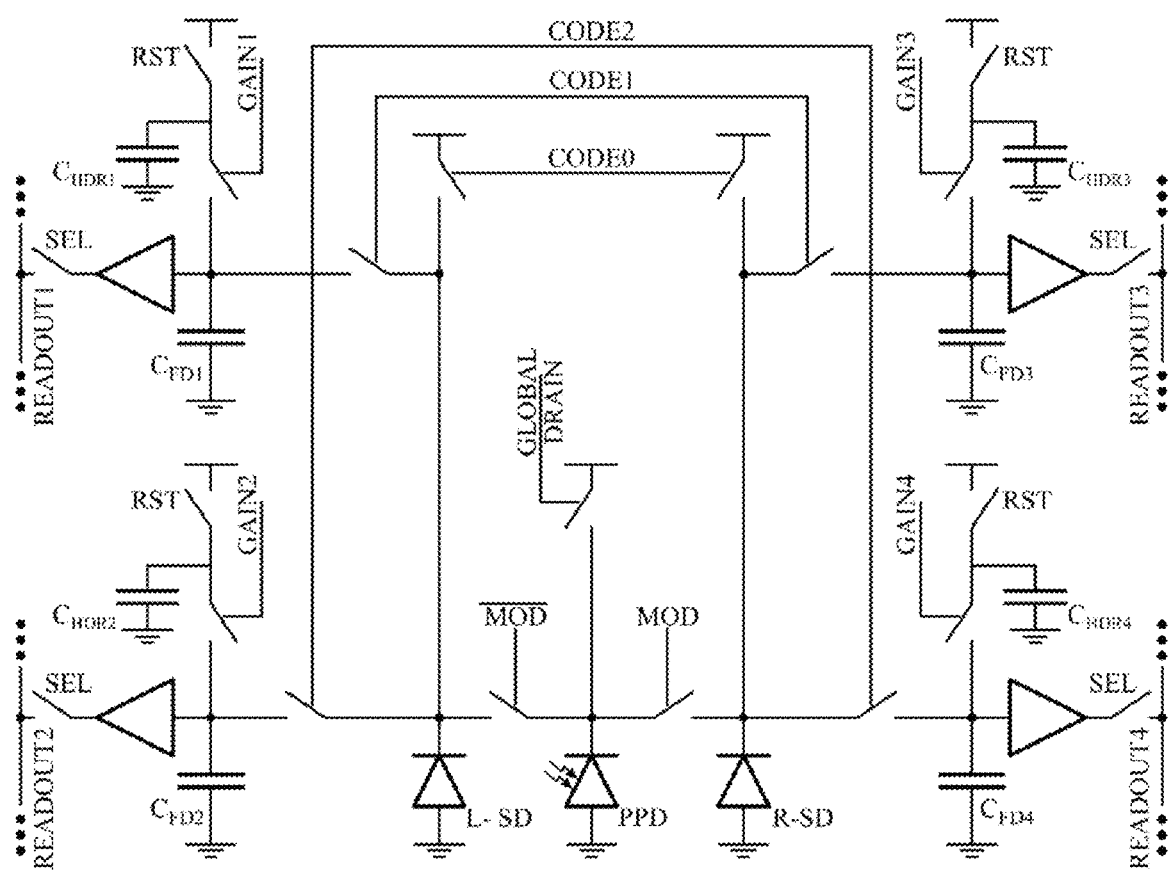
FIG. 20D is a circuit diagram of an example of four-tap pixels with both per-pixel coded exposure and per-pixel gain control for iToF DMP architecture.

FIGS. 20C and 20D show two examples of the four-tap iToF CP pixel architecture to sense the time of flight of the incoming photons from the illumination source to the photodetector, with per-pixel coded-exposure functionality and per-pixel coded-gain functionality. FIG. 20C shows an example of iToF CMP, and FIG. 20D shows an example of iToF DMP, with per-pixel coded-exposure functionality and per-pixel coded-gain functionality.

FIG. 20C shows an example implementation of the iToF CMP pixel architecture with photodetector PPD and an in-pixel code memory (D-flip-flop in this example). The codes EXPOSURE CODE[0:2] are used to decide which, if any, pair of taps (TAP1 on $C_{FD1}$ and TAP3 on $C_{FD3}$ or TAP2 on $C_{FD2}$ and TAP4 on $C_{FD4}$) are used to collect the demodulated photo-generated charge in a given subframe. Codes EXPOSURE CODE[0:2] and GAIN CODE[0:3] are loaded into the in-pixel memories, such as D-flip-flops or latches. Based on values of CODEi (CODE0, CODE1 and CODE2 in this example) and signals, MOD and $\overline{MOD}$, the photo-generated charge is steered to the intended taps or drained to VDD (if CODE0=1) during the subframe. Control signals GAINi (GAIN1, GAIN2, GAIN3, GAIN4 in this example) set the conversion gain of individual taps. The gain is decreased by connecting $C_{FDi}$ with $C_{HDRi}$.

FIG. 20D shows an example implementation of the iToF DMP pixel architecture with two additional intermediate charge storage nodes, on storage diodes R-SD and L-SD. These are placed between the photodetector PPD and pairs of floating diffusion nodes $C_{FDi}$ (also referred to as taps) as depicted. In this example, the photo-generated charge is collected on the storage node on right side, R-SD when signal MOD is asserted and—on the storage node on left side, L-SD when signal $\overline{MOD}$ is asserted. The charge collected in L-SD and R-SD is sorted into the intended taps or drained to VDD based on the values on control signals CODEi (CODE0, CODE1 and CODE2 in this example) during the subsequent subframe. When sorting charge on taps, the conversion gain of individual taps can be controlled independently using the control signals GAINi (GAIN1, GAIN2, GAIN3, GAIN4 in this example).

Figure 21A:
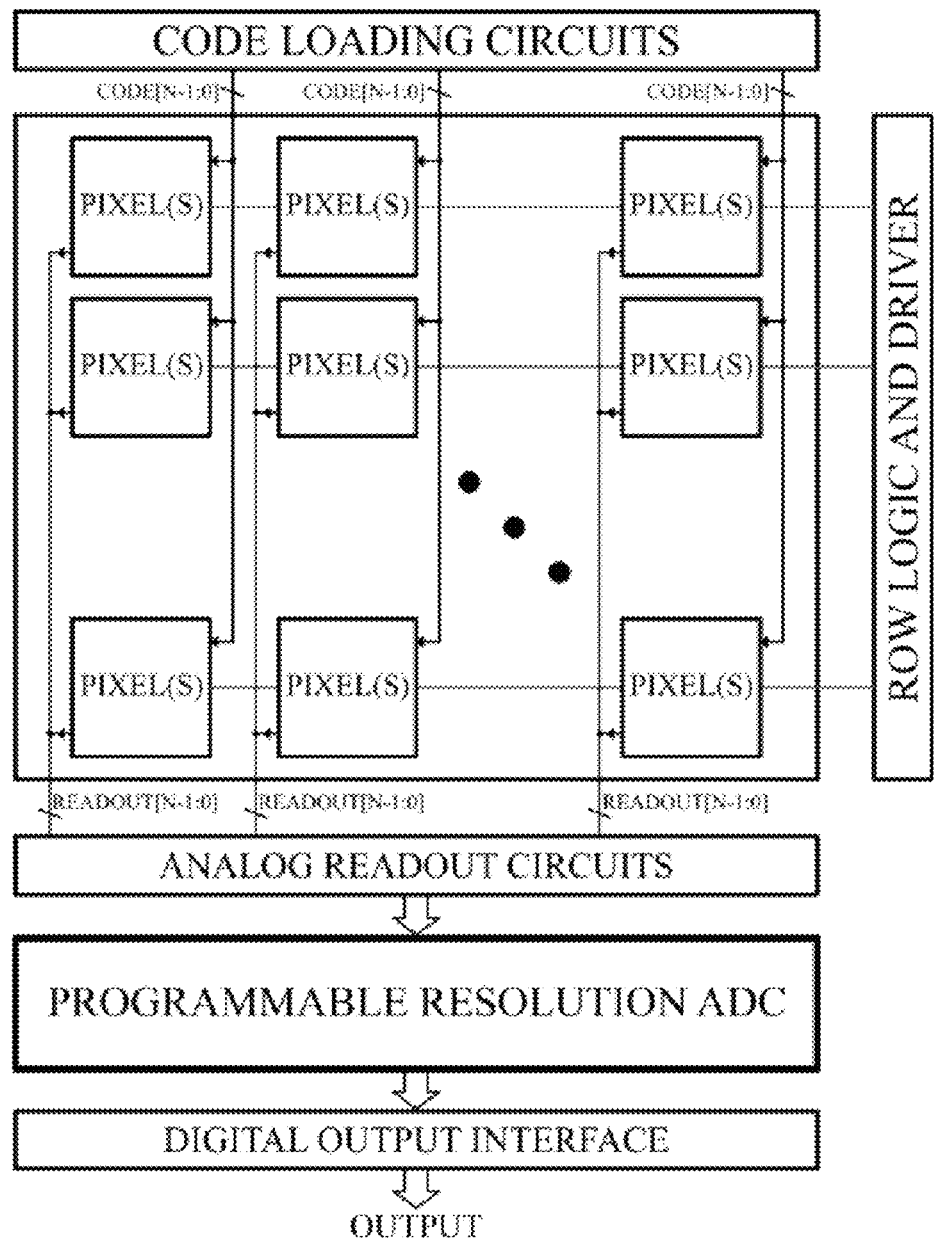
FIG. 21A is a diagram of an example of digital readout circuitry with programmable-resolution analog-to-digital convertor (ADC)
Figure 21B:
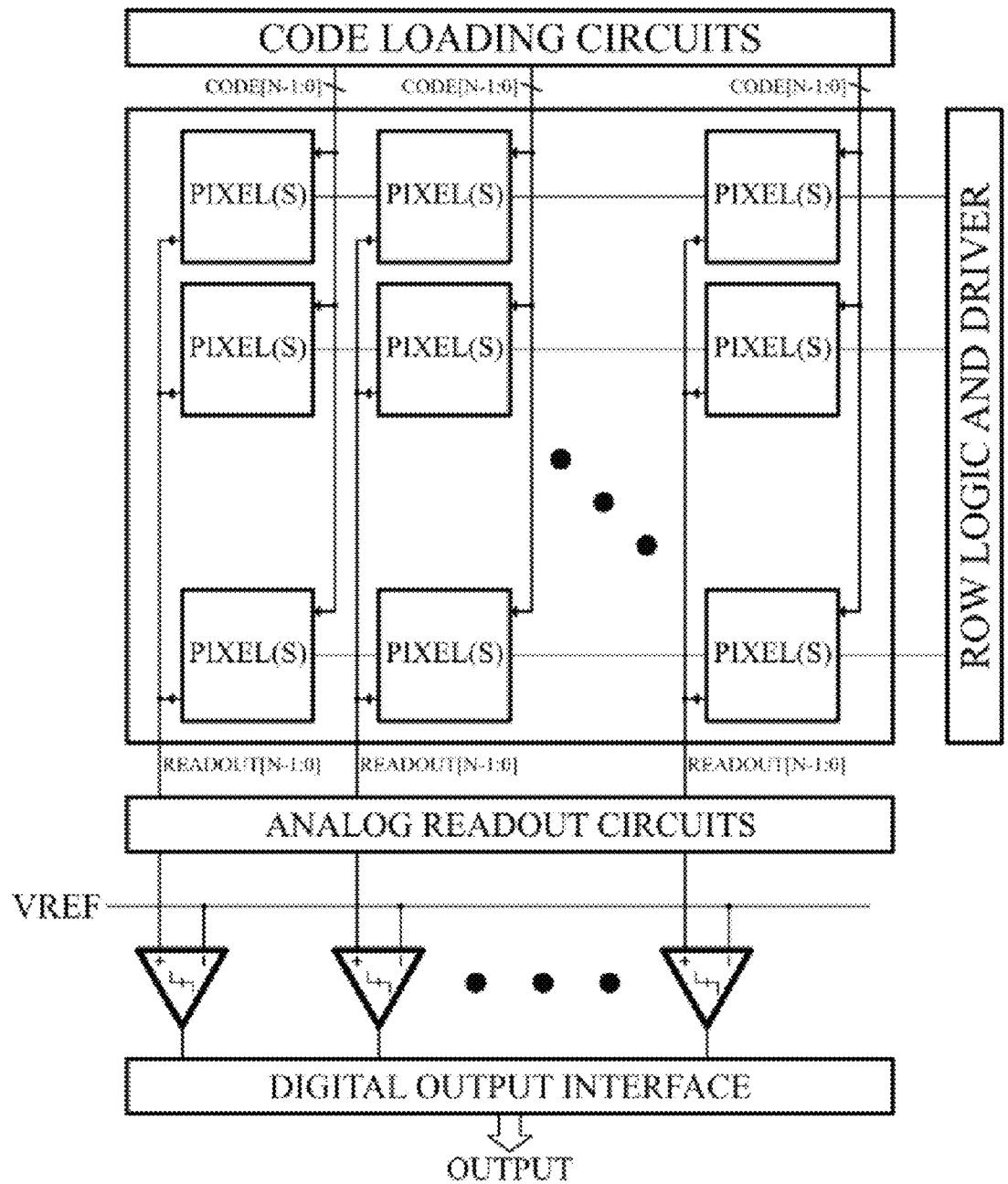
FIG. 21B is a diagram of an example operation mode when ADC resolution is coarse, such as implemented by a comparator with fixed or variable VREF.
Figure 21C:
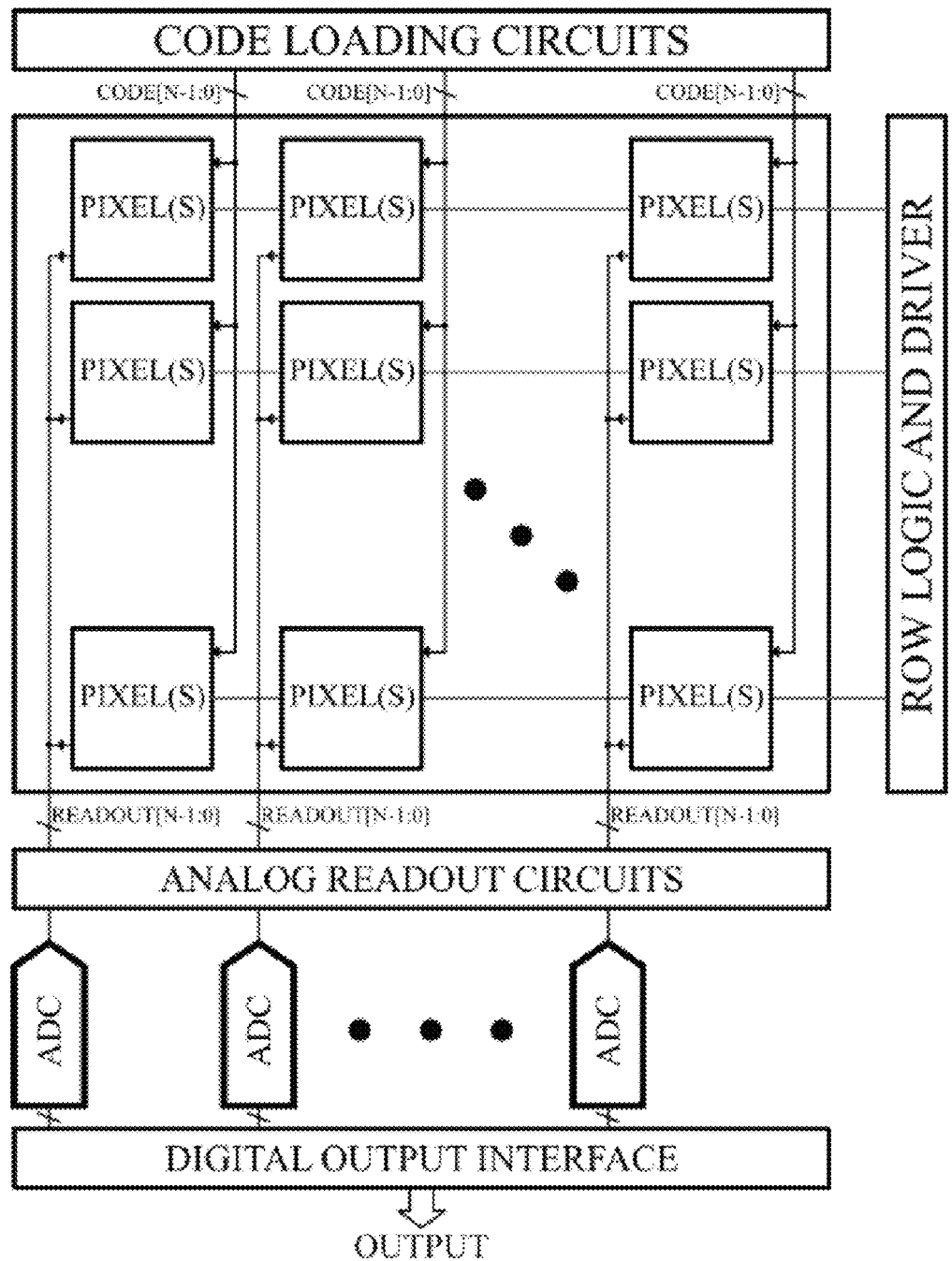
FIG. 21C is a diagram of an example operation mode when ADC resolution is set to fine resolution.

An analog-to-digital converter (ADC) can be utilized for digitizing pixel tap outputs, both on the same chip as the image sensor array and on different chips. Parameters of such ADC, such as for example reference voltages, can be configured dynamically for one or more subframes or one or more frames. FIG. 21A shows an example of a readout architecture in the image sensor with an ADC with programmable resolution. The image sensor includes a CP array. The ADC resolution can be configured dynamically using on-chip configuration registers and/or external control signals. In FIG. 21B, the ADC is configured to the coarse-resolution mode (1-bit resolution in this example, assuming constant VREF). In this mode, the ADC can provide coarse intensity information about the pixel output at a very fast rate as limited by a short subframe exposure period. The vertical scanner selects the rows of the pixel array one-by-one. When the row is selected, data from the taps of the pixel are loaded on one or more readout lines, READOUT[N−1:0]. The data from the taps can be made available on the READOUT bus at the same time, or READOUT lines can be shared by multiple taps and the data can be time and/or spatially multiplexed on the READOUT lines. The READOUT lines are connected to the ANALOG READOUT CIRCUITS. The output of the ANALOG READOUT CIRCUITS is connected to a low-resolution ADC (a comparator is used in this example) input, which quantizes the input analog signal to generate a digital output. In this example, a 1-bit output is generated for each tap based on the analog signal on the READOUT bus and reference voltage, VREF, which can be arbitrarily programmed. In this example, the digital output from the ADC is transferred out of the chip by means of a high-speed digital serializer. Such operation can be performed during exposure when taps are still collecting the photo-generated charge, for example either for the previous or the current subframe. The coarse ADC readout generates a smaller number of bits compared to the high-resolution ADC, and hence, this digital information can be transferred faster than for high-resolution ADC frame readout. In FIG.

21C, the ADC is configured in high-resolution mode. The high-resolution ADC may or may not reuse the low-resolution ADC circuits, such as the same comparator. In this mode, ADC can provide a more accurate digital representation of each pixel tap output. In this example, the ADC is used in this high-resolution mode to convert the analog data from the taps to digital number with the highest accuracy, often at the cost of more power or higher output data rate or longer read out time.

Figure 22B:
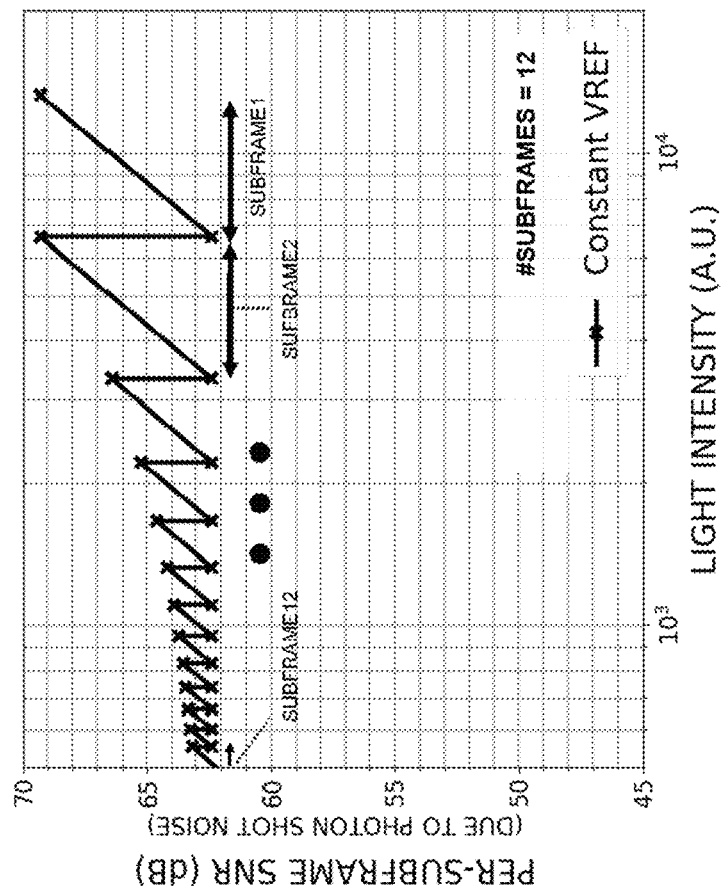
FIG. 22B is a plot showing SNR versus incident light intensity illustrating variation of signal quality with a change of codes per subframe, for constant coarse ADC reference voltage VREF.
Figure 22A:
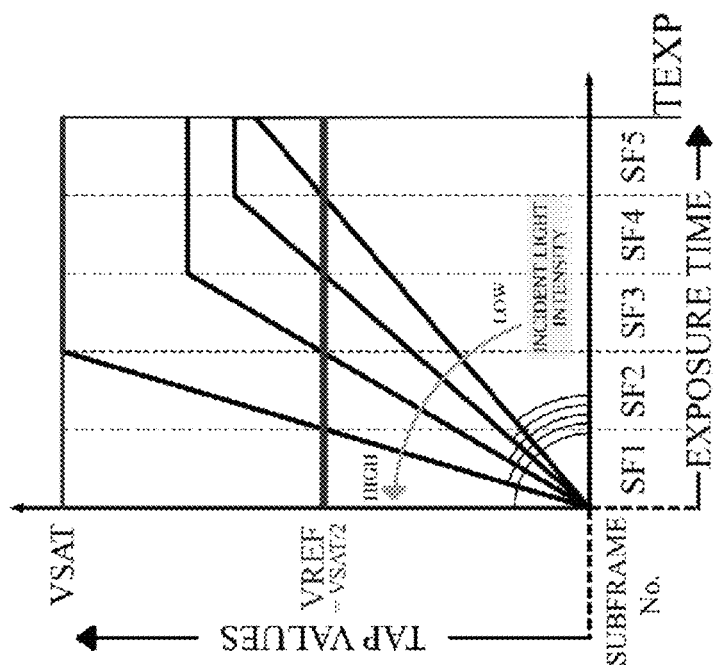
FIG. 22A is chart showing an example of possible pixel tap values when the coarse ADC reference voltage VREF is kept constant and charge accumulation on a given tap is stopped after the tap value reaches VREF, with one subframe latency.

The high-speed per-subframe analog-to-digital conversion and readout capability of the image sensor, for example at coarse ADC resolution, is used to increase the dynamic range of the CP. The approach shown below is an example of how such an image sensor can be used when its resolution is varied:

1. Reset all the pixels.
    By resetting all the pixels, all the pixel outputs are set to zero (in practice, this is typically a high voltage at or near VDD).
2. Set ADC in coarse high-speed mode.
3. Set VREF=VREF_PER_SUBFRAME[0]
    VREF_PER_SUBFRAME[k] is the reference voltage level for subframe k.
4. Start the exposure
    As pixels collect photo-generated charges on the taps, their outputs rise (in practice, the actual tap voltage signal typically falls).
5. Set the code for all the pixels to collect the photo-generated charges on TAP1
    TAP_CURRENT=TAP1
6. After the first subframe, compare the READOUT voltages of all the pixel with the VREF row by row
    For every pixel
        If READOUT[TAP_CURRENT]>VREF
            Change the code of the pixel to collect photo-generated charges on next tap (or drain it if there are no more taps)
            TAP_CURRENT=TAP_CURRENT+1
        else
            Keep code the same as the previous code
            TAP_CURRENT=TAP_CURRENT
7. Readout
    After the exposure is over, set the ADC to high-resolution mode.
    Read out the sensor output frame at high ADC resolution Reference voltage VREF, such as that for the coarse-resolution ADC, can be dynamically adjusted for every subframe; and the code for the next subframe can be chosen based on the ADC output in the current subframe. FIG. 22A shows an example of possible pixel tap values when the subframe codes are chosen to make sure that the minimum number of pixels are saturated. Here reference voltage VREF is kept constant at a pre-defined value. As per the above example, charge accumulation on a given tap is stopped after the tap value reaches VREF, with one subframe latency.

Figure 22D:
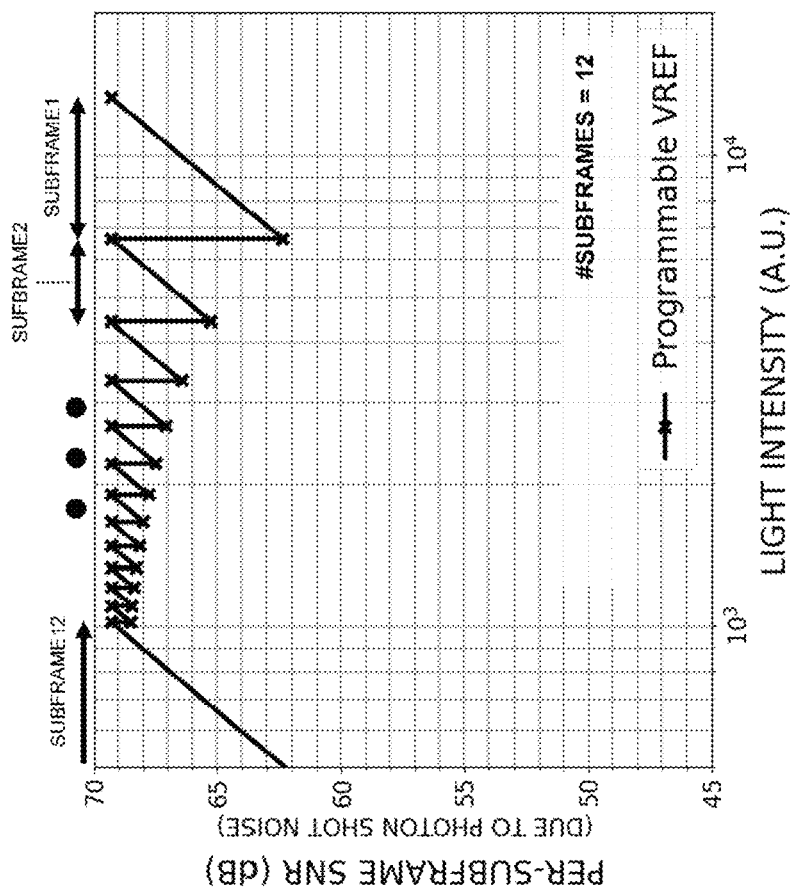
FIG. 22D is a plot showing SNR versus incident light intensity illustrating variation of signal quality with a change of codes per subframe, for time-varying coarse ADC reference voltage VREF.
Figure 22C:
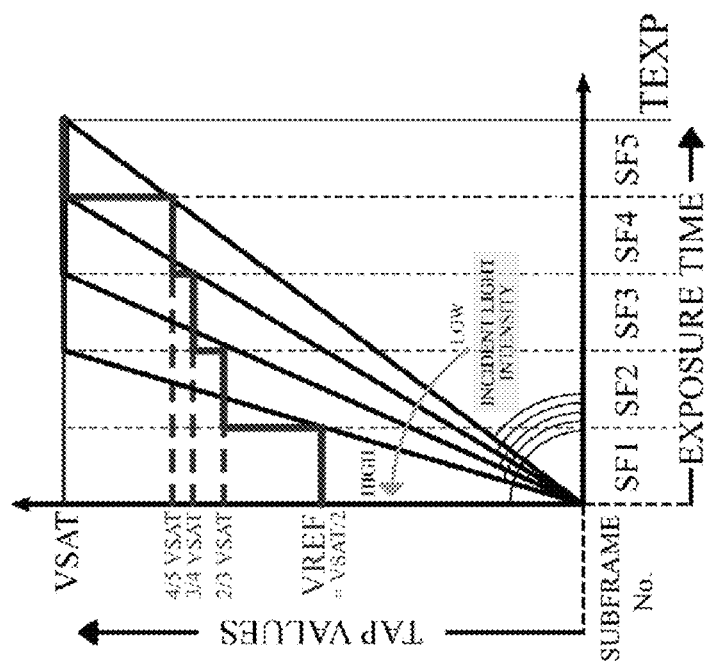
FIG. 22C is a chart showing an example of possible pixel tap values when the coarse ADC reference voltage VREF changes in every subframe and charge accumulation on a given tap is stopped after the tap value reaches VREF, with one subframe latency.

By adjusting VREF for every subframe, further improvements in per-subframe SNR and, as a result, in the overall SNR can be achieved. FIG. 22B shows an example plot of per-subframe SNR versus incident light intensity illustrating variation of signal quality with a change of codes per subframe, for constant reference voltage VREF. FIG. 22C shows an example of possible pixel tap values when the subframe codes are chosen to make sure that the minimum number of pixels are saturated. Here reference voltage VREF is adjusted in every subframe k to further improve the dynamic range. VREF for subframe k is given by k/(k+1) $V_{SAT}$, where $V_{SAT}$ is the voltage on READOUT bus associated with saturated pixel tap level. FIG. 22D shows an example plot of per-subframe SNR versus incident light intensity where variation of signal quality with a change of codes per subframe is observed, when VREF is varied. An additional improvement in the per-subframe SNR can be observed.

Figure 39:
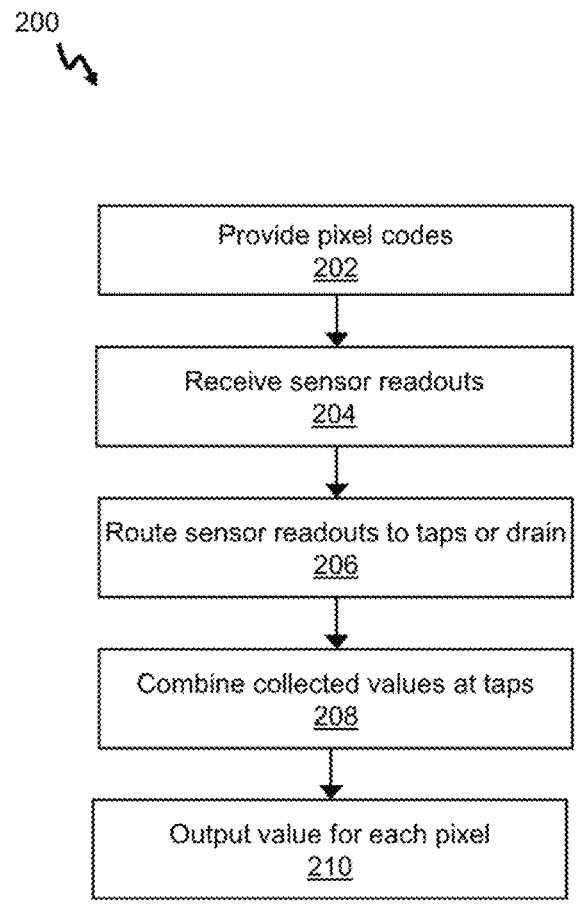
FIG. 39 is a flow chart of a method for extending image sensor dynamic range using coded pixels, in accordance with an embodiment.

FIG. 39 illustrates a flow chart for a method of extending image sensor dynamic range using coded pixels 200, according to an embodiment. At block 202, the coding module 112 provides pixel codes to pixels in a photodetector array of the image sensor 110 for each subframe. The pixel codes for each pixel can include codes for exposure time or signal gain, or both, or other programmable pixel parameters. At block 204, the image sensor 110 receives sensor readout of each of the pixels in a photodetector array for each subframe. At block 206, the coding module 112 routes the sensor readout of each of the pixels to be collected at one of a plurality of taps or drained based on the pixel code. At block 208, the HDR decoding module 114 to combine the collected values at each of the taps to determine a single pixel value for the frame. At block 210, the output module 116 outputs the single pixel value for each pixel for the frame.

An example implementation of the closed-loop HDR imaging method is provided below. In this example, a single-tap CEP image sensor with thermometer per-pixel exposure coding dynamically updated based on the previous frame is used. The method is validated by example experimental results obtained from a fabricated prototype. For the purpose of illustration in this example, no other past or current frames (other than the previous frame) nor current or past subframes are used; nor per-pixel gain coding is used.

Figure 23:
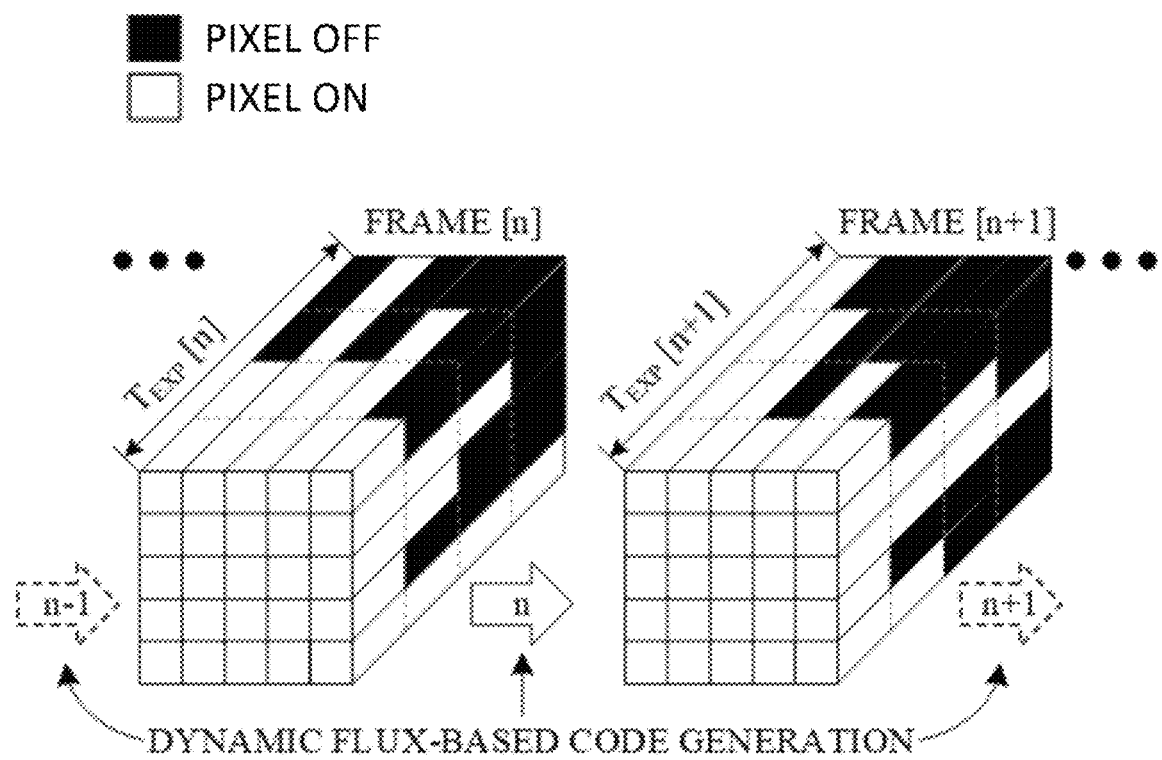
FIG. 23 diagrammatically illustrates examples of frame-to-frame dynamic space-time coding of pixels exposure time.

Advantageously, in this example, a technique for dynamic range extension of an image sensor at its native resolution using a coded-exposure-pixel (CEP) pixel architecture. A CEP image sensor allows for arbitrary programmable control over the exposure time of individual pixels. Embodiments of the present disclosure, for example, analyze light flux in each pixel in a captured frame (frame [n]) and make dynamic adjustments to the respective exposure times in the next frame (frame [n+1]) as depicted. An example of such approach is diagrammatically illustrated in FIG. 23. In the illustrated example, white-fill color denotes the time intervals when a pixel is on and black-fill color denotes the time intervals when a pixel is off. For example, pixels that sensed low brightness of the imaged scene in the captured frame are dynamically programmed to have higher exposure time in the next frame; such as the pixel in the upper left-hand side of the array in FIG. 23. After normalization for different brightness in the captured image, an HDR image is optimally reconstructed and visualized.

Figure 24A:
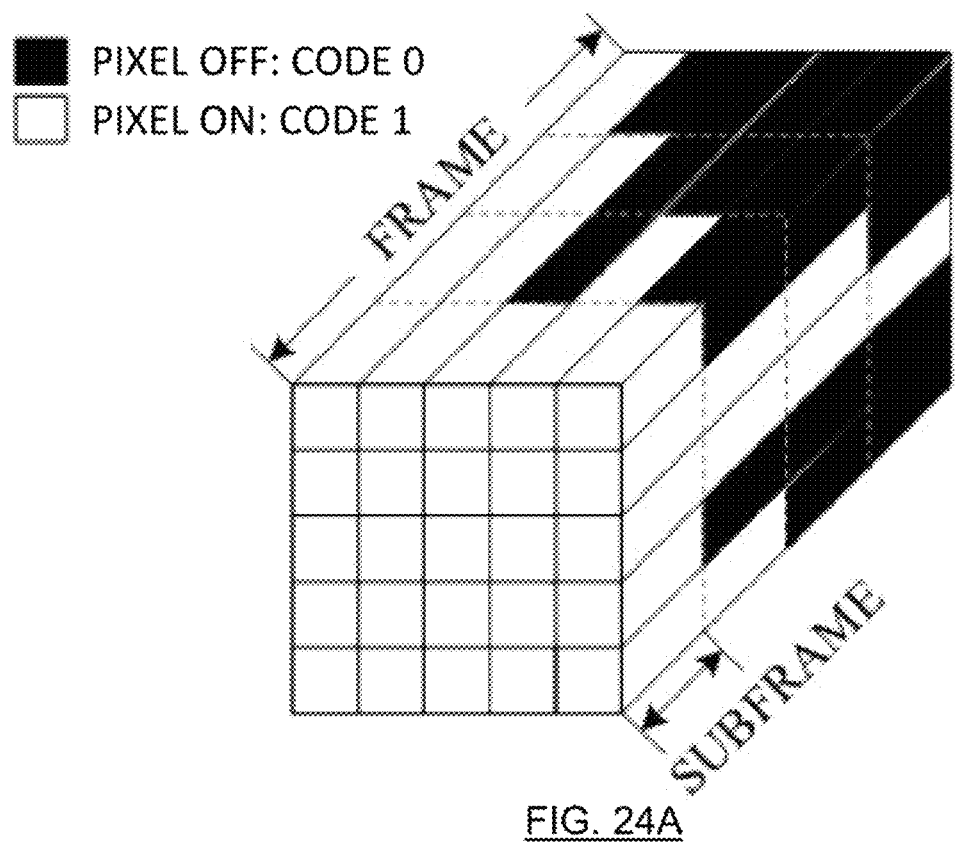
FIG. 24A diagrammatically illustrates another example of coded space-time of pixels exposure time within a single frame.
Figure 24B:
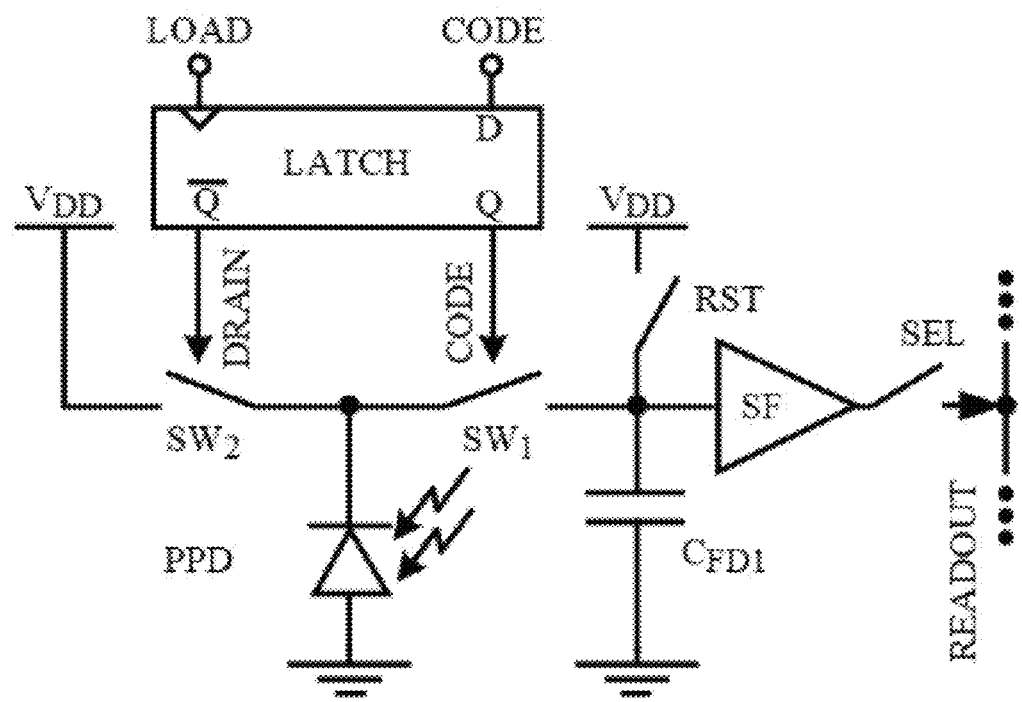
FIG. 24B is a schematic circuit diagram of an example 1-tap embodiment for each pixel.

In an embodiment, the CEP image sensor 110 implements imaging by dividing the exposure time of one frame into multiple subframes; an example of which is illustrated in FIG. 24A. In each subframe, each pixel receives a single bit of the exposure code provided by the coding module 112. For example, code 0 turns the pixel off for the duration of the respective subframe, and code 1 turns the pixel on for the duration of the respective subframe, as depicted in FIG. 24A. As illustrated in FIG. 24B, the exposure code when loaded into the pixel's latch directs the photo-generated charge from a photosite such as a pinned photo-diode (PPD) to the collection node $C_{FD1}$ for code 1 (latch output Q is asserted), or drains them through node $V_{DD}$ for code 0 (latch output $\overline{Q}$ is asserted). The signal can be accumulated on the collection node $C_{FD1}$ for multiple sequentially presented codes before being read out; for example, by using a buffering amplifier SF for subsequent readout.

In an embodiment, the exposure code delivered to a pixel in a current frame depends on scene brightness at or near that pixel in a previous frame. The exposure code sequence is presented to the pixel serially, as predetermined by the photo-generated charge collected by that pixel or neighbouring pixels in a previous frame. A code sequence is a series of digital bits, 1s and 0s. During an exposure phase, each pixel receives a predetermined code sequence. The number of 1s in a code sequence determines the fraction of the exposure period during which the pixel will be exposed and the number of 0s determines the fraction of the exposure period when the pixel is not exposed. More 1s in a code sequence for a given pixel means that the pixel will be 'on' for a longer period, which translates to a longer exposure time and allows for capturing more light by that pixel. More 0s in a code sequence for a given pixel means the pixel will be 'off' for a longer period, which translates to a shorter exposure time and allows for capturing less light by that pixel; for example, in order to not saturate from bright elements in the imaged scene. In the present embodiments, the choice of 1s versus 0s in a code sequence for a given pixel is based on the pixel or its neighbour values from a previous frame. In this way, the number of 1s and 0s in the code sequence can ensure that the pixel is exposed for as long as possible to capture most of the light, while making sure it does not get saturated during that time. In some cases, in some or all subframes of the initial frame, all pixels receive the same initial code, such as code 1, to collect the initial photo-generated charge. In the subframes of subsequent frames, pixels in darker areas of the image will receive more 1's to integrate more of the incoming photo-generated charge, but the pixels in brighter areas will receive more 0's to drain more of the incoming photo-generated charge.

As described herein, the sequence of receiving 1s and 0s, as defined by the coding module 112, is an exposure code sequence. In an embodiment, a code sequence is loaded to each pixel before each subframe. If the code is 0, the pixel is masked and does not sense any light during that subframe. If the code is 1, the pixel senses the light during that subframe. FIGS. 6A and 6B show examples of exposure time settings and code sequences, in a 4-subframe setup (i.e, N=4), for two subframe exposure coding schemes. Each of the four subframes is active for time $T_1$, $T_2$, $T_3$, $T_4$ respectively. In this example, a pixel P, receives code sequence is $D_{P1}$, $D_{P2}$, $D_{P3}$, and $D_{P4}$, where $D_{Pi}$ is a digital bit either 0 or 1 applied to pixel P during subframe i. For example, for code sequence C2, the bit sequence is 1100. In this case, a pixel receives code 1 during subframe 1 and subframe 2, and zero otherwise. This means that the pixel is integrating photo-generated charge during subframe 1 and subframe 2 and is masked (not collecting photo-generated charge) otherwise. Therefore, the effective exposure time for the pixel is T1+T2. In this way, for example, code sequence C4 is most useful in low light intensity conditions and code sequence C1 is most useful in bright light conditions. TABLE 1 shows effective exposure time for different cases for a four subframe implementation:

TABLE 1

| Code sequence | | Exposure time |
| --- | --- | --- |
| C1 | 1000 | T1 |
| C2 | 1100 | T1 + T2 |
| C3 | 1110 | T1 + T2 + T3 |
| C4 | 1111 | T1 + T2 + T3 + T4 |

For unary-weighted subframe exposure time, as shown in FIG. 25A, the exposure time of one frame $T_{EXP}$ is divided equally into four subframes, expressed as $T_1=T_2=T_3=T_4=T_{EXP}/4$. In contrast, for binary-weighted subframe exposure time, as shown in FIG. 25B, the exposure time of each subframe is two times longer than the previous subframe, expressed as $8T_1=4T_2=2T_3=T_4=8T_{EXP}/15$. The cumulative exposure time of all subframes gives the effective exposure time of a pixel. For example, the effective exposure time using C3 is $3T_{EXP}/4$ for unary-weighted subframe exposure, and $7T_{EXP}/15$ for binary-weighted subframe exposure.

FIGS. 7A and 7B show examples of raw outputs of a pixel over a full range of illumination for the unary-weighted scheme of FIG. 25A and the binary-weighted scheme of FIG. 25B, respectively. Both plots comprise 4 line-segments. Each segment corresponds to a different code sequence, from C4 to C1 as exposure increases. When the scene brightness at the pixel starts off low, code sequence C4 is used, because high effective exposure time allows the capture of more details of the scene. When the brightness increases, code sequence changes to code sequence C3, C2 or C1, to avoid saturating the pixel.

Figure 26A:
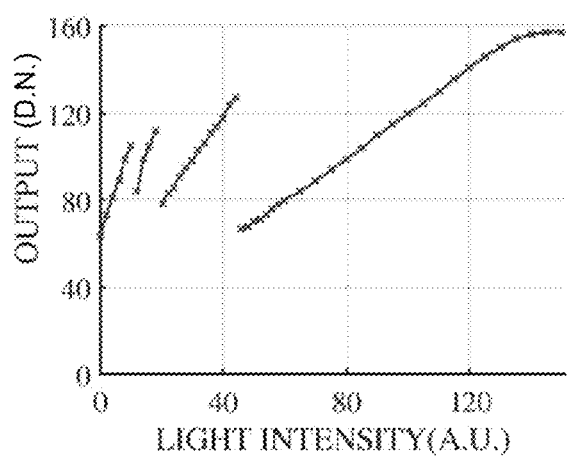
FIG. 26A is a plot of an example of raw outputs of a pixel over a full range of illumination for the unary-weighted scheme of FIG. 25A
Figure 26B:
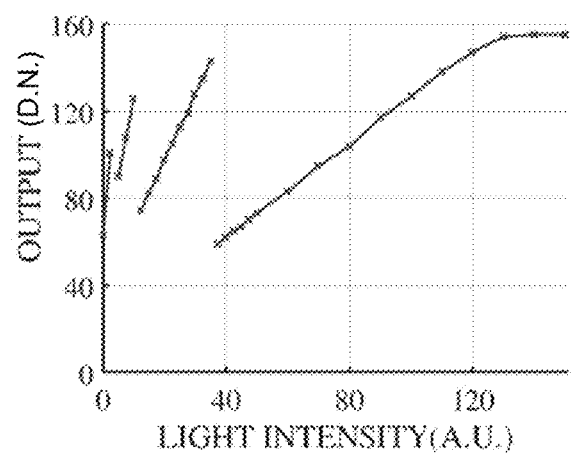
FIG. 26B is a plot of an example of raw outputs of a pixel over a full range of illumination for the binary-weighted scheme of FIG. 25B.
Figure 27A:
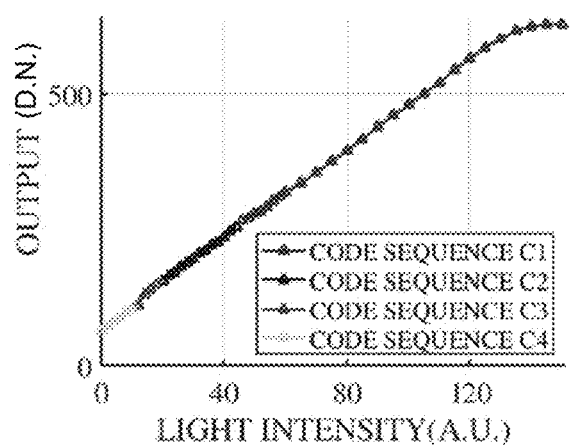
FIG. 27A is a plot of an example of a normalized version of FIG. 26A.
Figure 27B:
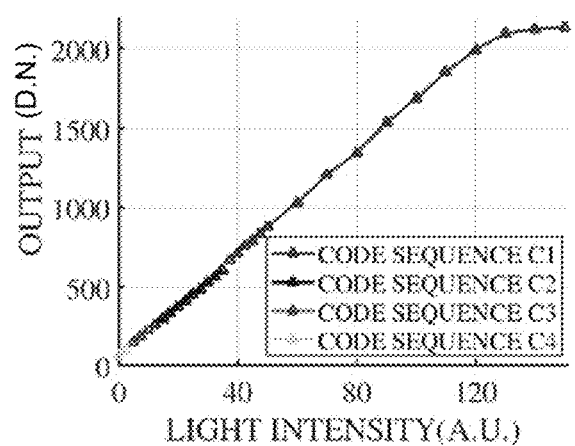
FIG. 27B is a plot of an example of a normalized version of FIG. 26B.

FIGS. 27A and 27B show examples of normalized versions of FIGS. 26A and 7B, respectively. In an embodiment, normalization by the HDR decoding module 114 converts the piece-wise linear outputs to a full-range linear response using a corresponding effective exposure time of each segment. After normalization, the maximum effective dynamic range of a pixel is generally improved. In this example, with only 4 subframes, dynamic range is increased by four times for unary-weighted subframe exposure time, and by fifteen times for binary-weighted subframe exposure time. In this way, normalized output for unary weighted subframes is N·I/C and normalized output for binary weighted subframes is $(2^N-1)*I/(2^C-1)$; where I is sensor output, N is the total number of subframes, and C is the number of 1s in the code sequence used to capture that output (for example, in C1, C2, C3, or C4).

Figure 28:
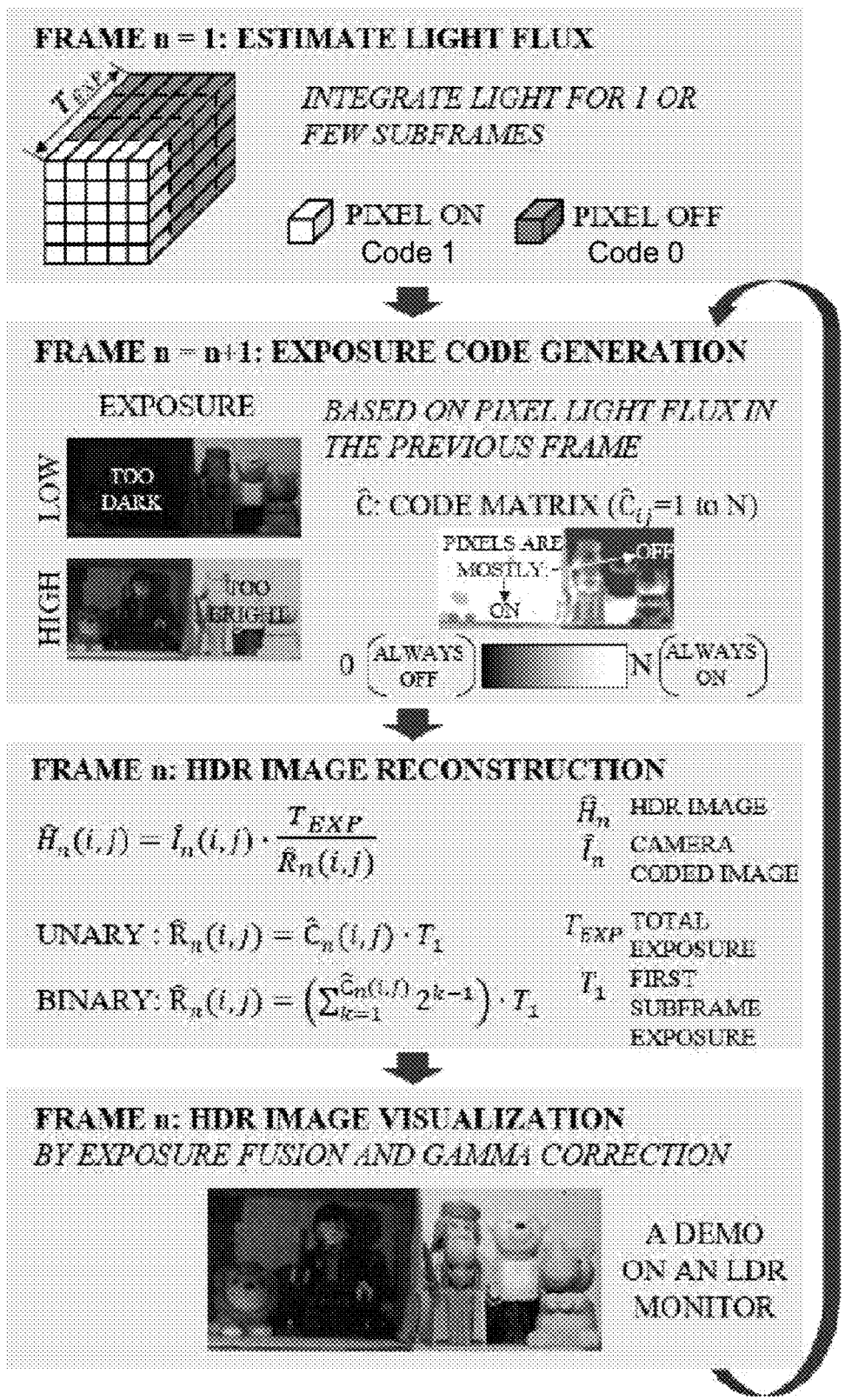
FIG. 28 is a flow chart showing an example pipeline implementation.

A flow chart showing an example pipeline implementation of the present embodiments is illustrated in FIG. 28. In this way, when a current frame is read out for displaying, it is also used to generate exposure codes for a next frame. This technique can be used for both unary-weighted and binary-weighted subframe exposure coding. In frame n, one or several subframes integrate light in a given pixel. Based on the output, a new exposure code is generated and uploaded for frame n+1. Concurrently, an HDR image is obtained by the HDR decoding module 114 by normalizing the output of frame n. In this example 4-subframe implementation, normalization generates a 10-bit HDR image using an 8-bit sensor output and a 2-bit exposure code. An exposure fusion technique allows for visualization of the 10-bit HDR image on an LDR display. While example implementations of the embodiments described herein may illustrate a four subframe implementation, it is understood that any suitable number of subframes may be used.

In an embodiment, a definition of exposure code $\hat{C}_n(i,j)$ is that pixel (i,j) will integrate charges from subframe number 1 to subframe number $\hat{C}_n(i,j)$. $\hat{C}_n(i,j)$ is a positive integer with $1 \leq \hat{C}_n(i,j) \leq N$, and N is the number of subframes in one frame. After the coding module 112 uploads $\hat{C}_n$ to the CEP image sensor 110 for frame n, the captured image can be defined as $\hat{I}_n$.

The normalization matrix $\hat{R}_n$ comprises the effective exposure time of all pixels. Equations (1) and (2) show definitions of $\hat{R}_n(i,j)$ for unary-weighted and binary-weighted subframe exposure:

Unary-weighted: $\hat{R}_n(i,j) = \hat{C}_n(i,j) \cdot T_1$ (1)

Binary-weighted: $\hat{R}_n(i,j) = \Sigma_{k=1}^{\hat{C}_n(i,j)} 2^{k-1} \cdot T_1$ (2)

where $T_1$ is the exposure time of the first subframe.

The system 100 uses $\hat{I}_n$ and $\hat{C}_n$ to generate a new exposure code matrix $\hat{C}_{n+1}$ for frame n+1, and to reconstruct an HDR image $\hat{H}_n$.

The generation of $\hat{C}_{n+1}$ involves first analyzing the light flux in pixels in the captured frame. A new normalization matrix $\hat{R}_{n+1}$ can then be obtained and converted to a new exposure code matrix.

Light flux $\hat{L}_n(i,j)$ of a pixel is defined as light intensity per unit of effective exposure time:

$$\hat{L}_n(i,j) = \frac{\hat{I}_n(i,j)}{\hat{R}_n(i,j)} \quad (3)$$

A new normalization matrix is obtained by dividing a desired pixel output j of the sensor by the light flux matrix:

$$\hat{R}_{n+1}(i,j) = \frac{J}{\hat{L}_n(i,j)} \quad (4)$$

In some cases, the desired output j can be set to approximately a half of the pixels' saturation level to assure the maximum margin for over-exposure or under-exposure in the next frame. For example, if the saturation level of the pixels is around 180DN, then j of 90DN can be chosen for the operation (DN stands for digital number).

The new exposure code matrix $\hat{C}_{n+1}$ can be generated using the inverse mapping of Equation (4) with an approximation.

In an embodiment, the approximation can include starting with the non-approximate code for pixel (i,j) in frame n+1 of $C_{n+1}(i,j)$. For the case of unary weights:

from equation (4) there is:

$$\hat{R}_{n+1}(i,j) = \frac{J}{\hat{L}_n(i,j)}$$

with equation (3):

$$\hat{R}_{n+1}(i,j) = \frac{J \cdot \hat{R}_n(i,j)}{\hat{I}_n(i,j)}$$

with equation (1):

$$\hat{C}_{n+1}(i,j) \cdot T_1 = \frac{J \cdot \hat{C}_n(i,j) \cdot T_1}{\hat{I}_n(i,j)}$$

to arrive at simplified equation:

$$\hat{C}_{n+1}(i,j) = \frac{J}{\hat{I}_n(i,j)} \hat{C}_n(i,j)$$

The above equation is an accurate code output for a next frame. Generally, $\hat{C}_n(i,j)$ must be an integer, so $\hat{C}_{n+1}(i,j)$ is approximated to a nearest valid integer so that $1 < \hat{C}_{n+1}(i,j) < N$.

For the case of binary weights, similar steps can be applied for binary weights to get an exact $\hat{C}_{n+1}(i,j)$ using the following two equations, which are equivalent:

$$2^{\hat{C}_{n+1}(i,j)} - 1 = \frac{J}{\hat{I}_n(i,j)} (2^{\hat{C}_n(i,j)} - 1)$$

$$\Rightarrow \hat{C}_{n+1}(i,j) = \log_2\left(\frac{J}{\hat{I}_n(i,j)} (2^{\hat{C}_n(i,j)} - 1) + 1\right)$$

where $\hat{C}_{n+1}(i,j)$ is approximated from either of the above two equations to a nearest valid integer so that $1 < \hat{C}_{n+1}(i,j) < N$.

In some cases, reconstruction of the HDR image $\hat{H}_n$ can require normalizing $\hat{I}_n$ by $\hat{R}_n$:

$$\hat{H}_n(i,j) = \hat{I}_n(i,j) \cdot \frac{T_{EXP}}{\hat{R}_n(i,j)} \quad (5)$$

where $T_{EXP}$ is a total exposure time for frame n.

In some cases, for frame n, the output module 116 can output the HDR image $\hat{H}_n$ to be visualized on a low dynamic range (LDR) monitor. In some cases, the output module 116 can use various exposure fusion and gamma correction techniques.

In some cases, the reconstructed HDR image can be split into several 8-bit images to cover the full bit depth. In some cases, exposure fusion can merge this image set into a single 8-bit image. The advantage of the merge is that it selectively represents the image with desired brightness and texture from the image set. In some cases, gamma correction can be used to fine-tune the merged image. Generally, conventional displays are 24-bit RGB color displays. These displays can show $2^8$ different grayscale levels. By using exposure fusion, the system 100 can selectively enhance the different parts from different images which carry most amount of information. Exposure fusion takes as input a set of similar images with different exposure settings. A final image is generated that is created by per-pixel weighted combination of the input images. The weight for the different parts of the input image is decided based on the qualities such as contrast, saturation and well-exposedness.

Figure 29:
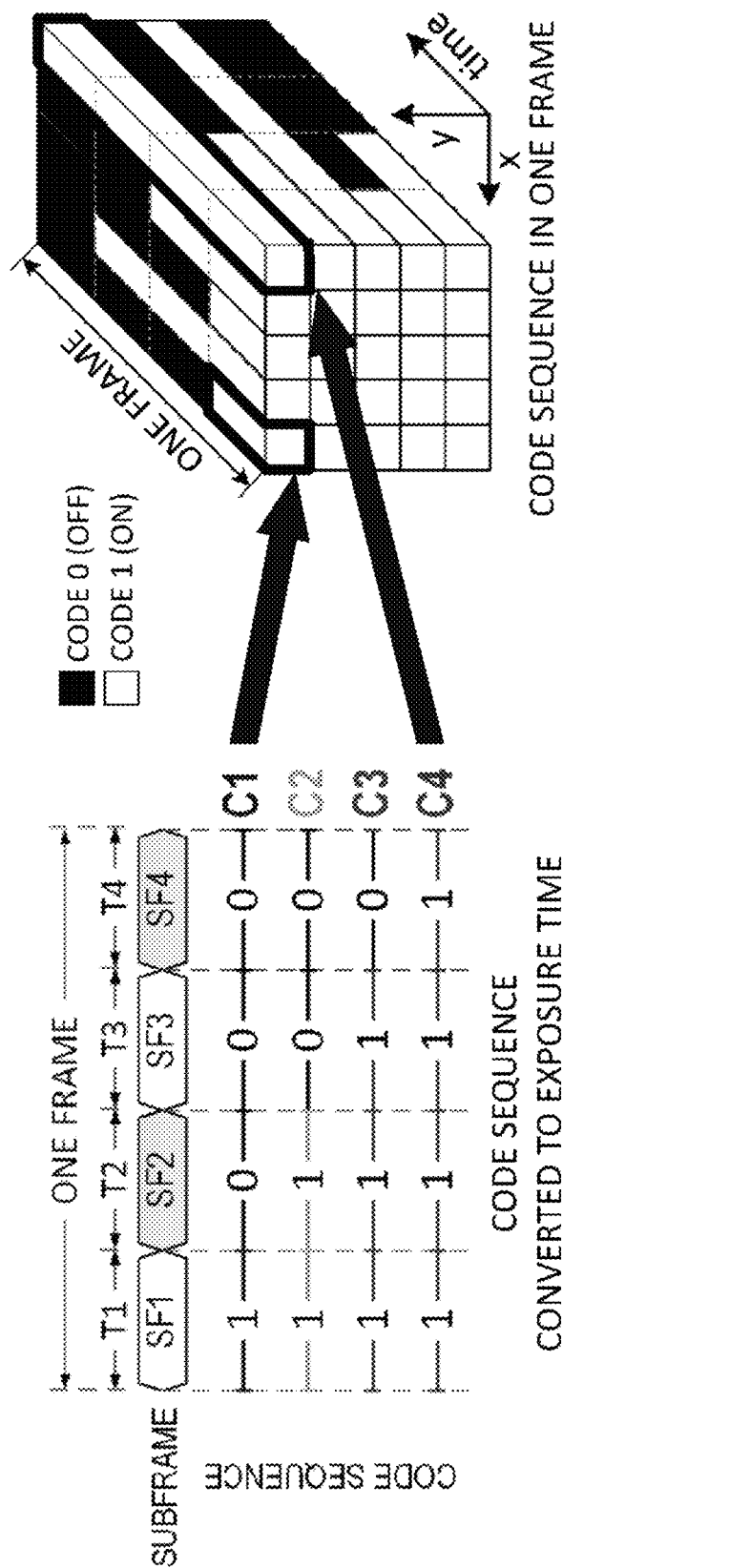
FIG. 29 diagrammatically illustrates an example of using per-pixel coded exposure.
Figure 30:
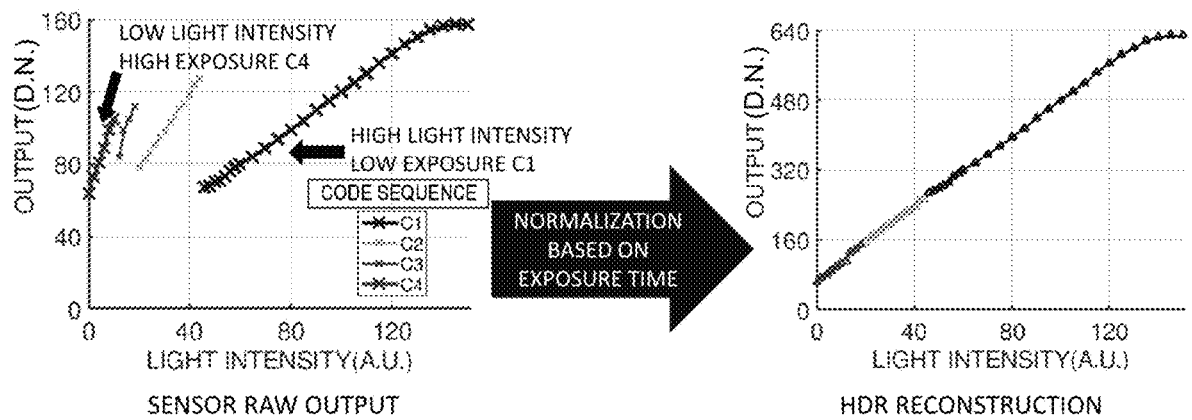
FIG. 30 illustrates plots of examples of raw output and HDR reconstruction for the example of FIG. 29.

FIG. 29 illustrates another example of using per-pixel coded exposure according to the present embodiments. In this example, one frame is subdivided into four subframes. For this example, code-sequences C1 through C4 are used. The code is updated at the start of each subframe. The space-time volume on the right-hand side shows an example of how different pixels can have different exposure time in any given frame based on the code sequence that is applied to that pixel. When code sequence C1 is applied, the pixel is exposed for short time, and when code sequence C4 is applied, the pixel is exposed for the full exposure period in that frame. As illustrated in the plots of FIG. 30, the ability to capture subframe exposures is used to capture an HDR scene. In these plots, the x-axis shows the increasing light intensity and the y-axis shows the raw sensor output. For example, if code sequence C4 is applied to the pixels capturing dark regions of the scene, it makes sure the pixels are exposed for a full frame period; but at the same time, if there are bright regions in the scene, code sequence C1 is applied to pixels in that area. This coded-exposure makes sure that most of the light from dark regions of the scene is captured while not saturating the pixels in the bright region of the scene. As shown in the right-side plot of FIG. 30, the sensor output can be normalized based on the exposure time of the individual pixels. After normalization, this can increase the effective dynamic range of the image sensor.

Figure 37:
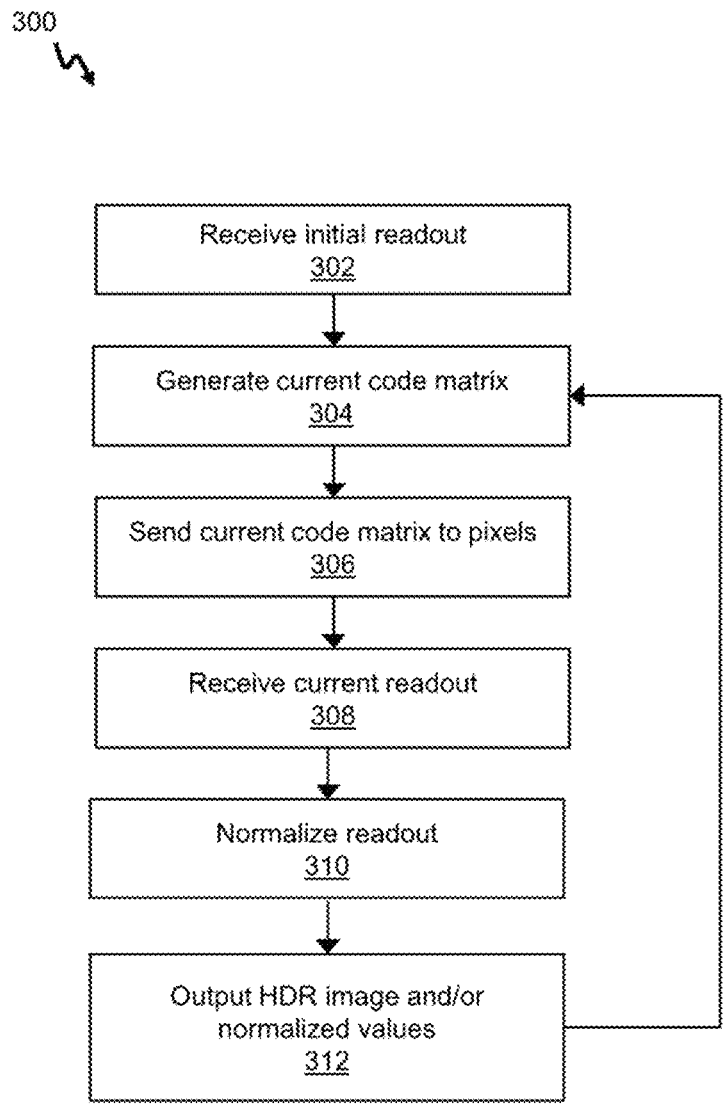
FIG. 37 is a flow chart of a method for extending image dynamic range using per-pixel coded exposure, in accordance with an embodiment.

FIG. 37 illustrates a flow chart for a method of extending image dynamic range using per-pixel coded exposure 300, according to an embodiment. At block 302, an initial raw sensor readout of each of the pixels of the CEP image sensor is received. In this initial readout, the CEP image sensor is coded with a uniform coding matrix. At block 304, a code matrix for a current coded exposure derived from the initial readout. In some cases, the current coded matrix is for the subsequent frame after the initial readout. In other cases, the initial readout can be from any previously obtained pixel readout. At block 306, the current coded matrix is sent to the latches associated with each respective pixel in the CEP image sensor. At block 308, a current raw sensor readout of each of the pixels of the CEP image sensor is received. At block 310, the current raw sensor readout is normalized based on per-pixel exposure time to reconstruct an HDR image. At block 312, the HDR image and/or the normalized values are outputted. In some cases, blocks 304 to 312 can be iteratively performed for each subsequent image frame, except instead of the deriving from the initial readout, the code matrix is derived from the previous frame.

The present inventors performed example experiments to illustrate the advantages of the present embodiments. The example experiments were performed for both unary-weighted and binary-weighted subframe exposure time. The example experiments used an image sensor, fabricated in a 0.11 μm CMOS image sensor technology, with pinned photo-diode (PPD) pixels and in-pixel latch to store exposure codes. The image sensor was configured in the single tap mode (1 signal storage node) and the number of subframes N was set to 4.

Figure 31:
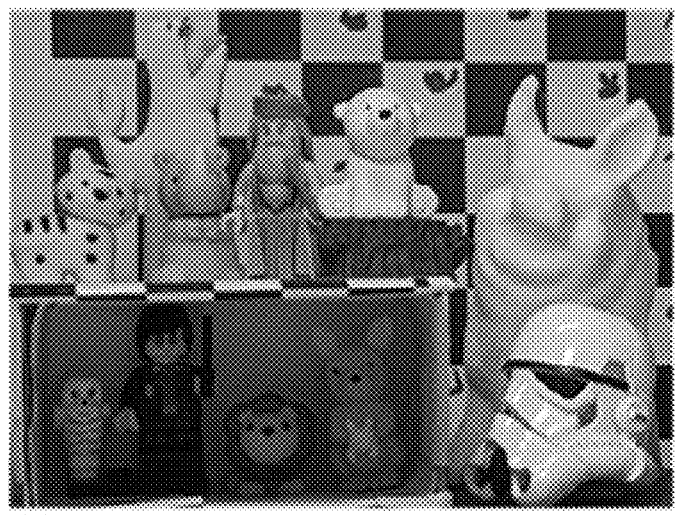
FIG. 31 is an image of a scene used for example experiments.
Figure 32A:
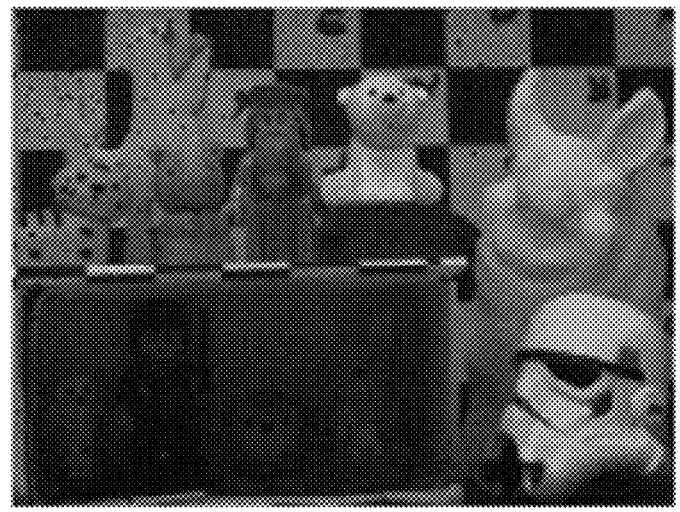
FIG. 32A shows an image captured with low exposure for the example experiments of FIG. 31.
Figure 32B:
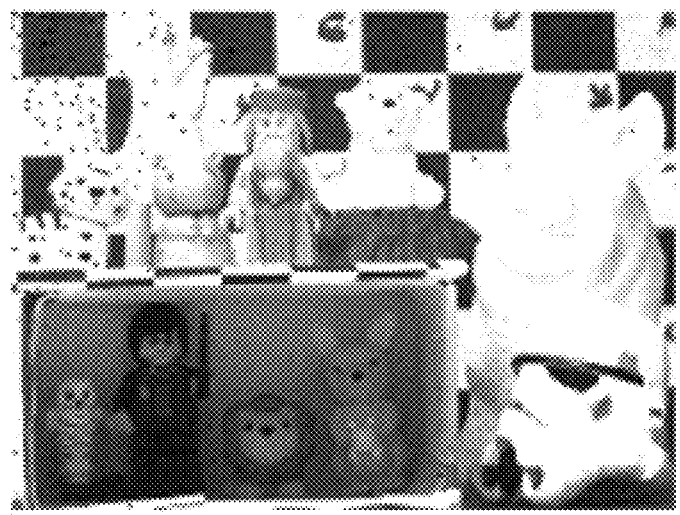
FIG. 32B shows an image captured with high exposure settings for the example experiments of FIG. 31.

The scene used for the example experiments is shown in FIG. 31, as captured using an RGB camera. FIGS. 32A and 32B show two images captured using the CEP image sensor 110 with low and high exposure settings, respectively. FIGS. 32A and 32B illustrate the difficulty of capturing both bright and dark regions simultaneously.

Figure 33:
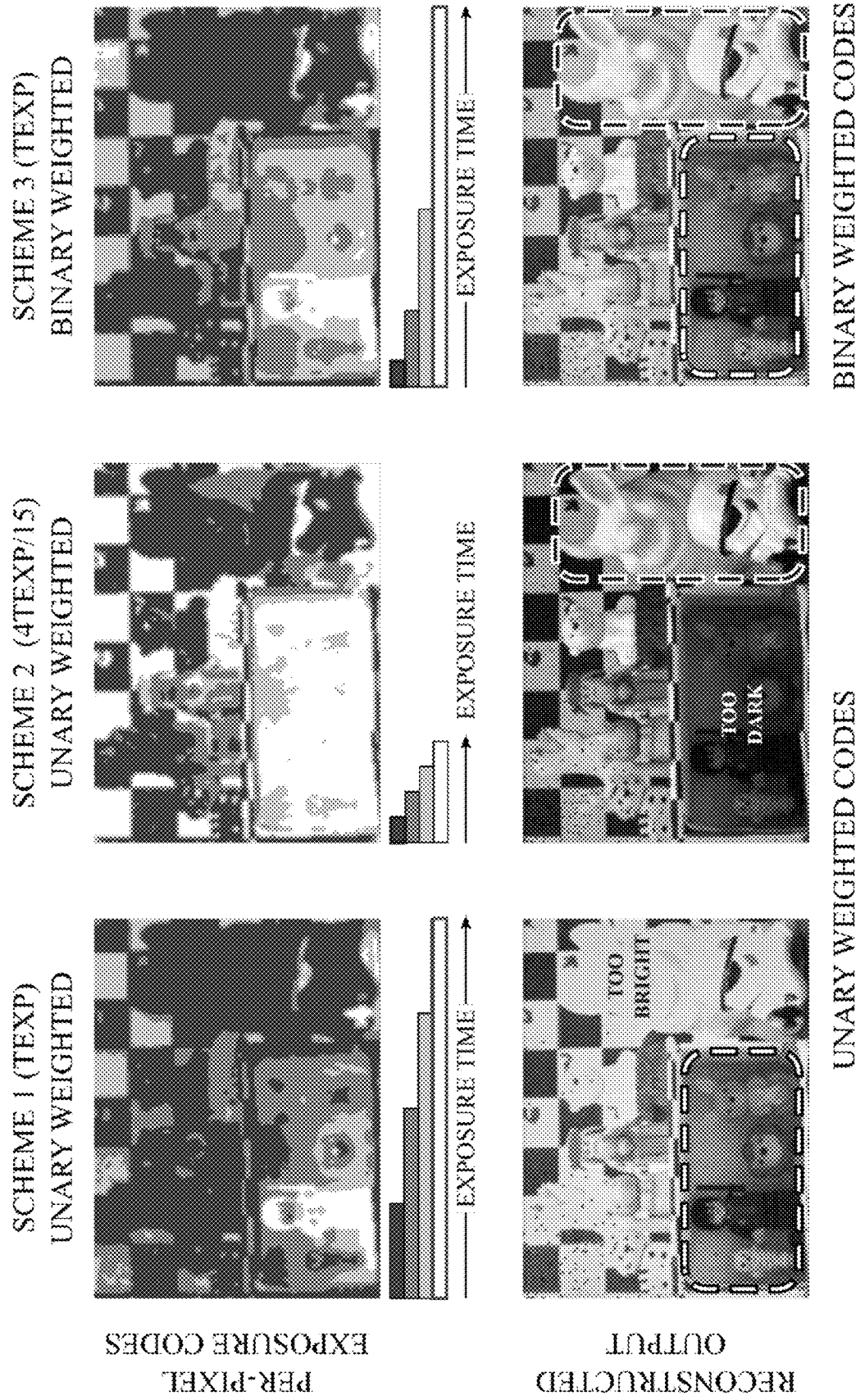
FIG. 33 illustrates a comparison for results of the example experiments of FIG. 31 for three different coding schemes.

FIG. 33 illustrates a comparison for results of the example experiments for three different coding schemes. The exposure code matrices are presented at the top, and the reconstructed HDR outputs of the sensor are presented at the bottom. For unary-weighted subframe exposure, two different timing setups are demonstrated. The first row shows the results for scheme 1 where unary-weighted subframe exposure time is set as follows: $T_1=T_2=T_3=T_4=T_{EXP}/4$. The second row shows the results for scheme 2 where unary-weighted subframe exposure time is set as follows: $T_1=T_2=T_3=T_4=T_{EXP}/15$. Scheme 2 has the total exposure time of $4T_{EXP}/15$ per frame. The third row shows results for scheme 3, with binary-weighted subframe exposure time. The exposure time for its first subframe is $T_1=T_{EXP}/15$ and it has the same total exposure time $T_{EXP}$ as scheme 1. Dark scenes, highlighted using the horizontal rectangles in FIG. 33, are reconstructed well using schemes 1 and 3. Bright scenes, highlighted using the vertical rectangles in FIG. 33, are reconstructed well using schemes 2 and 3. In the example experiments, it was determined that using binary-weighted subframe exposure time yielded the best results and reduced the required number of subframes; thus, reducing the data rate required for loading the codes.

As illustrated in the example experiments, the present embodiments provide an advantageous approach for extending image sensor dynamic range. In embodiments described herein, an approach is provided to extend the dynamic range of an image sensor at its native sensor resolution using scene-aware per-pixel-coded exposure.

Advantageously, for unary-weighted subframe exposure time, the effective dynamic range of the sensor is improved by $20 \log_{10}N$ dB, and for binary-weighted subframe exposure time by $20 \log_{10}(2^N-1)$ dB, where N is the number of subframes within one full-rate video frame.

In the present embodiments, two coding schemes are described; however, any suitable coding scheme can be used.

Figure 34:
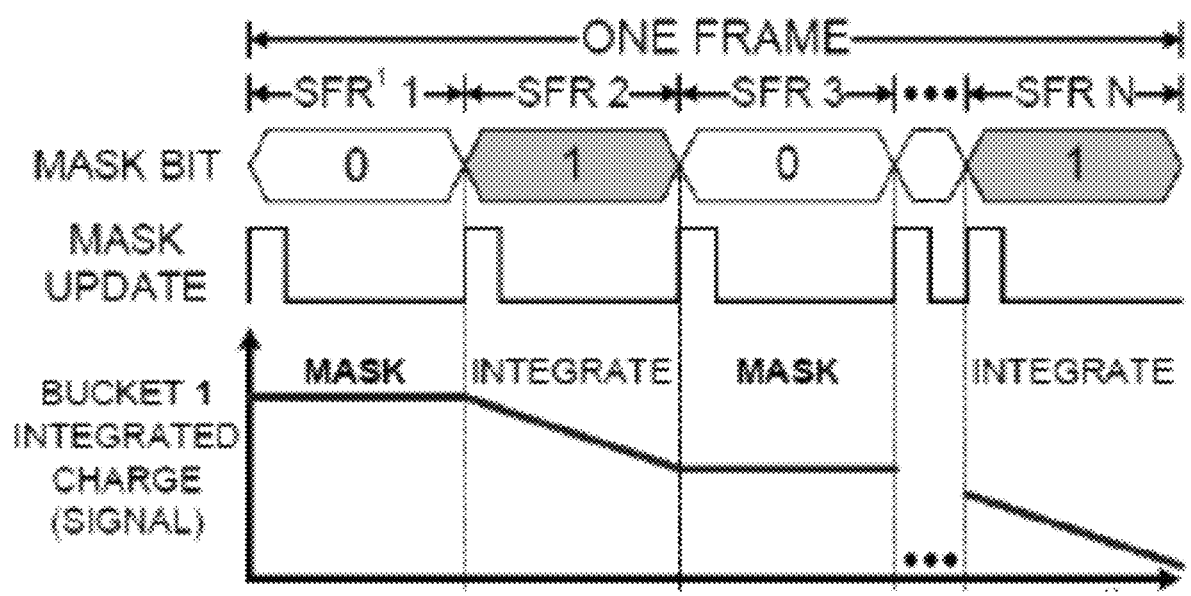
FIG. 34 shows an exemplary illustration of a coding scheme.

Embodiments described herein use a class of optical image sensors (or imagers or cameras) that have CEP pixel architecture and advantageously exploit having pixel-wise programmable exposure during one frame time using exposure code (referred to as masking) provided by the coding module 112. Using the masking of the coding module 112, the system 100 can individually select which pixels are to be masked. In an embodiment, when a pixel is "masked," (code 0), the signal collection node, associated with that pixel, herein referred to as the "bucket", does not integrate (collect) a signal in that respective pixel and the signal is drained. Conversely, when a pixel is "exposed" and does not have masking applied (code 1), the bucket collects the signal in the respective pixel. FIG. 34 shows an exemplary illustration of this approach. When a masking bit, associated with a particular pixel, provided by the coding module 112 is 0, the photons received at the pixel are disregarded. Conversely, when the masking bit is 1, the photons received at the pixel are integrated. The masking bit can be changed for every sub-frame. In some cases, the memory for storing the mask bits can be split into two separate blocks; a first memory block for preloading a next pattern of masking bits and a second memory block for applying a current pattern of masking bits. When implementing the mask load, storage and usage, it can be useful to keep mask handling independent of the pixel exposure in order not to limit the time available for signal collection. Therefore, a pipelined operation of pre-storage of masking bits can be used via two memory blocks within the pixel or elsewhere.

While the present disclosure references the image sensor 110 as a photodiode, any suitable photo-detector can be used; for example, a pinned-photodiode, a photo-gate, a charge-coupled device, a charge injection device, a single photon avalanche diode, or the like. While the present embodiments refer to a visible spectrum of light, light as referred to herein is understood to include any part of the electromagnetic spectrum along with, or instead of, light from the visible spectrum; for example, in the ultraviolet, near-infrared, short-wave infrared, and/or long-wave infrared.

Figure 35:
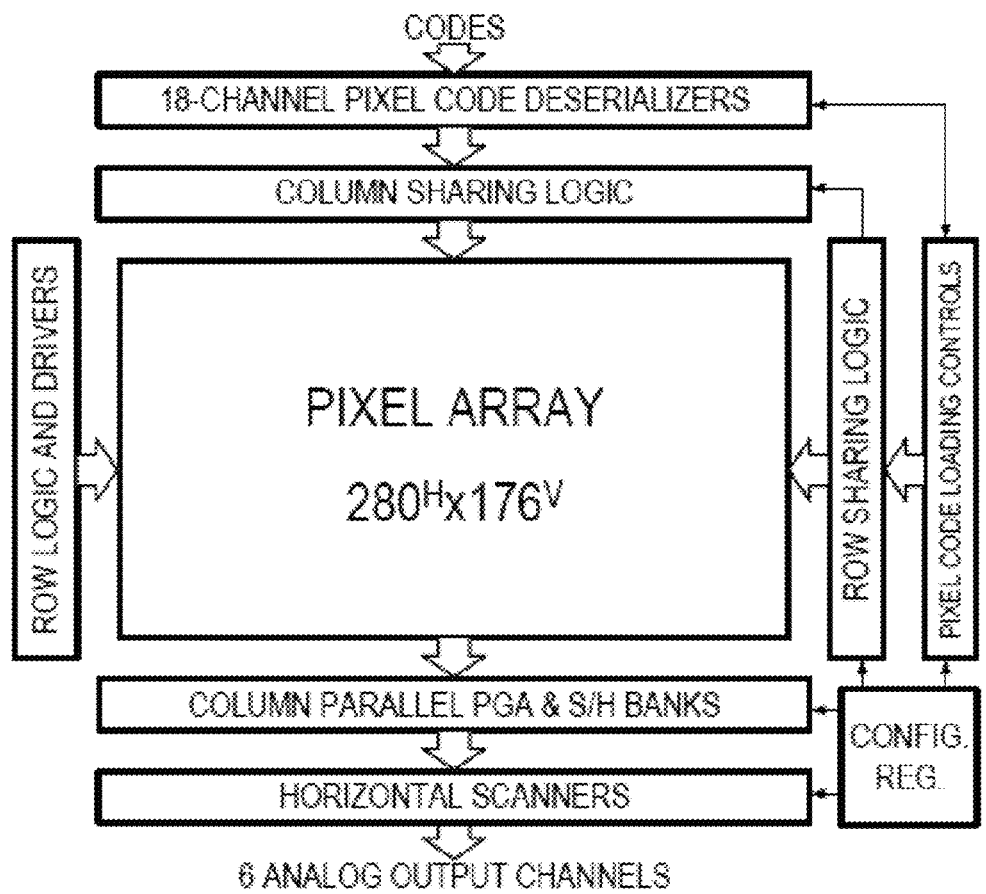
FIG. 35 is an exemplary very-large-scale integration (VLSI) architecture.

FIG. 35 is an exemplary very-large-scale integration (VLSI) architecture of the image sensor 110 of the system 100. FIG. 36A is an example of a camera that can be used having the image sensor 110 of the system 100. FIG. 36B is an exemplary chip micrograph (4 mm×3 mm in 0.11 µm technology) of the per-pixel coded image sensor 110 of the system 100, with a resolution of 244×162. FIG. 36C shows specifications and characterizations of the example image sensor of FIG. 36B. FIG. 36C also shows calculated dynamic range improvement value for different coding strategies and different number of subframes, for example N=4 and N=10, for the image sensor of FIG. 36B.

Figure 38C:
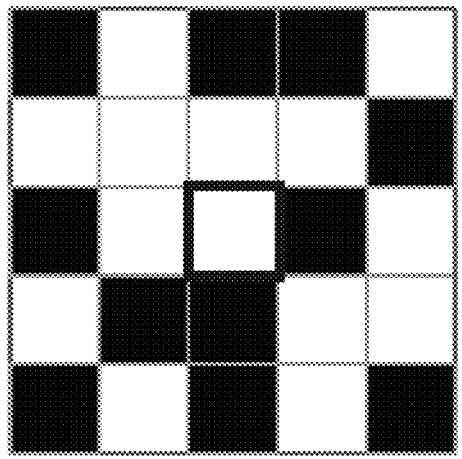
FIG. 38C is an example of per-pixel coded-exposure coding.
Figure 38B:
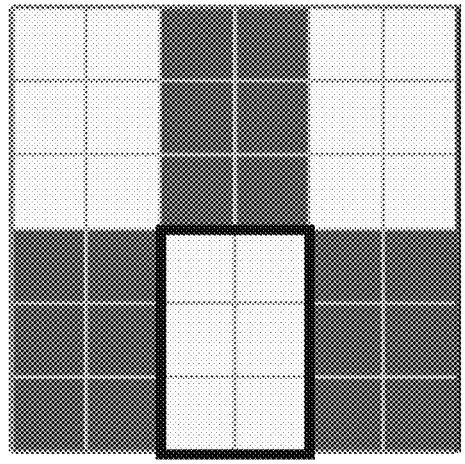
FIG. 38B is an example of partial spatio-temporal coding.
Figure 38A:
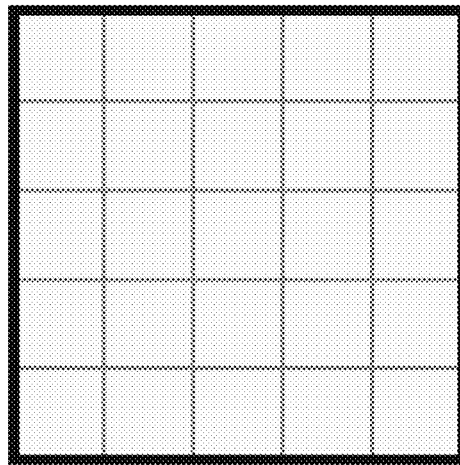
FIG. 38A is an example of temporal pixel coding.

FIG. 38A illustrates a temporal pixel coding where a code sequence is applied to the full image sensor pixel array to collect the light at different intervals of time in a given exposure period. FIG. 38B illustrates partial spatio-temporal coding which offers enhanced programmability in spatial domain by allowing different pixel subarrays of the image sensor to receive different code sequences. FIG. 38C illustrates a per-pixel coded exposure coding of the present embodiments. This coding scheme allows code sequences for each pixel independently. Multiple codes can be updated in single frame and photo generated charges received in a frame can be integrated based on the code sequence.

Advantageously, the present embodiments are able to use arbitrary-valued pixel codes for enhanced flexibility and applicability. Additionally, embodiments of the present disclosure allow for closed-loop or scene-dependent pixel code generation for enhanced adaptability. Additionally, embodiments of the present disclosure allow for pixel codes to be updated simultaneously, or at around the same time.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for extending image sensor dynamic range using coded pixels, the image sensor comprising a photo-detector array to convert an incoming light signal into a photo-generated electronic signal, the method comprising:
   providing pixel codes to pixels in the photodetector array for each subframe of a frame;
   receiving a sensor readout of each of the pixels in the photodetector array for each subframe;
   for each subframe, based on the pixel code, routing each sensor readout value for collection at one or more taps or to a drain, the pixel codes determined adaptively based on previously received pixel values by sorting the collected sensor readout values on each tap based on the pixel codes for a previous subframe as the sensor readouts of a current subframe are collected;
   combining the collected sensor readout values at each of the taps to determine a single pixel value for the frame; and
   outputting the single pixel value for each pixel for the frame.

2. The method of claim 1, wherein the pixel code comprises a code corresponding to exposure time of the respective pixel, with a resulting photo-generated charge comprising the respective sensor readout.

3. The method of claim 1, wherein the pixel code comprises a code corresponding to signal gain of the signal received at the photodetector.

4. The method of claim 1, wherein each pixel code is applied mutually to a group of pixels.

5. The method of claim 1, wherein the pixel codes are preloaded into a code memory store based on the previously received pixel values.

6. The method of claim 1, wherein each pixel comprises one tap, and the pixel code for each pixel comprises a one-bit binary number.

7. The method of claim 1, wherein the pixel codes for one or more of the pixels dictate that each of the one or more taps have individually-programmable integration time intervals.

8. The method of claim 7, wherein an average of the integration time intervals is equalized over multiple frames.

9. A system for extending image sensor dynamic range using coded pixels, the image sensor comprising a photo-detector array to convert an incoming light signal into a photo-generated electronic signal, the system comprising circuit logic, the circuit logic configured to execute:
   a coding module to provide pixel codes to pixels in the photodetector array for each subframe of a frame and to, for each subframe, based on the pixel code, route the photo-generated electronic signal value of a respective one of the pixels for collection at one or more taps or to a drain, the pixel codes are determined adaptively based on previously received pixel values by sorting the photo-generated electronic signal values on each tap based on the collected signal values and the pixel codes for one or more previous subframes;
   a high-dynamic-range (HDR) decoding module to combine the collected signal values available at each of the taps to determine a single pixel value for the frame; and
   an output module to output the single pixel value for each pixel for the frame.

10. The system of claim 9, wherein the pixel code comprises a code corresponding to exposure time of the respective pixel, with a resulting photo-generated charge comprising the respective sensor readout.

11. The system of claim 10, wherein the pixel codes dictate pixel exposure time for pixels that sense time of flight of the incoming light signal.

12. The system of claim 9, wherein the pixel code comprises a code corresponding to signal gain of the signal received at the photodetector.

13. The system of claim 12, wherein each pixel in the photodetector array comprises one or more charge collection nodes, and wherein the charge collection nodes from one or more pixels are combined to modify the signal gain based on the pixel codes.

14. The system of claim 12, wherein the pixel codes dictate signal gain for pixels that sense time of flight of the incoming light signal.

15. The system of claim 9, wherein each pixel code is applied mutually to a group of pixels.

16. The system of claim 9, wherein the coding module uses the pixel codes as loaded into a code memory store based on the previously received pixel values.

17. The system of claim 9, wherein each pixel comprises one tap, and the pixel code for each pixel comprises a one-bit binary number.

18. The system of claim 9, wherein the HDR decoding module comprises an analog-to-digital converter (ADC), and wherein the resolution of the ADC is different for digitizing the subframes compared to digitizing the frames.

19. The system of claim 9, wherein the HDR decoding module comprises an analog-to-digital converter (ADC), and wherein one or more parameters of the ADC are dynamically adjusted for one or more subframes or for one of more frames.

* * * * *